(12) United States Patent
Stormberg et al.

(10) Patent No.: US 11,668,445 B2
(45) Date of Patent: Jun. 6, 2023

(54) MULTI-BEAM VEHICLE LIGHT

(71) Applicant: Quarkstar LLC, Las Vegas, NV (US)

(72) Inventors: Hans Peter Stormberg, Stolberg (DE); Victor E. Isbrucker, Sturgeon Point (CA); Ferdinand Schinagl, North Vancouver (CA)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 17/200,695

(22) Filed: Mar. 12, 2021

(65) Prior Publication Data
US 2022/0034463 A1   Feb. 3, 2022

Related U.S. Application Data

(63) Continuation of application No. 16/096,251, filed as application No. PCT/US2017/029475 on Apr. 25, 2017, now Pat. No. 10,948,150.
(Continued)

(51) Int. Cl.
*F21S 41/24*     (2018.01)
*F21S 43/241*    (2018.01)
(Continued)

(52) U.S. Cl.
CPC .............. *F21S 41/24* (2018.01); *B60Q 1/04* (2013.01); *B60Q 3/64* (2017.02); *F21S 41/27* (2018.01); *F21S 41/285* (2018.01); *F21S 41/321* (2018.01); *F21S 41/50* (2018.01); *F21S 41/675* (2018.01); *F21S 43/239* (2018.01); *F21S 43/241* (2018.01); *F21S 43/243* (2018.01); *F21S 43/249* (2018.01); *F21S 43/26* (2018.01); *F21S 43/31* (2018.01); *F21S 43/40* (2018.01);
(Continued)

(58) Field of Classification Search
CPC ............ F21S 43/235–251; F21S 41/24; F21S 41/50
See application file for complete search history.

(56) References Cited

U.S. PATENT DOCUMENTS 6,058,271 A   5/2000 Tenmyo
9,033,552 B2  5/2015 Chu
(Continued)

FOREIGN PATENT DOCUMENTS

DE   102009053581   3/2011
DE   102012107437   12/2014
(Continued)

OTHER PUBLICATIONS

International Search Report/Written Opinion for PCT/US2017/029475 dated Jul. 18, 2017, 15 pgs.
DE102013211868 English Machine Translation 2014.

*Primary Examiner* — Mariceli Santiago
(74) *Attorney, Agent, or Firm* — Fish & Richardson P.C.

(57) ABSTRACT

A vehicle light includes a lighting unit with multiple light-emitting elements (LEEs), one or more couplers, a light guide and an extractor. The lighting unit has a curved elongate extension. Each of the couplers has an input aperture coupled with one or more of the LEEs and an exit aperture coupled with a first edge of the light guide and is configured to couple light from the LEEs into the light guide. The light guide is configured to propagate light via total internal reflection to a second edge of the light guide. The extractor has an input aperture coupled with the second edge of the light guide and an exit aperture configured to emit light into an ambient environment.

18 Claims, 34 Drawing Sheets

Related U.S. Application Data

(60) Provisional application No. 62/396,764, filed on Sep. 19, 2016, provisional application No. 62/376,896, filed on Aug. 18, 2016, provisional application No. 62/329,165, filed on Apr. 28, 2016, provisional application No. 62/327,378, filed on Apr. 25, 2016.

(51) Int. Cl.
| | |
|---|---|
| *F21S 43/249* | (2018.01) |
| *F21S 43/243* | (2018.01) |
| *F21S 41/20* | (2018.01) |
| *F21S 43/239* | (2018.01) |
| *B60Q 3/64* | (2017.01) |
| *F21S 43/20* | (2018.01) |
| *B60Q 1/04* | (2006.01) |
| *F21V 8/00* | (2006.01) |
| *F21S 41/32* | (2018.01) |
| *F21S 43/31* | (2018.01) |
| *F21S 43/40* | (2018.01) |
| *F21S 41/27* | (2018.01) |
| *F21S 41/675* | (2018.01) |
| *G02B 19/00* | (2006.01) |
| *F21S 43/50* | (2018.01) |
| *F21S 41/50* | (2018.01) |

(52) U.S. Cl.
CPC ............ *F21S 43/50* (2018.01); *G02B 6/0068* (2013.01); *G02B 19/0014* (2013.01); *G02B 19/0028* (2013.01); *G02B 19/0057* (2013.01); *G02B 19/0066* (2013.01)

(56) References Cited

U.S. PATENT DOCUMENTS

| | | | |
|---|---|---|---|
| 9,316,376 | B2 | 4/2016 | Orisich |
| 9,404,633 | B2 | 8/2016 | Mugge |
| 9,632,240 | B2 | 4/2017 | Kai |
| 9,689,550 | B2 | 6/2017 | Tai |
| 10,267,979 | B2 | 4/2019 | Speier |
| 2003/0063473 | A1 | 4/2003 | Aynie |
| 2004/0208019 | A1 | 10/2004 | Koizumi |
| 2011/0216549 | A1 | 9/2011 | Futami |
| 2014/0160779 | A1 | 12/2014 | Pusch et al. |
| 2015/0219303 | A1 | 8/2015 | Kai |
| 2016/0040845 | A1 | 2/2016 | Kuo |
| 2018/0149326 | A1 | 5/2018 | Paroni |

FOREIGN PATENT DOCUMENTS

| | | |
|---|---|---|
| DE | 102013211868 | 12/2014 |
| EP | 2161494 | 10/2010 |
| EP | 2778512 | 9/2014 |
| EP | 2886937 | 6/2015 |
| FR | 2934353 | 1/2010 |
| JP | 2014229510 | 8/2014 |
| WO | 2012059852 | 10/2012 |
| WO | 2015113979 | 6/2015 |

MULTI-BEAM VEHICLE LIGHT

CROSS-REFERENCE TO RELATED APPLICATIONS

This application is a continuation application of and claims priority to U.S. application Ser. No. 16/096,251, filed on Oct. 24, 2018, which is a U.S. National Phase application of International Application No. PCT/US2017/029475, filed on Apr. 25, 2017, which claims benefit under 35 U.S.C. § 119(e)(1) of U.S. Provisional Application No. 62/327,378, filed on Apr. 25, 2016, of U.S. Provisional Application No. 62/329,165, filed on Apr. 28, 2016, of U.S. Provisional Application No. 62/376,896, filed on Aug. 18, 2016, and of U.S. Provisional Application No. 62/396,764, filed on Sep. 19, 2016, all of which are incorporated by reference herein.

FIELD OF THE TECHNOLOGY

The present technology relates to automotive lighting, more specifically to vehicle lights with light-emitting diodes.

BACKGROUND OF THE TECHNOLOGY

Vehicle lights are preferably compact, lightweight, durable and, specifically for headlights, provide multi-functional illumination including high beams, low beams, corner beams, running lights, turning indicators and so forth. Light-emitting diodes (LEDs) provide good durability and have become increasingly powerful to provide sufficient illumination even for automotive head lighting.

For space constraints, multiple illumination functions in traditional lights are typically provided in the form of integrally formed lights with some multi-filament bulbs. For example, headlights may include a single incandescent bulb with two or more independently controllable filaments that is surrounded by a single reflector dish configured to provide both high and low beam and/or running light illumination depending on the active filament. For various reasons, incandescent sources are increasingly being displaced as light sources from automotive lights by LED based solutions because LEDs allow the design of durable, high-performing vehicle lights with significantly smaller, more compact optical systems. In line with traditional designs, newer vehicle lights often merely use LED-based sources in unnecessarily large bulb formats and combine them with reflective optical systems for incandescent bulbs. Considering the comparatively large size of incandescent bulbs, such reflective optical systems are larger than they need to be and less efficient compared to optical systems based on solid-state light sources alone as well as combinations with solid transparent optical components.

SUMMARY OF THE TECHNOLOGY

The present technology is directed to compact and efficient vehicle lights and a lighting unit architecture that can be controlled to provide different beam patterns during operation by selectively activating different combinations of lighting units. Lighting units can include light emitting elements (LEEs) based on light-emitting diodes, laser diodes, phosphors, quantum dots and/or other luminescent sources. Light emitting elements may be integrated on a die or package level, for example.

According to an aspect of the present technology there is provided a vehicle light that includes a lighting unit including multiple light-emitting elements (LEEs), one or more couplers, a light guide and an extractor. The lighting unit has a curved elongate extension. Each of the couplers has an input aperture coupled with one or more of the LEEs and an exit aperture coupled with a first edge of the light guide and is configured to couple light from the LEEs into the light guide. The light guide is configured to propagate light via total internal reflection to a second edge of the light guide. The extractor has an input aperture coupled with the second edge of the light guide and an exit aperture configured to emit light into an ambient environment.

The foregoing and other embodiments can each optionally include one or more of the following features, alone or in combination. In some implementations, the LEEs can be arranged and configured in groups for selective activation and operatively connected to a control system for selectively activating one or more of the groups of LEEs depending on one or more operating signals. In some cases, one or more of the groups of LEEs can be configured to provide light for illuminating a portion of an ambient area of a vehicle. In some cases, one or more of the groups of LEEs can be configured to provide light for indicating a signal to an ambient area of a vehicle.

In some implementations, the vehicle light can include a trim and a housing, the trim and the housing configured to enclose the lighting unit. Here, the lighting unit is shaped to fit a shape of the trim.

In some implementations, the light guide can have a closed toroidal shape. In some implementations, the light guide can have a uniform thickness along the curved elongate extension of the lighting unit. In some implementations, the light guide can have a uniform thickness between the first and second edges.

In some implementations, the extractor can have a shape varying along the curved elongate extension of the lighting unit. In some cases, a first group of LEEs can be configured to provide light having a color different from the color of the light provided by other groups of LEEs. For example, the LEEs can be arranged by color along the curved elongate extension of the lighting unit.

In some implementations, the lighting unit can be configured to extend along a full width of a vehicle. In some implementations, the extractor can be configured to emit light into the ambient environment within a range of forward directions around the optical axis. In some cases, the vehicle light can include a reflector (i) extending along at least a portion of the extractor and (ii) being arranged and configured to redirect at least a portion of the light emitted by the extractor.

According to another aspect of the present technology there is provided a vehicle light that includes multiple lighting units. Each lighting unit includes a light-emitting element (LEE), a coupler, a light guide and an extractor and has an elongate extension perpendicular to an optical axis of the LEE. Each coupler has an input aperture coupled with the LEE and an exit aperture coupled with a first edge of the light guide and being configured to couple light from the LEEs into the light guide. Each light guide is configured to propagate light via total internal reflection to a second edge of the light guide. Each extractor has an input aperture coupled with the second edge of the light guide and an exit aperture configured to emit light into an ambient environment. Each lighting unit is operatively connected to a control system for selective activation of one or more lighting units depending on one or more operating signals.

The foregoing and other embodiments can each optionally include one or more of the following features, alone or in combination. In some implementations, one or more of the lighting units can be configured to provide light for illuminating a portion of an ambient area of a vehicle. In some implementations, one or more of the lighting units can be configured to provide light for indicating a signal to an ambient area of a vehicle.

In some implementations, one or more of the extractors are configured to emit light into the ambient environment within a range of forward directions around the optical axis. In some cases, the vehicle light can include one or more reflectors arranged and configured to redirect at least a portion of the light emitted by the one or more extractors.

In some implementations, the vehicle light according can include a trim and a housing, the trim and the housing configured to enclose the multiple lighting units. Here, one or more of the lighting units have a curved elongate shape configured to fit a shape of the trim.

The details of one or more implementations of the technologies described herein are set forth in the accompanying drawings and the description below. Other features, aspects, and advantages of the disclosed technologies will become apparent from the description, the drawings, and the claims.

Reference numbers and designations in the various drawings indicate exemplary aspects, implementations of particular features of the present disclosure.

DETAILED DESCRIPTION

Figure 1:
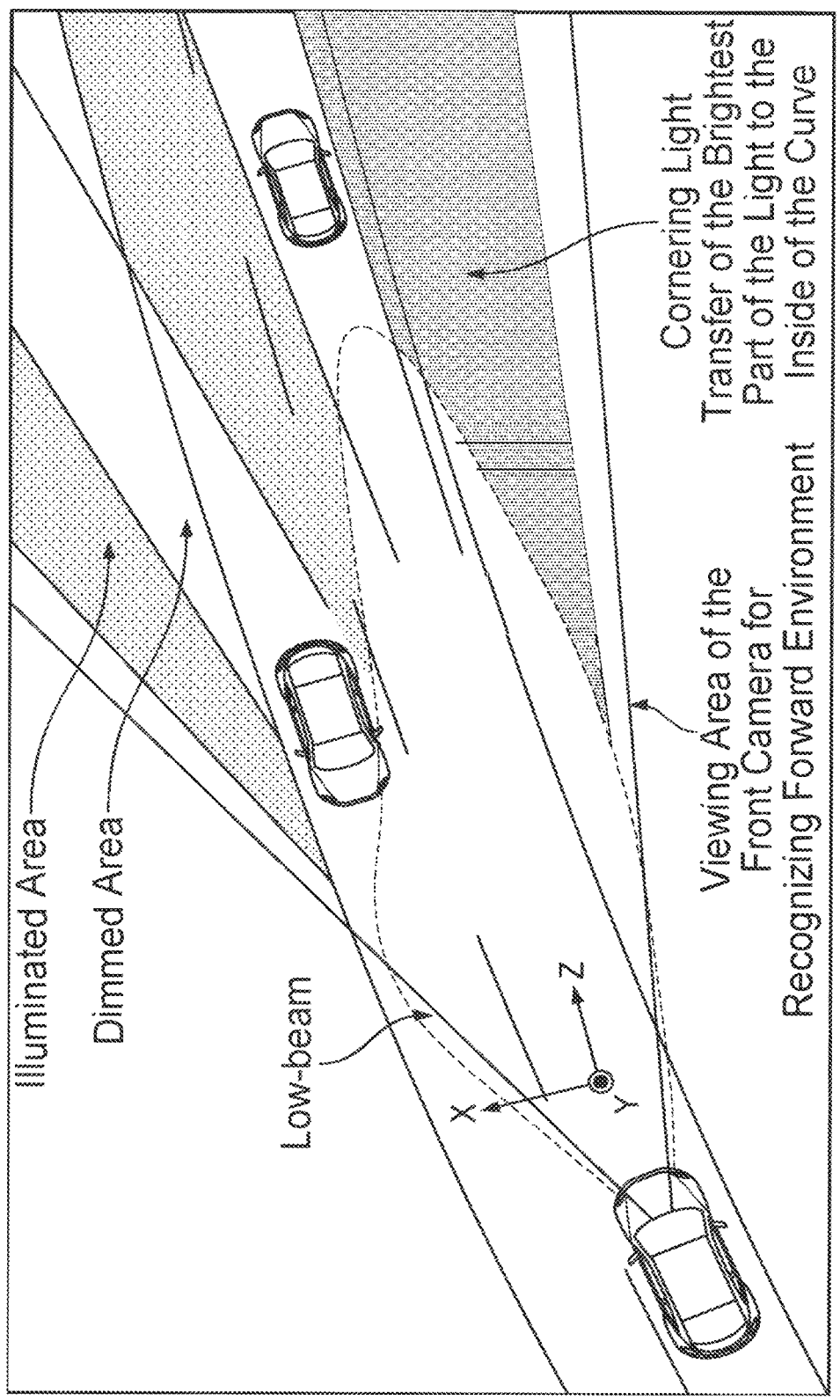
FIG. 1 shows a top view of the field of view of a typical vehicle headlight.

A vehicle light according to the present technology may be configured as a headlight, taillight, backup light or other vehicle light. Vehicle lights can be configured to illuminate an area including at least portions of one or more zones, for example a high beam zone, a low beam zone, a left cornering zone and a right cornering zone for a headlight. FIG. 1 shows a top view of the field of view of a typical vehicle headlight and indications of various zones. The headlight includes one or more lighting units configured to illuminate the noted zones. Depending on the embodiment, the headlight may additionally include one or more of the following: one or more fog lights, a daytime running light, one or more turn indicator lights and/or additional lights.

The lighting unit can be configured to provide a beam of light that fully covers a particular zone, or multiple lighting units may be configured to provide overlapping beams that combine to illuminate the particular zone. The activation of a lighting unit may depend on the activated operating mode of the headlight. The operating mode may be controlled manually by a user or automatically by a respective control system (not illustrated). The control system may include a camera system and respective computer vision elements, turn sensors, accelerometers and other sensor elements that are suitably operatively interconnected.

Figure 2:
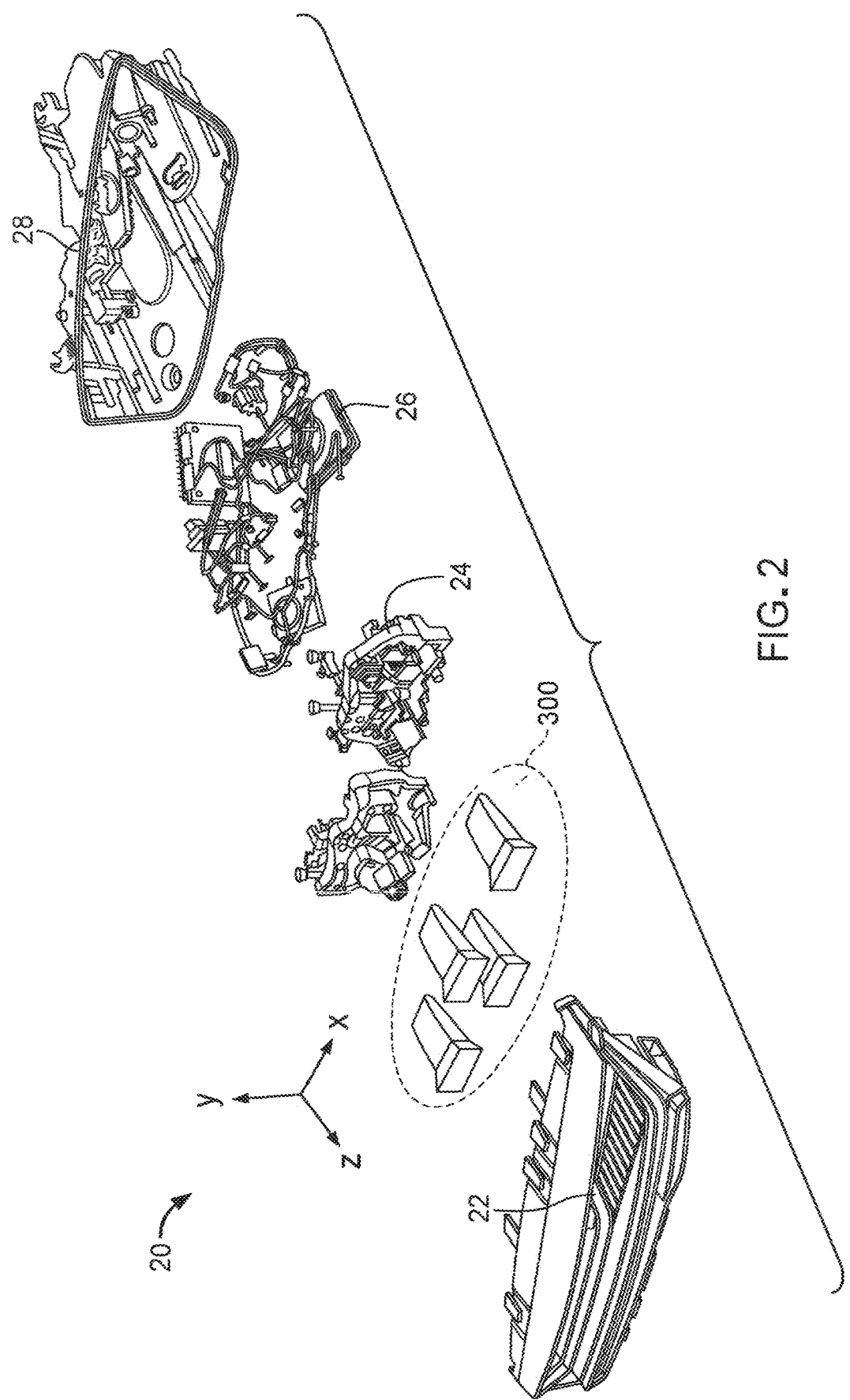
FIG. 2 shows an exploded view of a vehicle headlight according to an embodiment of the present technology.

FIG. 2 shows an exploded view of a vehicle headlight 20 according to an embodiment of the present technology. The vehicle headlight 20 includes multiple modular separate lighting units 300. A like architecture may be employed for automotive rear lights. For example, multiple types of rear lights including backup lights, break lights, indicators and so forth may be configured and combined into a common housing.

As illustrated in FIG. 2, the vehicle headlight 20 includes a housing 28, a control system 26 including one or more control elements, one or more carriers 24 configured to support lighting units 300, and a trim 22. The trim 22 provides a transparent outer cover for the housing 28 configured to allow light from the lighting units 300 to pass into the ambient environment and provide illumination for a zone or a respective optical turn or other indication signal. The control elements of the control system 26 include various control units and electronics configured to provide adequate power to the lighting units 300 depending on the operating conditions of the headlight 20.

Lighting units 300 as described herein may also be employed in so-called third breaklights. Third breaklights are typically center mounted near the top of a rear-facing edge of a vehicle such as a tailgate or passenger cabin for a pickup truck, for example. Lighting units 300 according to the present technology may also be configured to form a third breaklight and may further be employed to form a combined third breaklight and backup light in one housing. Such a combination may utilize modular lighting units or an integrally formed lighting unit. In the latter case, the integrally formed lighting unit includes adequately configured white and red LEEs.

The lighting units 300 can include light guide modules as described below in connection with FIGS. 6G-6H or FIG. 13A or FIGS. 15A-15B or FIGS. 17A-17B or FIGS. 20A-20B, however, adapted for automotive lighting instead of space illumination applications. While retaining a like optical architecture, the light guide modules may be adapted to provide beams of light with a longer reach, higher luminance and/or suitable emission profiles depending on the lighting unit and the particular zone to be illuminated or lighting function to be provided when used in a vehicle headlight.

Figure 3A:
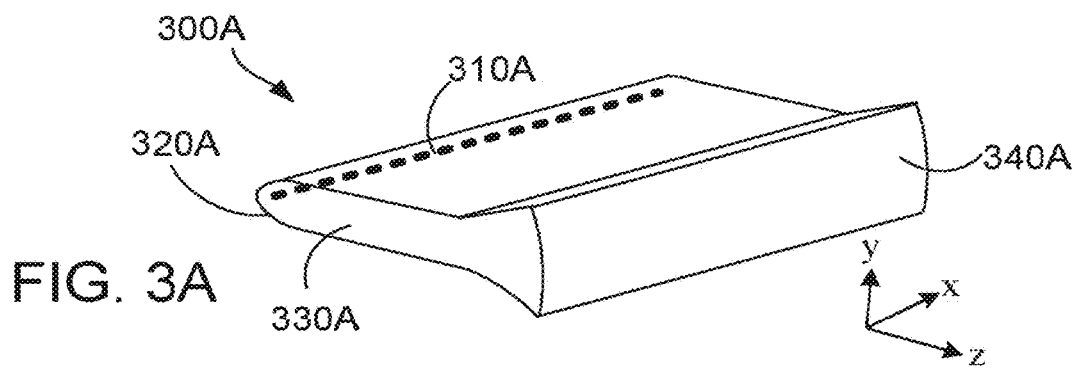
FIGS. 3A-3C show perspective views of straight and curved lighting units that can be used in the vehicle headlight from FIG. 2.
Figure 3B:
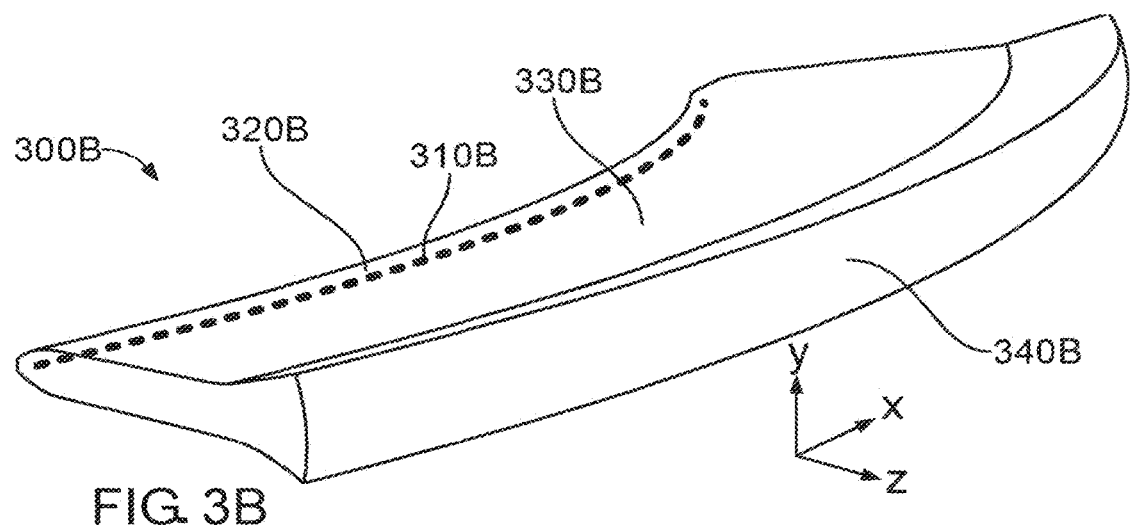
Figure 3C:
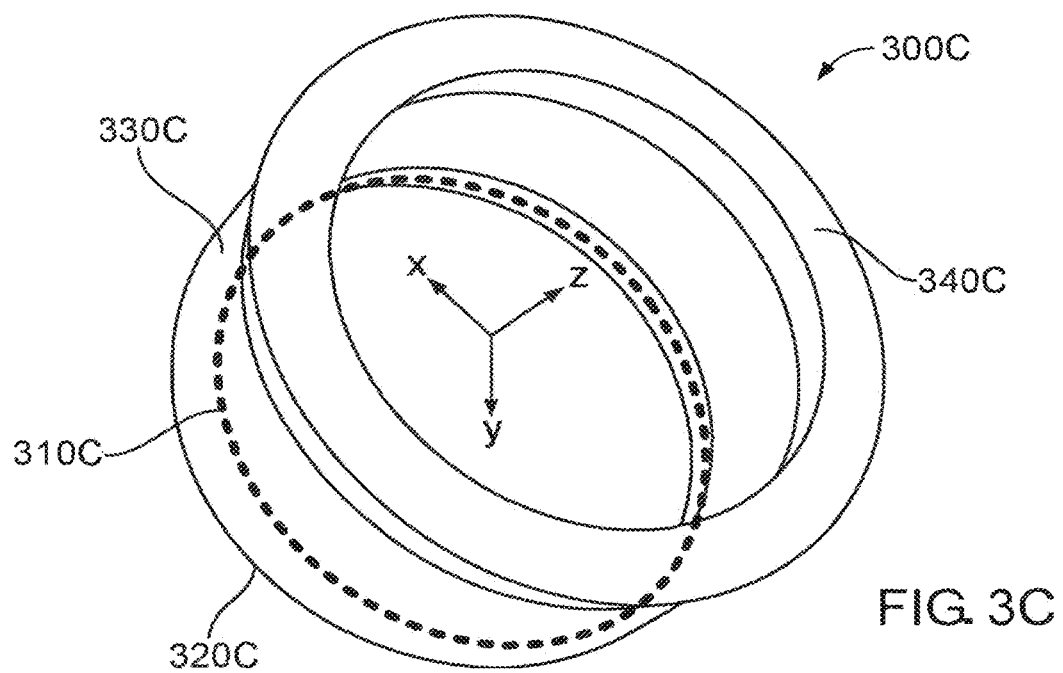

In the examples illustrated in FIGS. 3A, 3B and 3C, the lighting units 300 are light guide modules (e.g., 300A, 300B, 300C), each of which including one or more LEEs 310 (e.g., 310A, 310B, 310C), one or more couplers 320 (e.g., 320A, 320B, 320C), a light guide 330 (e.g., 330A, 330B, 330C) and an extractor 340 (e.g., 340A, 340B, 340C). The lighting units 300 can have an elongate shape along which LEEs 310 may be arranged. Light from the LEEs 310 is coupled using suitable optical couplers 320 into an edge of a light guide 330. The light guide 330 is configured to propagate light via total internal reflection to a distal edge of the light guide, which is coupled with an extractor 340. The extractor 340 is configured like the light-shaping element 540, 640 described below in connection with FIGS. 5A-5C and 6A-6F. The LEEs 310 can include various types of light sources such as light-emitting diodes, lasers, pumped phosphor or other light sources in die, package, integrated system or other format, for example.

The elongate shape of the lighting unit 300 can be straight, e.g., lighting unit 300A shown in FIG. 3A, or curved, e.g., lighting units 300B, 300C shown in FIGS. 3B-3C. The curved elongate lighting units, e.g., 300B, 300C, may be configured to follow a particular trim or design. Designs can be used to convey brand identity of a vehicle. For example, FIG. 3B illustrates an example of a curved elongate lighting unit 300B, and FIG. 3C illustrates an example of a toroidal lighting unit 300C. Note that the lighting unit 300B and the lighting unit 300C may be considered rolled up versions of the straight lighting unit 300A illustrated in FIG. 3A. In these examples, both curved lighting units 300B, 300C have constant profiles along their length/revolution.

A vehicle headlight, e.g., 20, can include one or multiple separate lighting units, e.g., 300, with each lighting unit being configured to provide one dedicated lighting function or multiple lighting functions. Lighting units may have straight or curved shapes, and may be elongate or otherwise. A lighting unit may have a like or varying profile along an elongation. For example, an extractor 340, a light guide 330, a coupler 320, circuit boards, light sources as described herein or other portions of a lighting unit, e.g., 300, may change in profile irrespective of whether the lighting unit is straight or curved along its elongation/length.

The lighting units 300 include a specific type of extractor described below in connection with FIGS. 5A-5C, and 6A-6F. Other example lighting units may have other extractors, for example a reverse extractor 240 with or without tertiary reflectors 860 as described below in connection with FIGS. 16A-16C and 17A-17B. Example lighting units as illustrated in FIGS. 3A-3B may be configured for exterior and interior automotive lighting, for example as running lights, taillights, backup lights or other vehicle lights. Example lighting units as illustrated in FIG. 3C may be configured to provide high beam lighting, low beam lighting or other exterior or interior automotive lighting, for example.

A curved lighting unit may be configured to provide one or more lighting functions, for example high beam, low beam, running light, corner light or other lighting functions. It may be integrally formed along its length or assembled from discrete portions. Different portions of a curved elongate lighting unit, whether integral or discrete, may be configured to provide different lighting functions. Adequate shapes can aid to provide suitable beam steering in different directions from different portions of the curved lighting unit to enable multiple lighting functions in one lighting unit.

Lighting units 300 can be arranged in multiple ways to form a complete vehicle headlight 20. For example, some lighting units can be stacked vertically and/or horizontally or arranged in other ways. Multiple lighting units may be arranged together in tight or loose arrays of two, just a few or up to several hundred or more lighting units of like or different configurations and sizes. The latter, for example may include bunches of suitably terminated light guides and/or optical fibers with ends and/or extractors that are durably arranged to emit light in predetermined directions from the respective exit apertures of the lighting units. Systems of lighting units with such light guide/fiber arrays may be fed with light from multiple LEEs that may be separately controllable in groups to allow illumination of specific solid angles depending on which lighting units are activated.

The LEEs 310 can be arranged on planar or curved arrangements in one or more rows or groups on one or more substrates or directly in the input apertures of one or more couplers 320, for example. Substrates of different lighting units 300 can be arranged in a planar, coplanar or tilted arrangement.

Figure 4A:
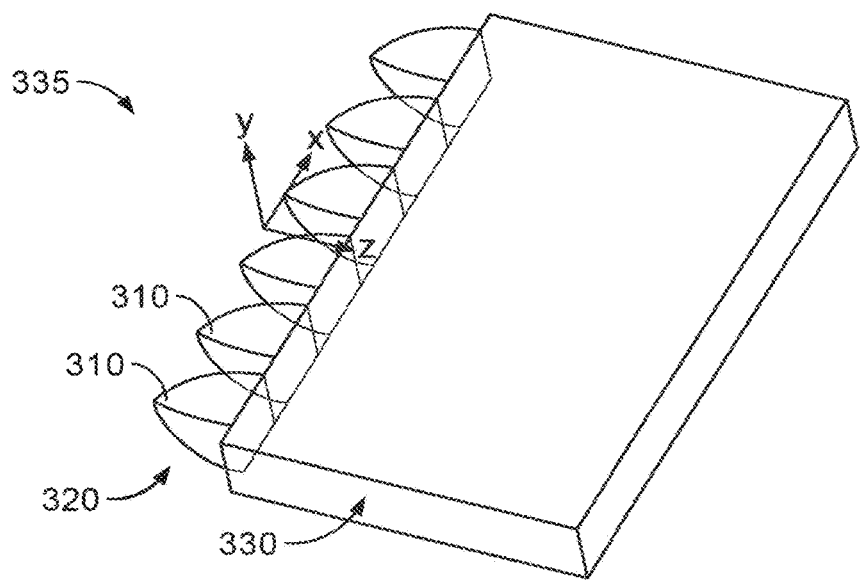
FIG. 4A shows a perspective view of a coupler-light guide assembly of an example lighting unit of a vehicle headlight according to an embodiment of the present technology.

FIG. 4A shows a perspective view of an example coupler-light guide assembly 335 that can be used in lighting units 300 (e.g., 300A, 300B, 300C) of a vehicle headlight. The coupler-light guide assembly 335 includes multiple, e.g., six, light-emitting elements 310 (LEEs.) In some embodiments, the LEEs 310 can be laser pumped phosphor plates with dimensions of 0.3 mm×0.3 mm. Other embodiments may employ suitable LED dies instead. In the example illustrated in FIG. 4A, each phosphor plate 310 is configured to emit 250 lm and the emission pattern to be assumed is uniform Lambertian over the phosphor plate. The coupler-light guide assembly 335 can be implemented as a scaled version of a portion of the light guide module 200, which is miniaturized to fit the phosphor plates. The scale of a respective lighting unit is approximately ⅓ of the example luminaire module for a wall washer referred to in FIGS. 5A-5C and 6A-6F.

The example coupler-light guide assembly 335 includes an array of six couplers 320, each having a square entrance aperture of 0.32 mm by 0.32 mm. Note that larger apertures may allow for more play relative to the phosphor plates 310 and hence ease assembly and alignment. Respective manufacturing tolerances, however, can be mitigated with proper miniaturization and fabrication. The couplers 320 are configured to allow for high efficiency up to 90% or higher. Refinement of the coupler input aperture and other performance aspects may yield further improved efficiency. The light guide 330 has a cuboid shape and is 3 mm thick in y-direction and may be immersion coupled or integrally formed with the array of couplers 320. The centers of the phosphor plates 310 and couplers 320 are arranged along a straight line in x-direction.

Figure 4B:
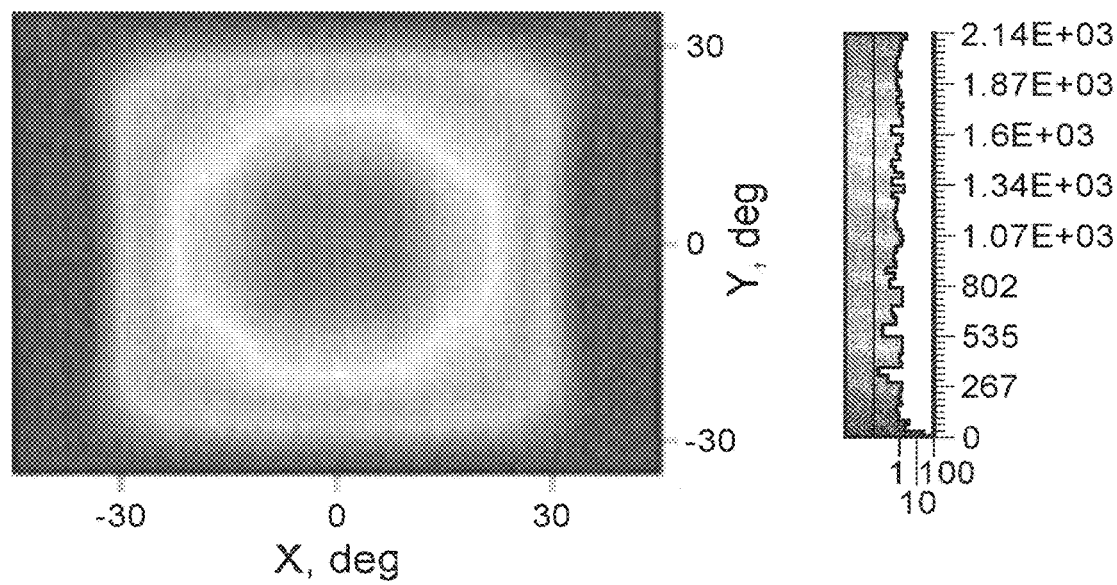
FIG. 4B shows an intensity pattern of light emitted by the coupler-light guide assembly of FIG. 4A.
Figure 4C:
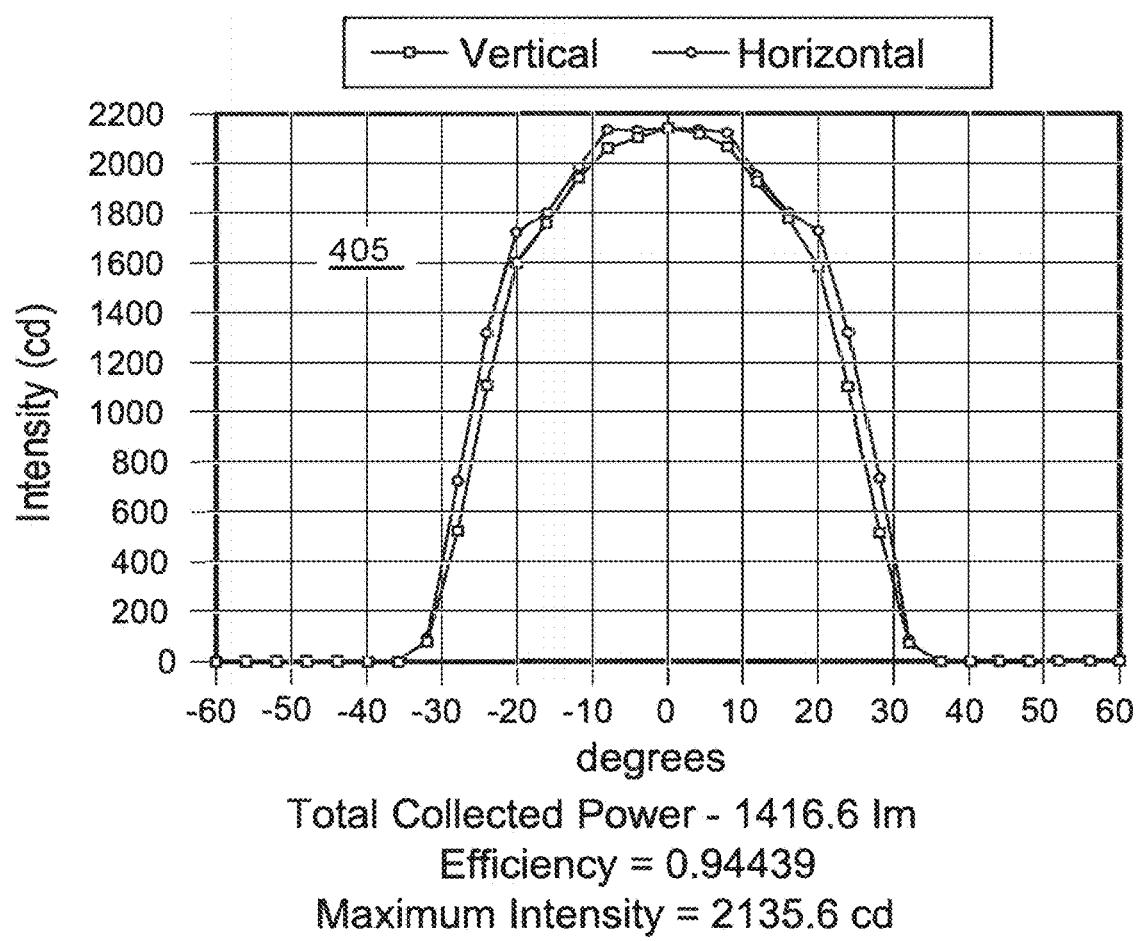
FIG. 4C shows an angular intensity profile for the coupler-light guide assembly of FIG. 4A.

FIG. 4B shows a simulated intensity pattern 402 of light emitted from the coupler-light guide assembly 335. Note that the couplers 320 define the light distribution. The light guide 330 mixes the coupler output but does not modify the angular distribution. FIG. 4C shows a simulated angular intensity profile 405 for the coupler-light guide assembly 335. The vertical and horizontal distributions (e.g., along the y-axis and x-axis respectively) are practically identical. This follows from the square profile of the couplers.

Variations in the length of the light guide 330 (in z-direction) may have little to no effect on the angular distribution of the output light within sectional planes perpendicular to the x-axis also referred to as x-planes. The angular intensity pattern 405 within x-planes through the light guide is defined by the coupler design. The light guide length can affect the flux distribution at the exit face of the light guide at the input aperture of an extractor (to be attached thereon) because of the mixing effect of the light guide within z-planes.

Examples of optical extractors, also referred to as light shaping optical articles, used to shape the light provided at the distal end by coupler light guide assembly 335, are described below.

Figure 5A:
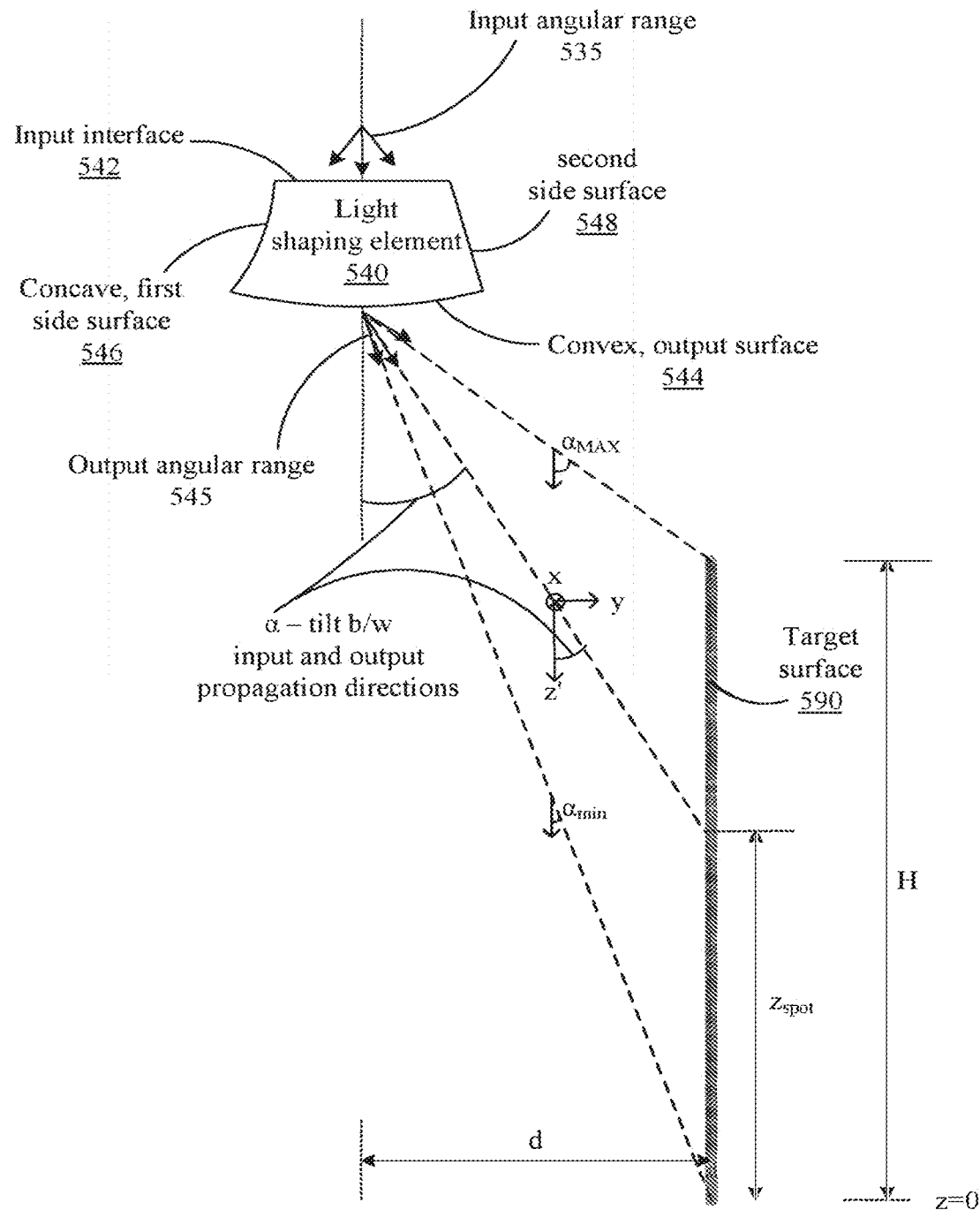
FIGS. 5A-5C show aspects of a light shaping optical article used to shape light provided by the coupler-light guide assembly of FIG. 4A.

FIG. 5A illustrates a block diagram of a light shaping optical article 540 configured to tilt, by a tilt angle α≠0, a prevalent propagation direction of light in an output angular range 545 relative to a prevalent propagation direction of light in an input angular range 535. Here, a reference system (x,y,z) has a z-axis aligned to the prevalent propagation direction of light in input angular range 535. In the example shown in FIG. 5A, a target surface 590 (e.g., the road, when the light shaping optical article is used in a vehicle light, or the wall, when the light shaping optical article is used in a wall wash luminaire) also is aligned parallel to the z-axis. However, the prevalent propagation direction of light in input angular range 535 can, but does not have to, be parallel to the target surface 590.

The light shaping optical article 540 is formed from a solid, transparent material (with n>1). For example, the solid, transparent material can be glass with a refractive index of about 1.5. As another example, the solid, transparent material can be plastic with a refractive index of about 1.5-1.6.

The light shaping optical article 540 includes an input surface 542 through which input light with the input angular range 535 enters into the light shaping optical article 540, and an output surface 544 through which output light with the output angular range 545 exits from the light shaping optical article 540. Further, the light shaping optical article 540 has a first side surface 546 and a second side surface 548. The first side surface 546 is concave and the output surface 544 is convex. The second side surface 548 of the light shaping optical article 540 can have negative, zero or positive curvature. Additionally, the concave first side surface 546 and convex output surface 544 are configured such that the prevalent propagation direction of light in output angular range 545 is tilted by the tilt angle α toward the second side surface 548 relative to prevalent propagation direction of light in the input angular range 535. In this manner, a is a tilt of the prevalent propagation direction of output angular range 545 relative to the z-axis.

Figure 5B:
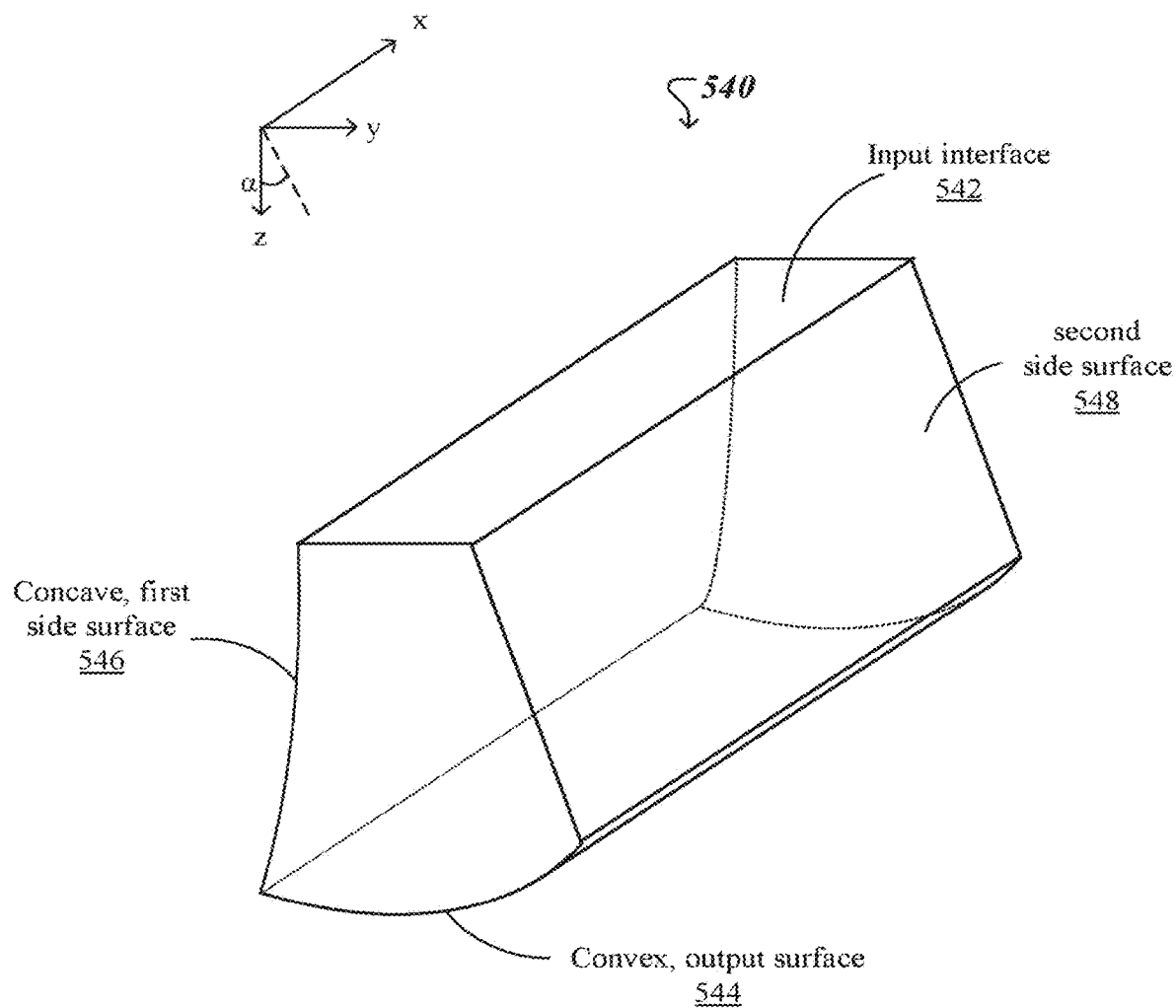

FIG. 5B shows that the light shaping optical article 540 is elongated along the x-axis. In this manner, input angular range 535 and output angular range 545 can be the same in the (z-x) plane while ignoring refraction at the output surface. An input interface corresponding to the input surface 542 represents an extended light source (e.g., the phosphor plates 310). In implementations in which the input surface 542 of the light shaping optical article 540 is coupled to an output end of a light guide (as it is in the cases illustrated in FIGS. 3A-3B, 6A-6B and 13A), a prevalent propagation direction of the input angular range 535 can be parallel to the light guide.

A divergence of the input angular range 535 in a (y-z) plane (a plane perpendicular to the x-axis) can be that of a Lambertian or narrower distribution, for example. As another example, a distribution of light within the input angular range 535 in the (y-z) plane can also have more than one peak. For solid light guides, the divergence of the input angular range is typically narrow enough to allow all light to be guided within the light guide via total internal reflection (TIR). Depending on the implementation, a lateral distribution of light within the input angular range 535 in the (x-z) plane (e.g., parallel to the x-axis) can be shaped similarly to the distribution of light within the input angular range 535 in the (y-z) plane. In some implementations, such a lateral distribution can have a bat-wing profile with multiple lobes, for example. Divergence in the (x-z) plane of the output angular range 545 is determined by the divergence of the input angular range 535, and may be affected by the refractive indices at and the curvatures and arrangements of surfaces 544, 546 and 548, for example.

Figure 5C:
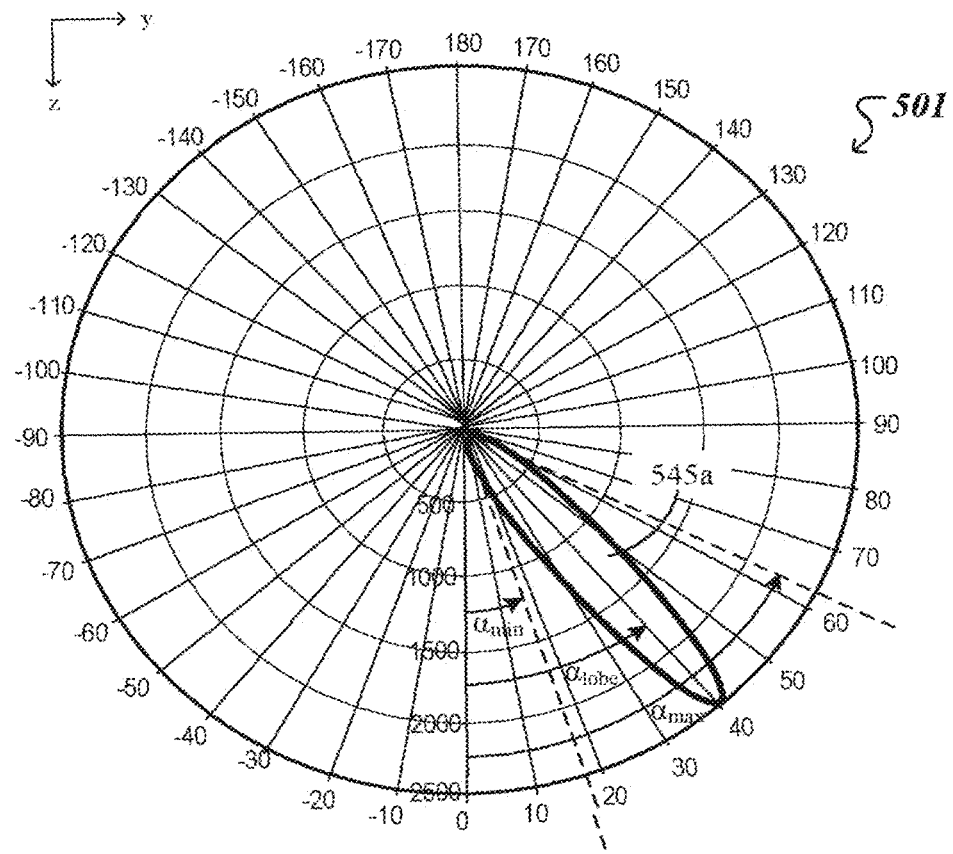

FIG. 5C shows a light intensity distribution 501 of the light output by the light shaping optical article 540 in the (y-z) plane. Here, the z-axis is aligned along the prevalent propagation direction of light in the input angular range 535. A lobe 545a of the light intensity distribution 501 represents the light output by the light shaping optical article 540 in the output angular range 545. A bisector of the lobe 545a corresponds to the prevalent propagation direction of light of the output angular range 545. Here, the bisector of the lobe 545a is tilted by a tilt angle α=αlobe relative to the z-axis, and a value of αlobe is about 40°. In other implementations, the value of αlobe can be different, for example about 5, 10, 30 or 50°. A width at half-max of the lobe 545a corresponds to the divergence of light of the output angular range 545.

Here, the width at half-max of the lobe 545a has a value of about 20°. In other implementations, the value of the width at half-max of the lobe 545a can be about 5, 10 or 30°. Angles $\alpha_{min}$ and $\alpha_{max}$ define an angular interval outside of which the light intensity drops to less than 5% from the peak intensity value of the lobe 545a.

Once the tilt α, divergence (e.g., the width of lobe 545a of the light intensity distribution 501) of output angular range 545 and the corresponding intensity distribution are specified through design of the light shaping optical article 540, a distance "d"—from an "effective center" of the convex output surface 544 of the light shaping optical article 540 to the target surface 590 of size H—can be varied to control uniformity of the illuminance on the target surface. As noted, this can be defined for example as $I_{MAX}/I_{min}$ below a maximum value N: $1<I_{MAX}/I_{min}<N$, over the entire size H of target surface 590.

Depending on the embodiment, parameters d, a and the divergence of the output angular range 545 may determine a distance, denoted $z_{spot}$, on the target surface 590 relative a datum (e.g., z=0) where the prevalent direction of propagation (denoted in dashed-line) of the output angular range 545 intersects the target surface 590, for example. Simulation results show that the intersection point at $z_{spot}$ can correspond to maximum intensity $I_{MAX}$ of the output light on the target surface 590, and intersections of outer rays of the output angular range 545—tilted respectively at $\alpha_{min}$ and $\alpha_{MAX}$ relative to the z-axis—can correspond to minimum intensity $I_{min}$ of the output light on the target surface 590.

It is noted that, in general, to control divergence and prevalent propagation direction of the output angular range 545, the shape of the concave first side surface 546 is such that a small element of the noted surface accepts incoming rays from within a narrow angular range only (to allow that surface element to be exposed to fewer impinging rays and thereby have more control to redirect the impinging rays). This can require large lengths of the noted surface (in forward direction, e.g., along z-axis) or, shallow incidence angles (corresponding to a small divergence of the input angular range 535.) As such, light impinging on the concave first side surface 546 reaches the convex output surface 544 directly rather than being redirected first to the second side surface 548. Also, the second side surface 548 is shaped and arranged to receive relatively little light from the extended source corresponding to the input interface formed by input surface 542. For these reasons, the second side surface 548 plays a limited role in controlling divergence and prevalent propagation direction of the output angular range 545 and the corresponding intensity distribution.

In this manner, the divergence and propagation direction of light in the output angular range 545 can be determined largely by a combination of (i) an optical power of the concave first side surface 546, (ii) an optical power of the convex output surface 544 and (iii) relative arrangements between the convex output surface 544 and each of the z-axis and the concave first side surface 546. The specific shapes of the respective surfaces can influence the intensity distribution and thereby affect the degree of uniformity of the illuminance on the target surface.

Figure 6A:
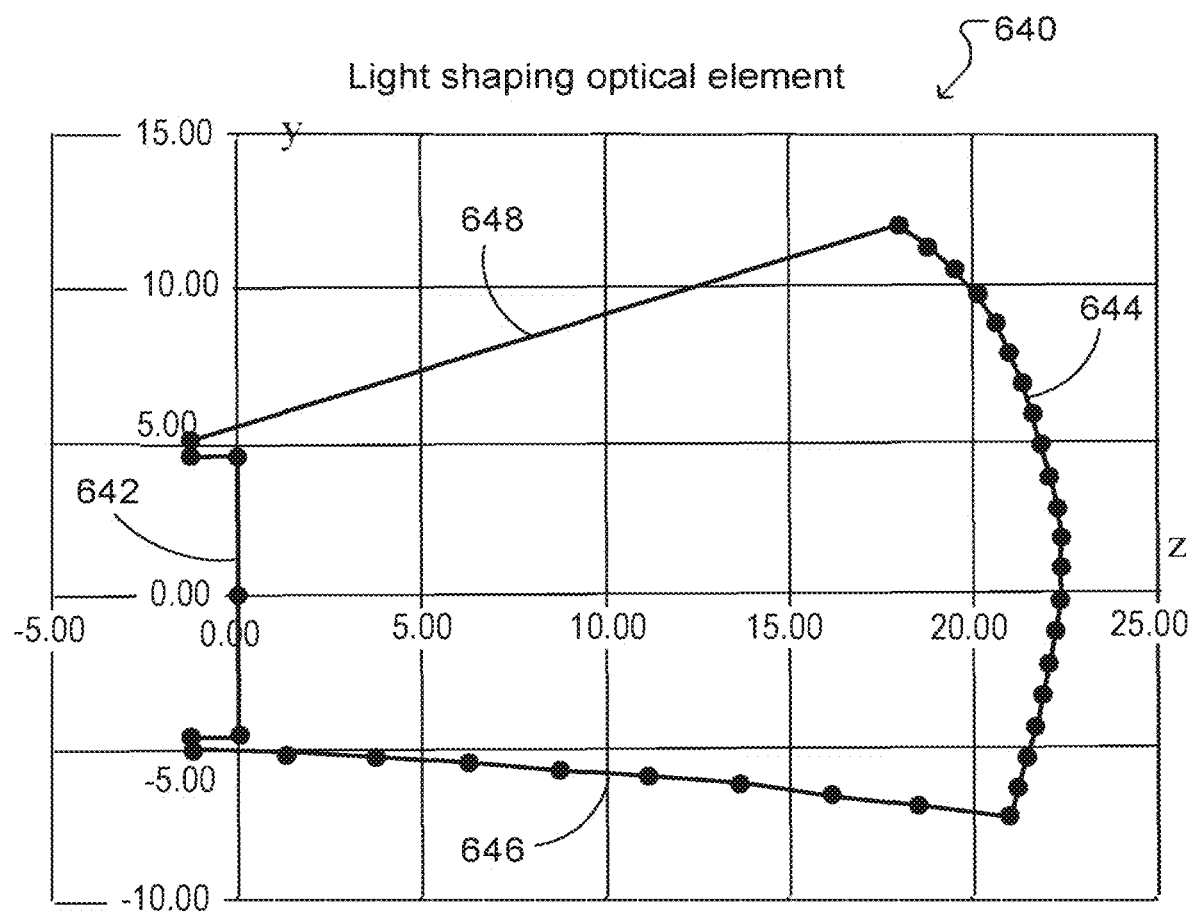
FIGS. 6A-6F show aspects of a light shaping optical article according to an embodiment of the present technology.

An example implementation of the light shaping optical article 540 is described next. FIG. 6A is a cross-section in the (y-z) plane of an example of a light shaping optical article 640. The light shaping optical article 640 is formed from a solid material (with refractive index n>1). For example, the material can be glass with a refractive index of about 1.5. As another example, the material can be plastic with a refractive index of about 1.5-1.6. The light shaping optical article 640 includes an input surface 642, an output surface 644, a first side surface 646 and a second side surface 648.

Figure 6B:
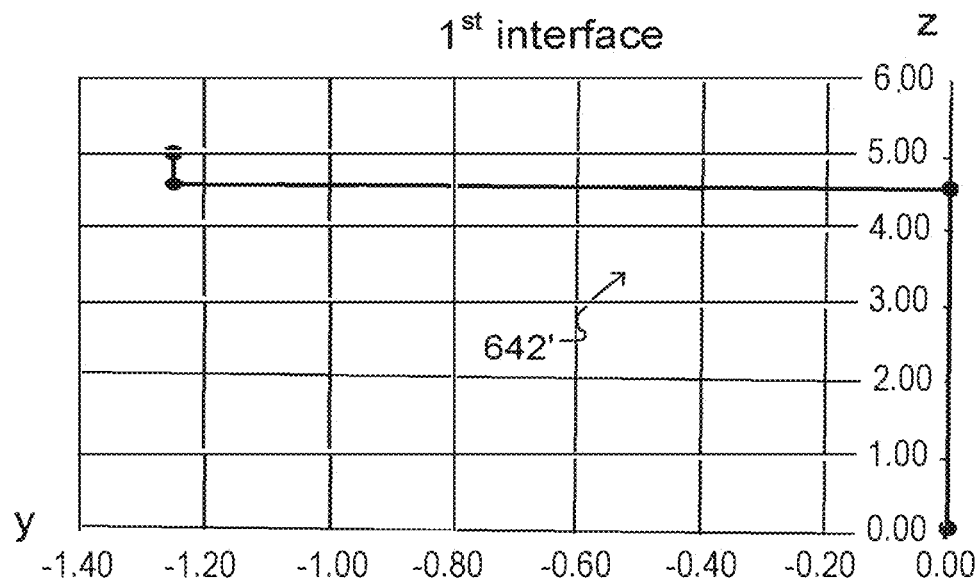

The input surface 642 is formed from a first interface 642' (referred to as the 1st interface), which is represented above the z-axis in this example, and a second interface 642" (referred to as the 2nd interface), which is represented below the z-axis in this example. FIG. 6B is a cross-section in the (y-z) plane of the 1st interface 642'—the z and y axes have different scaling. Coordinates of a polyline corresponding to the 1st interface 642' are given in Table 1.

TABLE 1

| 1st interface 642' | | |
|---|---|---|
| Point | z (mm) | y (mm) |
| 1 | 0 | 0 |
| 2 | 0 | 4.57 |
| 3 | −1.25 | 4.57 |
| 4 | −1.25 | 5 |

Figure 6C:
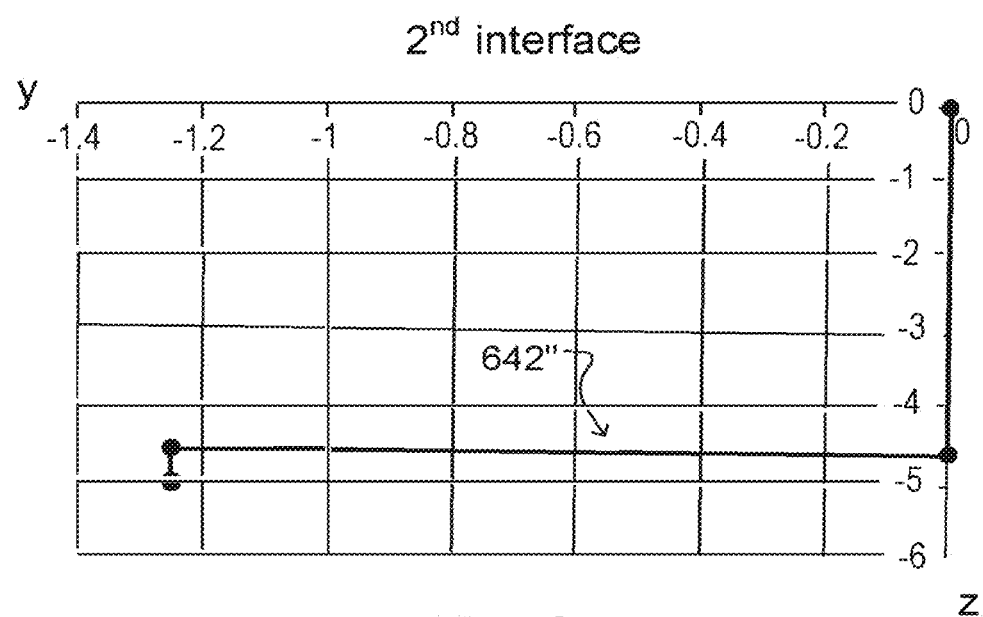

FIG. 6C is a cross-section in the (y-z) plane of the 2nd interface 642"—again, the z and y axes have different scaling. Coordinates of a polyline corresponding to the 2nd interface 642" are given in Table 2.

TABLE 2

| 2nd interface 642" | | |
|---|---|---|
| Point | z (mm) | y (mm) |
| 1 | −1.25 | −5 |
| 2 | −1.25 | −4.57 |
| 3 | 0 | −4.57 |
| 4 | 0 | 0 |

The input surface 642 of the light shaping optical article 640 can be bonded to an output end of a light guide as described below in connection with FIGS. 6G-6H, for instance. In such case, an anti-reflective coating may be disposed between the output end of the light guide and light shaping optical article 640. If the material of the light shaping optical article 640 is different from the material from which the light guide is formed, for example an index-matching layer may be disposed between the output end of the light guide and light shaping optical article 640. In other cases, the light guide and the light shaping optical article 640 can be integrally formed.

Figure 6D:
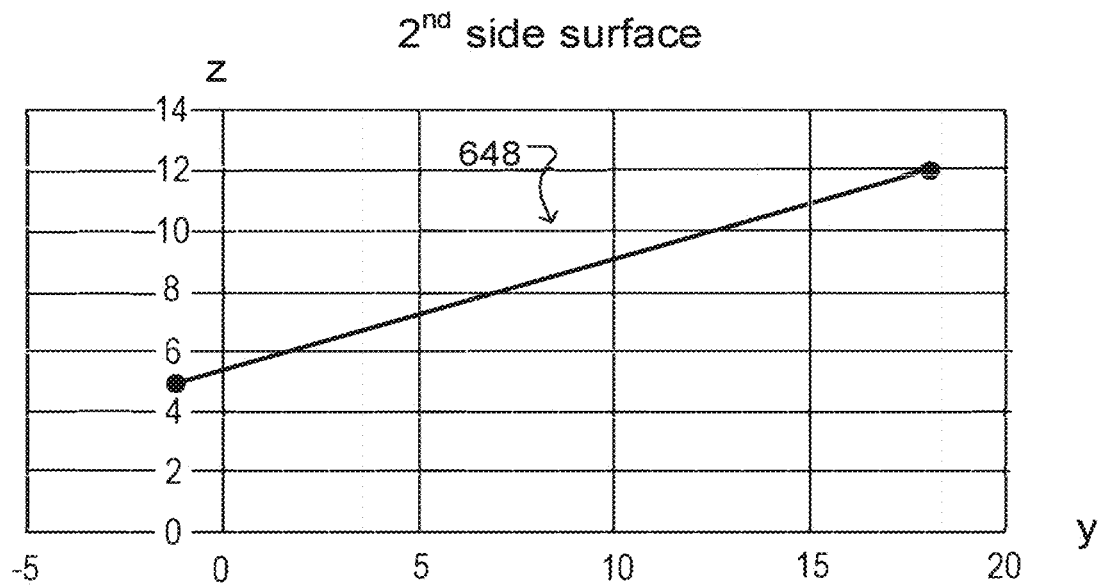

FIG. 6D is a cross-section in the (y-z) plane of the second side surface 648. Coordinates of the section of the second side surface 648 are given in Table 3—the section is a straight line.

TABLE 3

| 2nd side surface 648 | | |
|---|---|---|
| Point | z (mm) | y (mm) |
| 1 | −1.25 | 5 |
| 2 | 18 | 12 |

Here, the second side surface 648 of the light shaping optical article 640 is planar and plays a minor role in determining a tilt angle α relative the z-axis of the propagation direction of light in the output angular range 545 or a divergence of the output angular range 545. In some implementations, the second side surface 648 is uncoated. In such cases, light from the input surface 642 that impinges on the second side surface 648 at angles beyond a critical angle $\theta=\arcsin(1/n)$ relative to the respective surface normal reflects off the second side surface 648 via total internal reflection (TIR). In other implementations, the second side surface 648 is coated with a reflective coating. In such cases, light from the input surface 642 that reaches the second side surface 648 reflects off the second side surface 648 via specular reflection or diffuse reflection or a combination thereof.

Figure 6E:
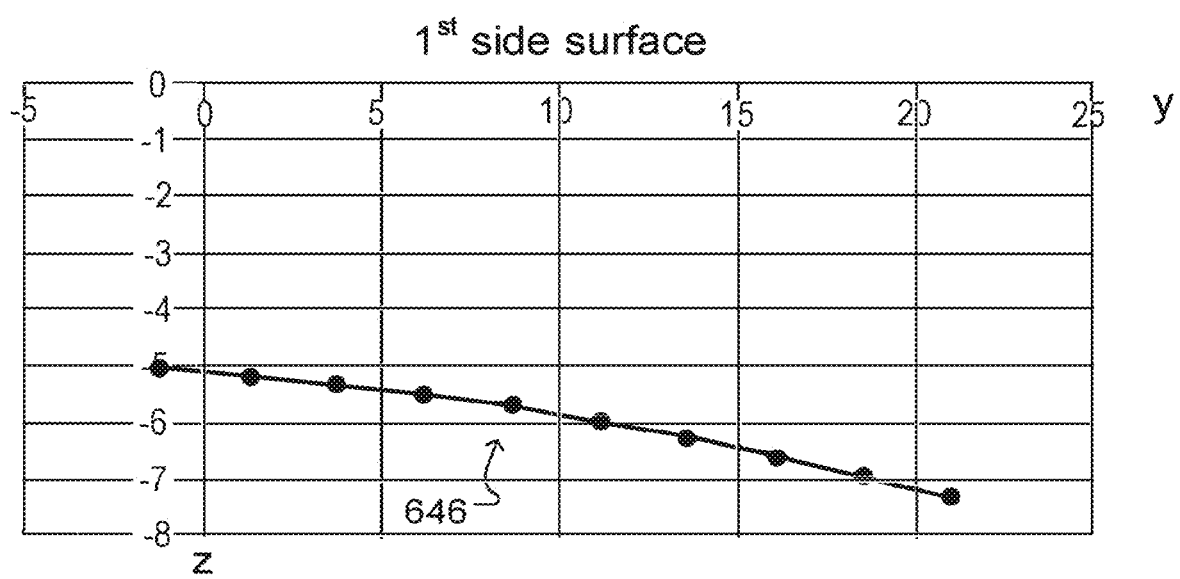

FIG. 6E is a cross-section in the (y-z) plane of the first side surface 646. Coordinates of nodes for a fitted curve, e.g., a spline, corresponding to the first side surface 646 are given in Table 4.

TABLE 4

| | $1^{st}$ side surface 646 | |
|---|---|---|
| Point | z (mm) | y (mm) |
| 1 | 21 | −7.3 |
| 2 | 18.54 | −6.93 |
| 3 | 16.08 | −6.57 |
| 4 | 13.61 | −6.24 |
| 5 | 11.15 | −5.94 |
| 6 | 8.67 | −5.68 |
| 7 | 6.2 | −5.47 |
| 8 | 3.72 | −5.3 |
| 9 | 1.23 | −5.14 |
| 10 | −1.25 | −5 |

Here, the first side surface 646 of the light shaping optical article 640 is concave and, along with the output surface 644, plays a major role in determining the tilt angle α relative to the z-axis of the propagation direction of light in the output angular range 545 and the divergence of the output angular range 545. In some implementations, the concave first side surface 646 is uncoated. In such cases, light from the input surface 642 that impinges on the concave first side surface 646 at angles beyond the critical angle $\theta=\arcsin(1/n)$ reflects off the concave first side surface 646 via total internal reflection (TIR). In other implementations, the concave first side surface 646 is coated with a reflective coating. In such cases, light from the input surface 642 that reaches the concave first side surface 646 reflects off the concave first side surface 646 via specular reflection or diffuse reflection or a combination thereof.

Figure 6F:
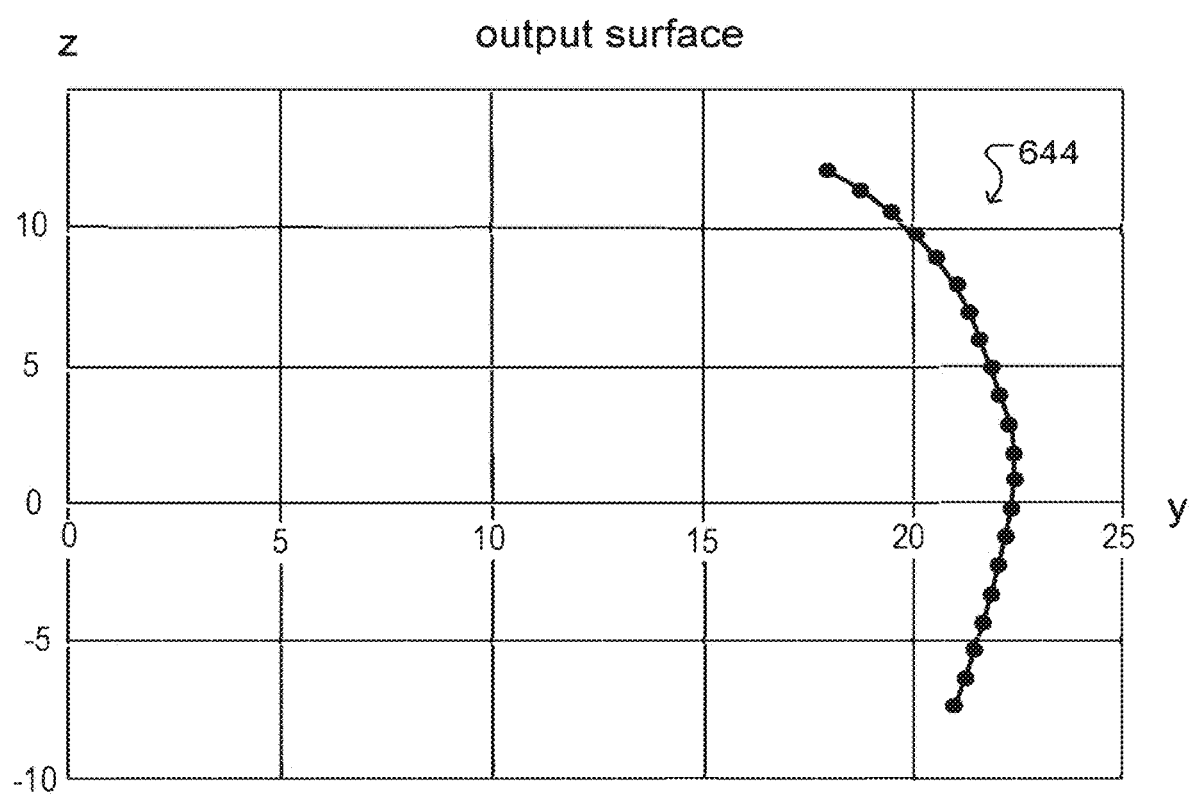

FIG. 6F is a cross-section in the (y-z) plane of the output surface 644. Coordinates of nodes for a fitted curve, e.g., a spline, corresponding to the output surface 644 are given in Table 5.

TABLE 5

| | output surface 644 | |
|---|---|---|
| Point | z (mm) | y (mm) |
| 1 | 18 | 12 |
| 2 | 18.76 | 11.28 |
| 3 | 19.48 | 10.53 |
| 4 | 20.1 | 9.72 |
| 5 | 20.6 | 8.83 |
| 6 | 20.98 | 7.87 |
| 7 | 21.28 | 6.88 |
| 8 | 21.56 | 5.88 |
| 9 | 21.81 | 4.89 |
| 10 | 22.03 | 3.88 |
| 11 | 22.23 | 2.87 |
| 12 | 22.36 | 1.84 |

TABLE 5-continued

| | output surface 644 | |
|---|---|---|
| Point | z (mm) | y (mm) |
| 13 | 22.4 | 0.82 |
| 14 | 22.32 | −0.21 |
| 15 | 22.18 | −1.23 |
| 16 | 22.01 | −2.25 |
| 17 | 21.83 | −3.27 |
| 18 | 21.64 | −4.28 |
| 19 | 21.44 | −5.29 |
| 20 | 21.22 | −6.29 |
| 21 | 21.00 | −7.3 |

Here, the output surface 644 of the light shaping optical article 640 is convex and, along with the concave first side surface 646, plays a major role in determining the tilt angle α relative the z-axis of the propagation direction of light in the output angular range 545 and the divergence of the output angular range 545. In some implementations, the convex output surface 644 is uncoated. In other implementations, an anti-reflective coating may be provided on the convex output surface 644 such that light that reaches the convex output surface 644—directly from the input surface 642 or after reflection off the concave first side surface 646 or the second side surface 648—can transmit with minimal back reflection. In other implementations, the convex output surface 644 is coated with a diffusive coating (e.g., BrightView M PROS TM). In such cases, light from the input surface 642 that reaches the concave first side surface 646 that reaches the convex output surface 644—directly from the input surface 642 or after reflection off the concave first side surface 646 or the second side surface 648—can diffuse upon transmission through the convex output surface 644.

The optical extractor 340 of the lighting unit 300 can be implemented as the light shaping optical article 540 or 640, such that light in the input angular range 535 is provided by solid-state light sources 310 and guided by a light guide 330 of the lighting unit to the input surface 542 or 642 of the light shaping optical article 540 or 640, respectively.

Figure 6G:
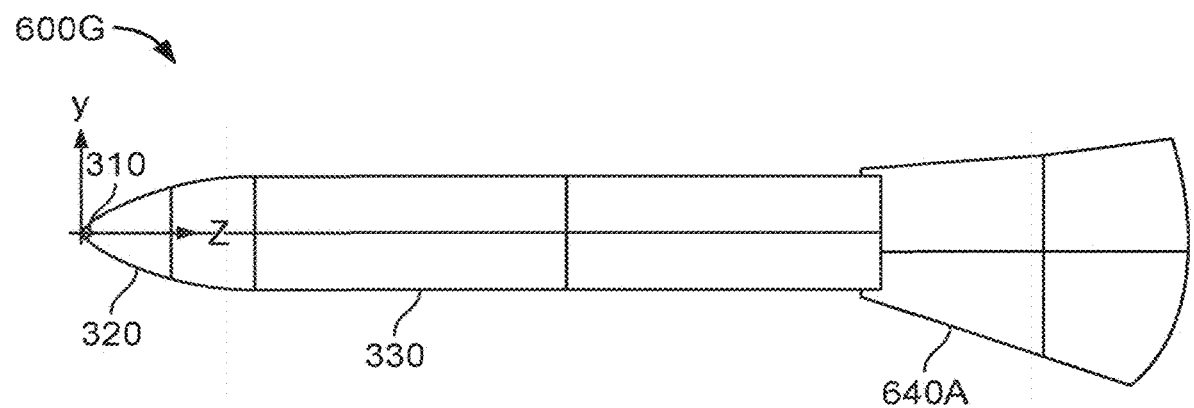
FIGS. 6G-6H show side views of two orientations of a first example of a lighting unit including the coupler-light guide assembly of FIG. 4A and the light shaping optical article of FIGS. 6A-6F.
Figure 6H:
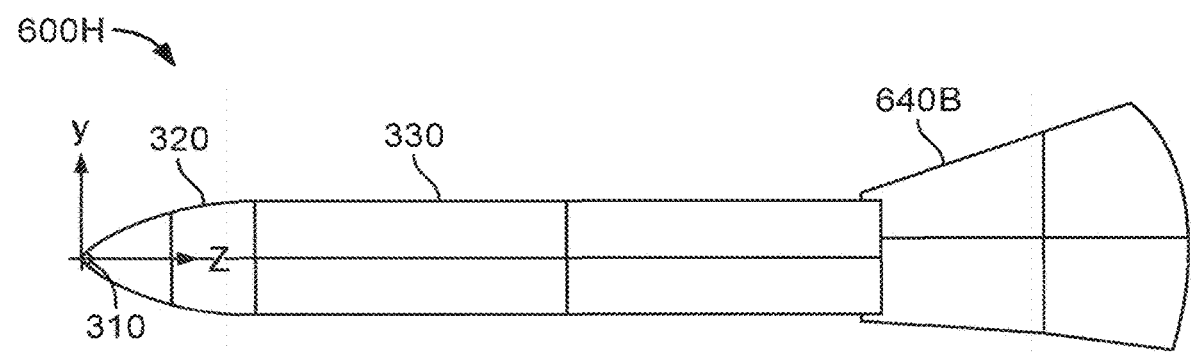

FIGS. 6G and 6H show side views, in the (y,z) plane, of two implementations 600G, 600H, respectively, of a lighting unit that includes the coupler-light guide assembly 335 and the optical article 640 coupled to the light guide 330 in a first orientation 640A and a second orientation 640B, respectively. The two orientations 640A and 640B of the lighting units 600G and 600H shown in respective FIGS. 6A and 6B simply flip the output light distribution along the y-axis.

Figure 7A:
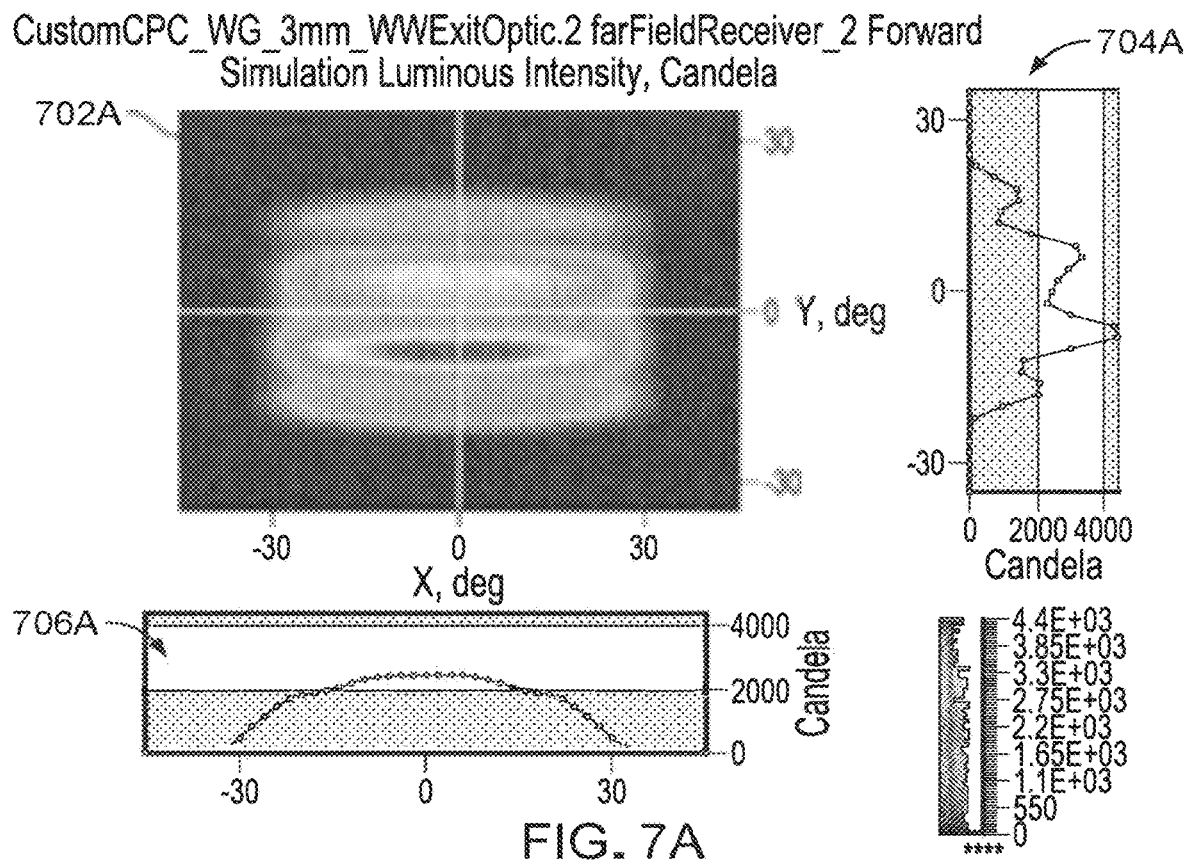
FIGS. 7A-7B show simulated intensity patterns for the two orientations of the first example of a lighting unit.
Figure 7B:
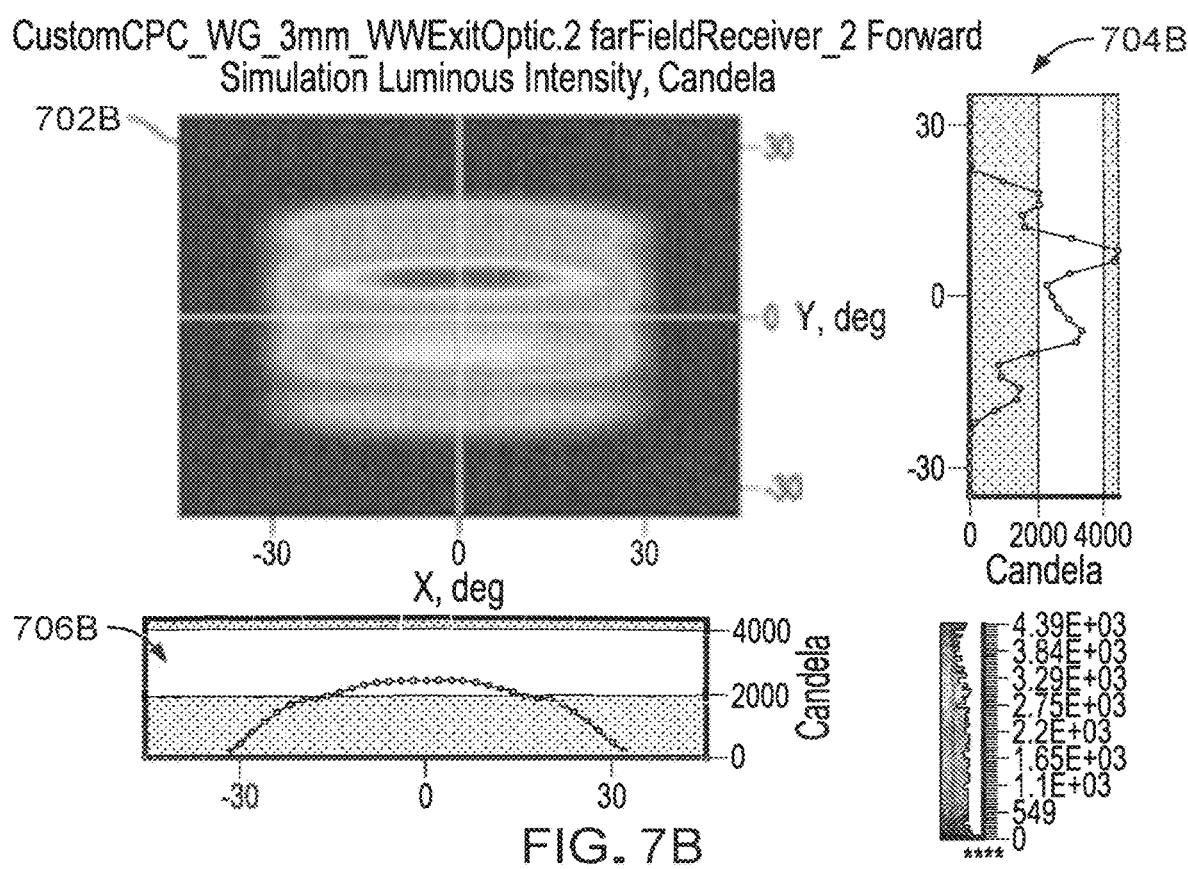
Figure 8A:
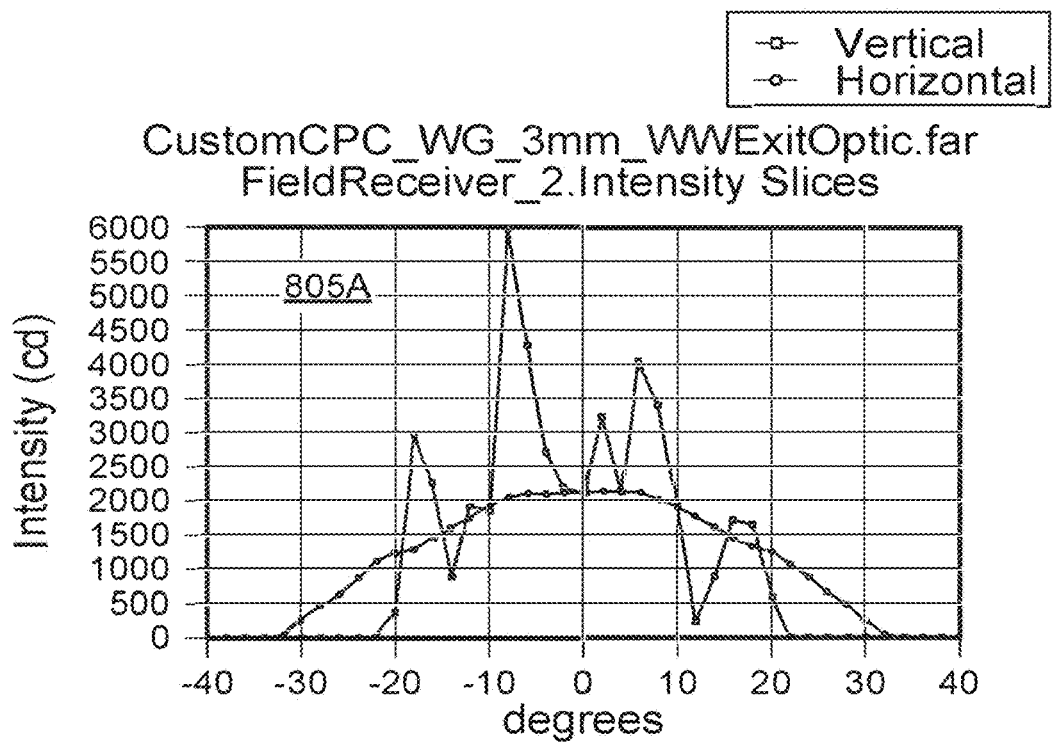
FIGS. 8A-8B show simulated angular intensity profiles for the two orientations of the first example of a lighting unit.
Figure 8B:
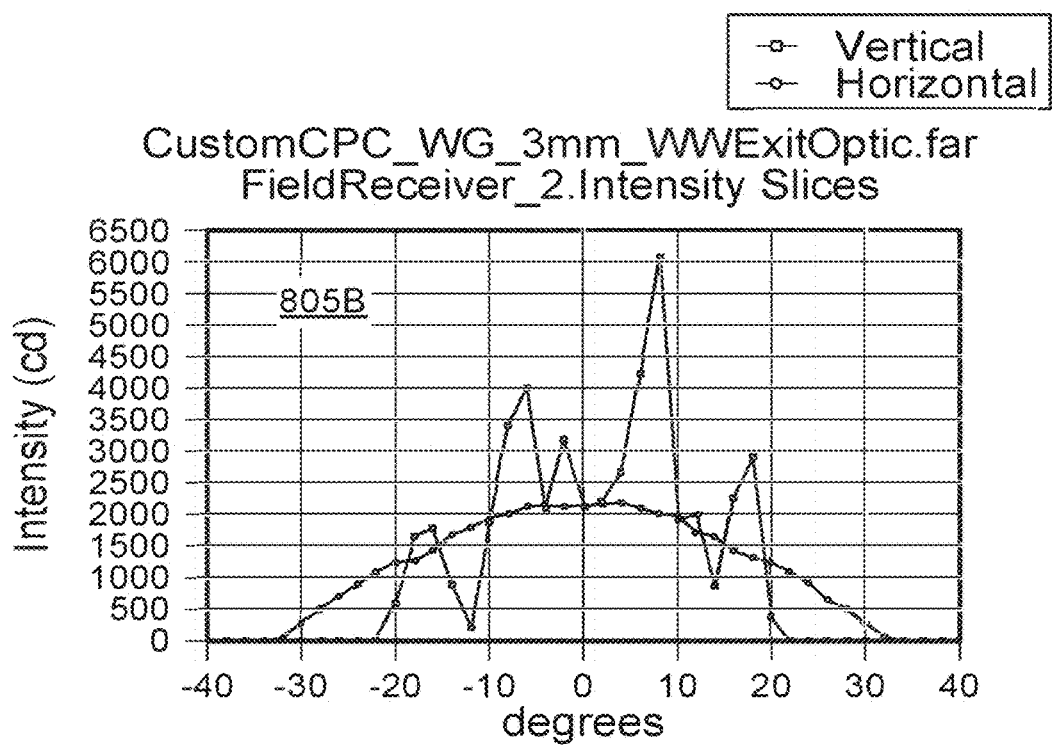
Figure 9A:
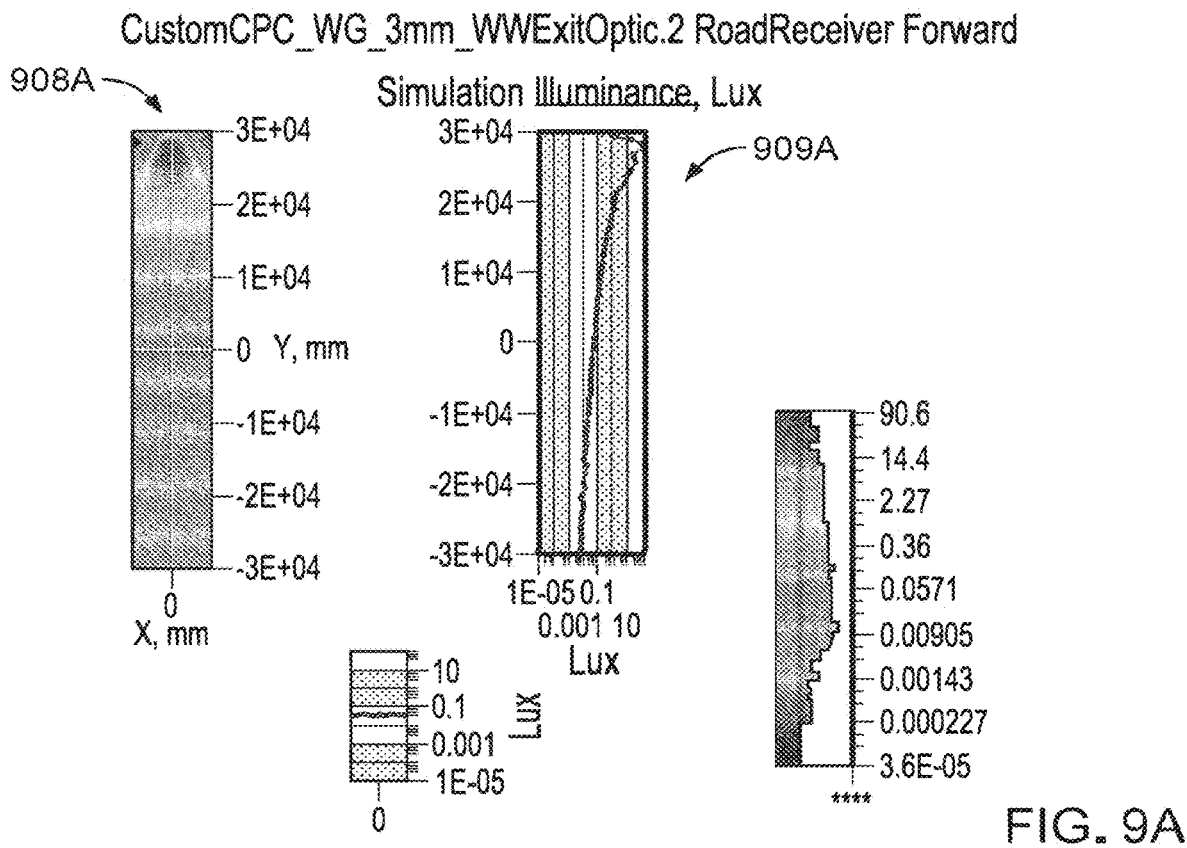
FIGS. 9A-9B show simulated road illuminance profiles for the two orientations of the first example of a lighting unit.
Figure 9B:
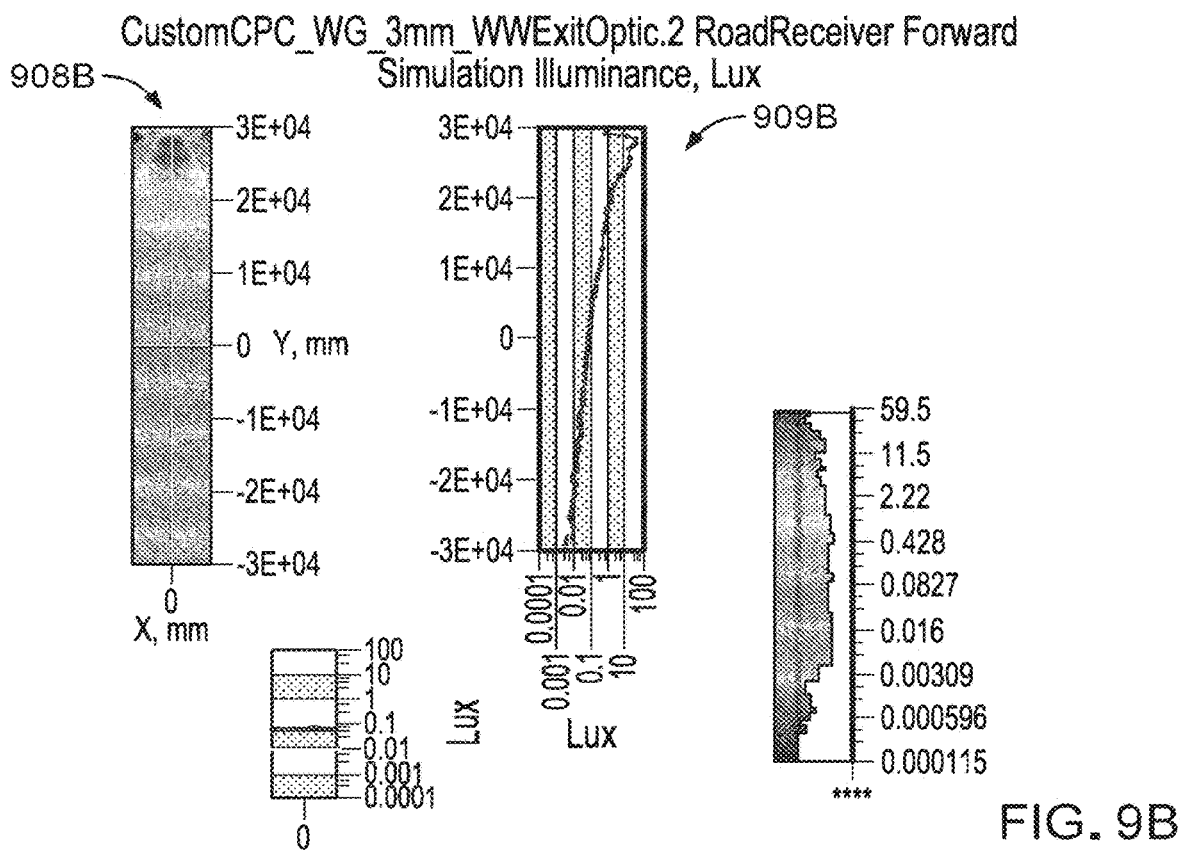

FIGS. 7A and 7B show simulated intensity distributions 702A and 702B for respective orientations 640A and 640B shown in respective FIGS. 6G and 6H. FIG. 7A also shows a cross-section 704A along the y-axis and a cross-section 706A along the x-axis of the intensity distribution 702A. Additionally, FIG. 7B also shows a cross-section 704B along the y-axis and a cross-section 706B along the x-axis of the intensity distribution 702B. FIGS. 8A and 8B show simulated angular distribution profiles 805A and 805B for respective orientations 640A and 640B shown in respective FIGS. 6G and 6H. FIGS. 9A and 9B show road illuminance distributions 908A and 908B for the two orientations 640A and 640B of the lighting units 600G and 600H shown in respective FIGS. 6A and 6B. FIG. 9A also shows a cross-section 909A along the y-axis of the road illuminance distributions 908A. Additionally, FIG. 9B also shows a cross-section 909B along the y-axis of the road illuminance distributions 908B. No diffuser is applied on the output surface 644 of either of the orientations 640A and 640B of the optical article. Here, the road (i.e., the target surface 590) is 10 meters wide and 60 meters long. Here, the lighting unit 600G, 600H is disposed at a distance d=60 cm above the road surface 590, in each of the 640A, 640B orientations. The lighting unit 600G, 600H is oriented horizontally in both cases, such that an optical axis of the lighting unit is parallel to the (x,z) plane.

Figure 10A:
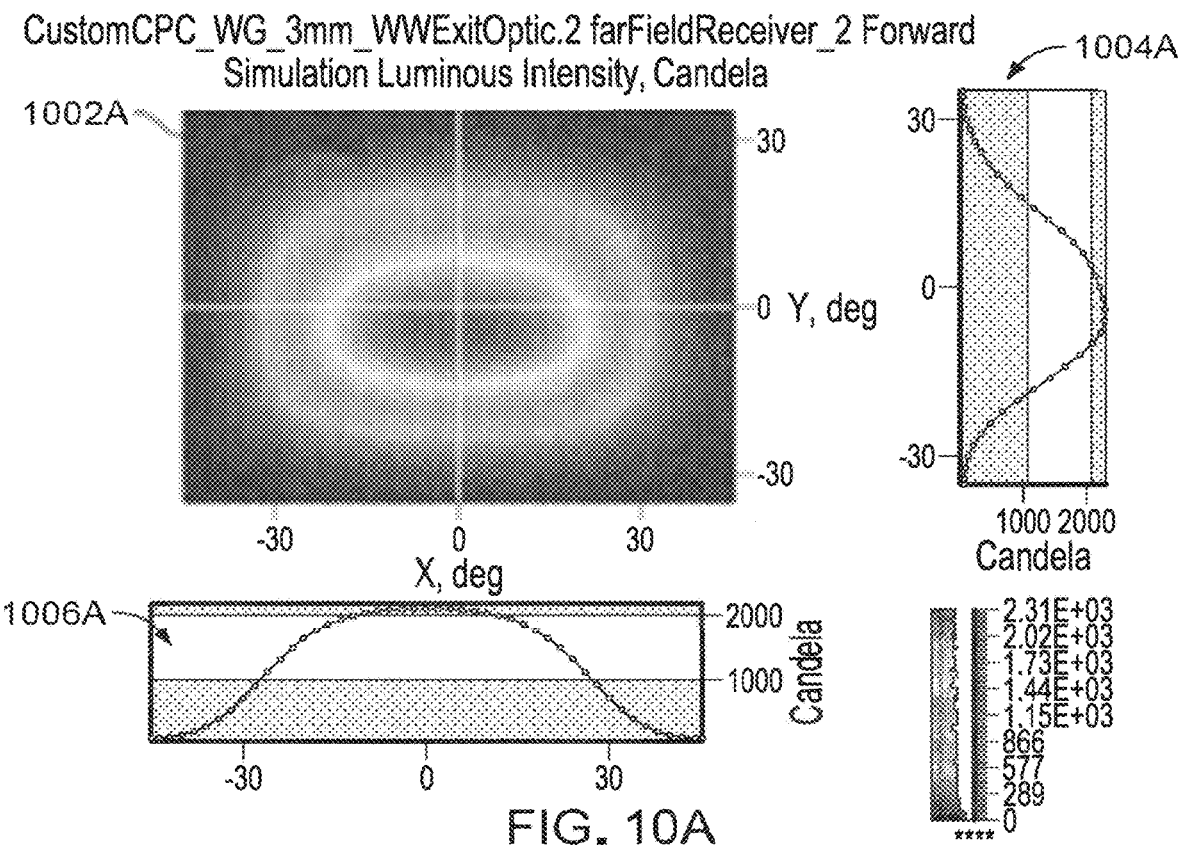
FIGS. 10A-10B show simulated intensity patterns for two orientations of a modification of the first example of a lighting unit.
Figure 10B:
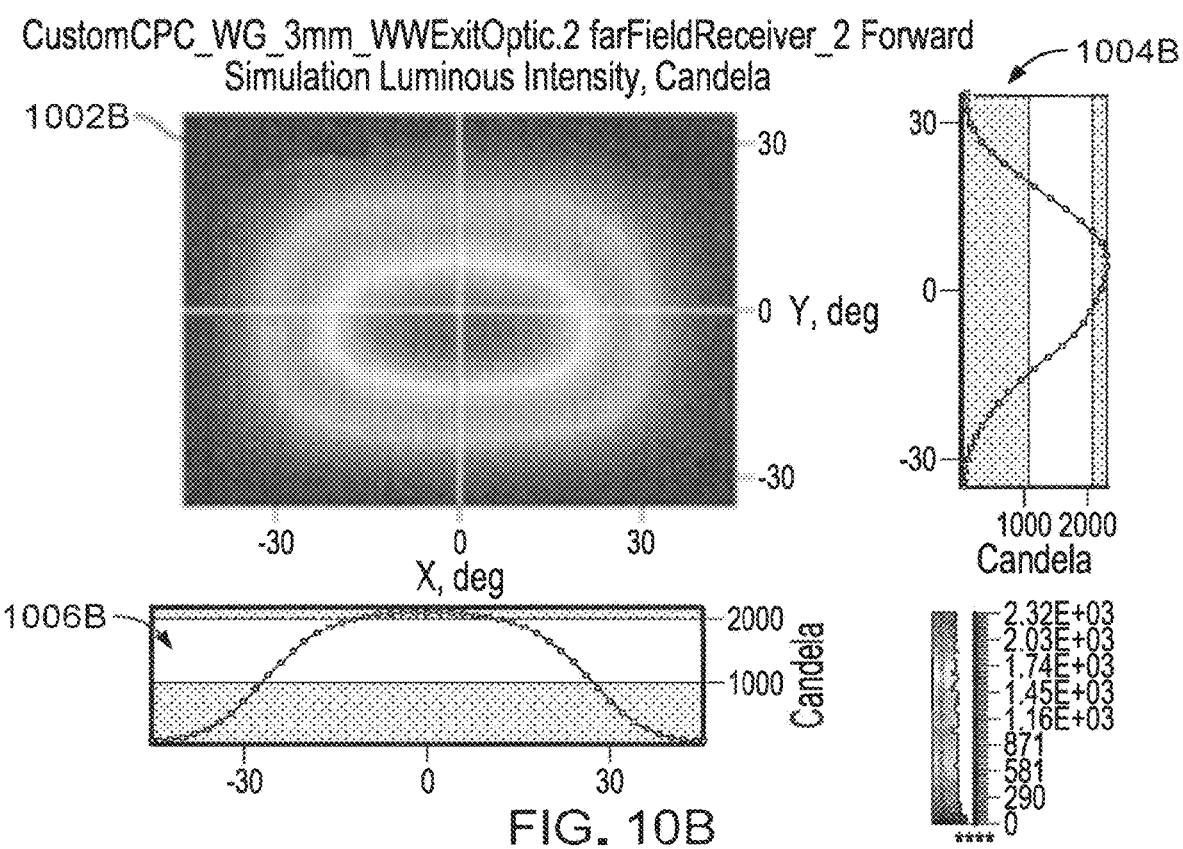
Figure 11A:
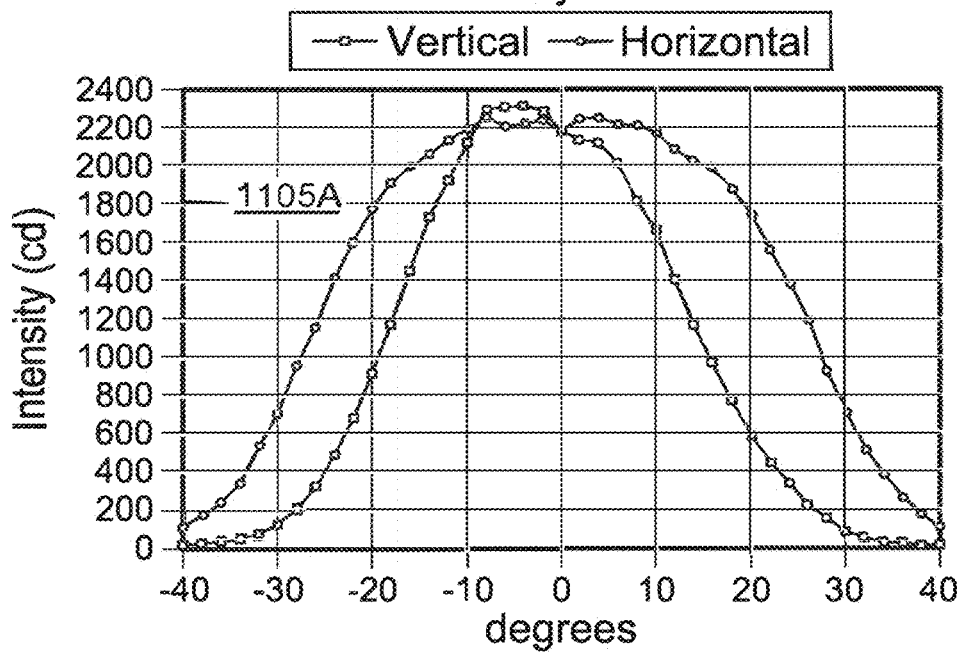
FIGS. 11A-11B show simulated angular intensity profiles for the two orientations of the modification of the first example of a lighting unit.
Figure 11B:
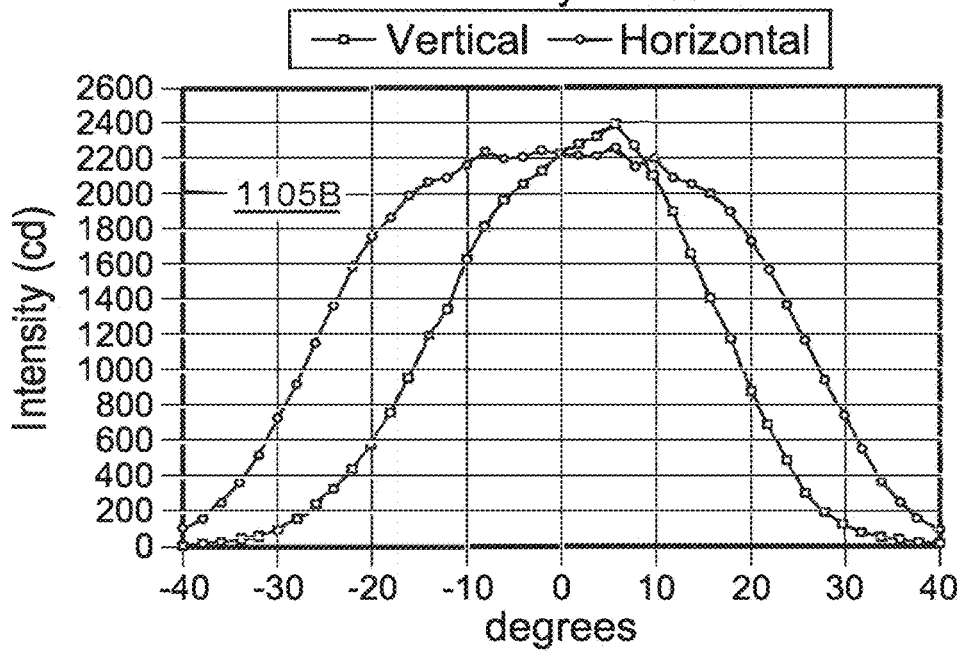
Figure 12A:
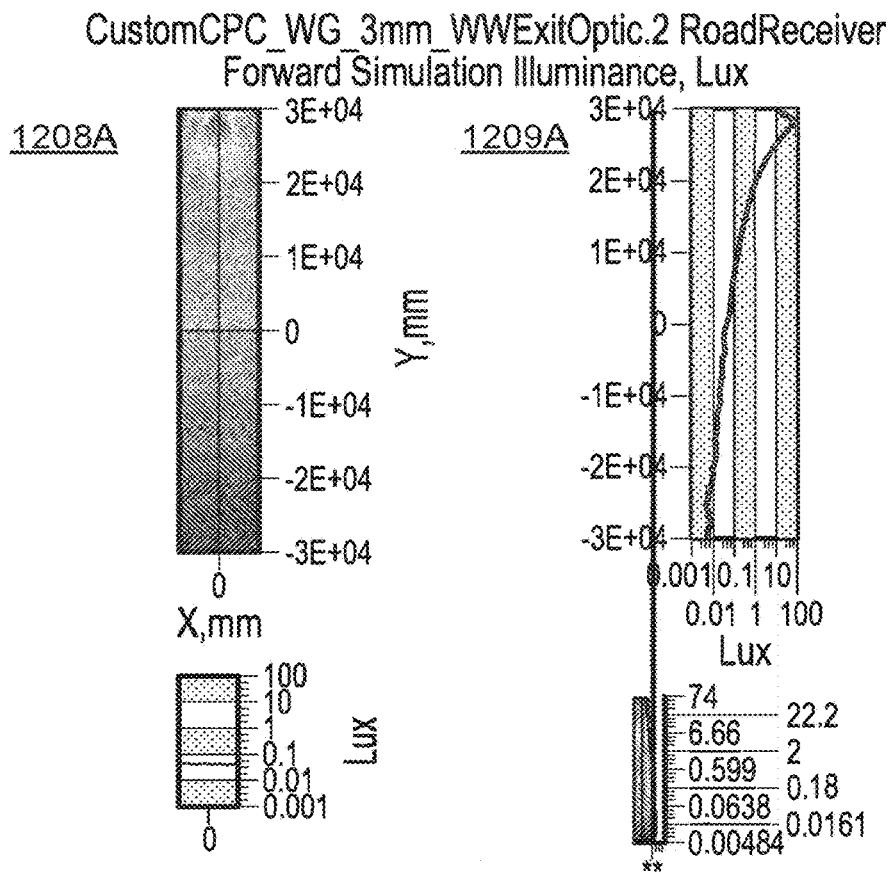
FIGS. 12A-12B show simulated road illuminance profiles for the two orientations of the modification of the first example of a lighting unit.
Figure 12B:
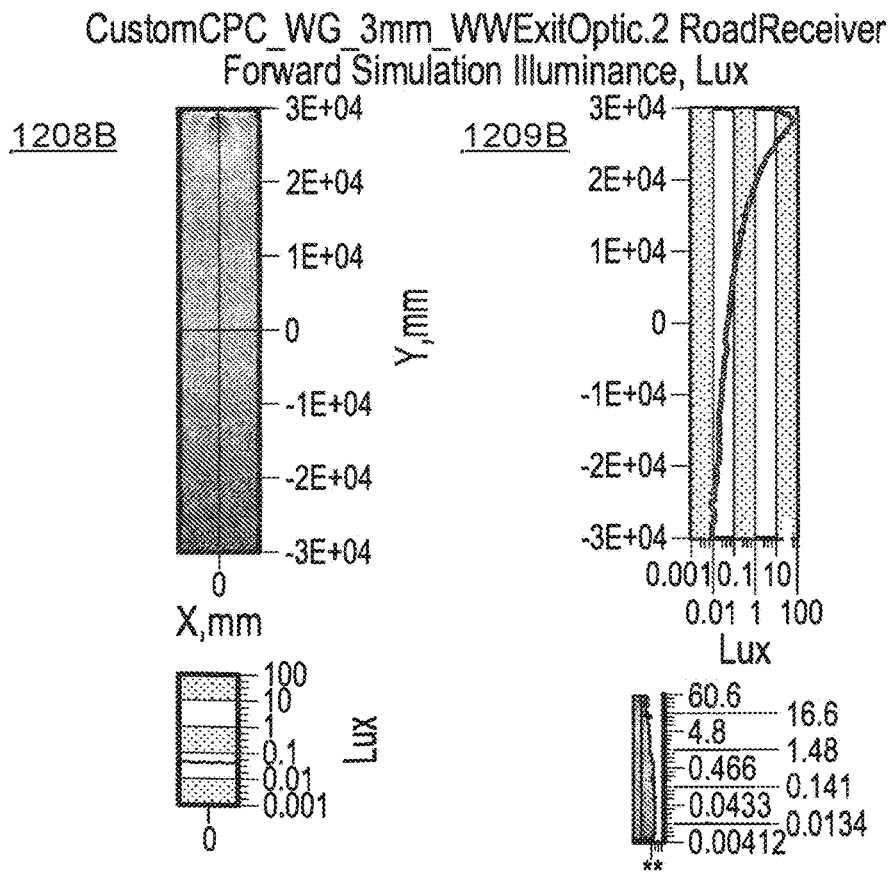

A modification of lighting unit 600G, 600H includes a diffuser located on the output face 644 of the extractor 640A, 640B. A diffuser can be quite efficient and introduce only a small additional loss but can have a significant impact on the output light angular distribution. FIGS. 10A and 10B show simulated intensity distributions 1002A and 1002B for respective orientations 640A and 640B of the modified lighting unit 600G, 600H. FIG. 10A also shows a cross-section 1004A along the y-axis and a cross-section 1006A along the x-axis of the intensity distribution 1002A. Additionally, FIG. 10B also shows a cross-section 1004B along the y-axis and a cross-section 1006B along the x-axis of the intensity distribution 1002B. FIGS. 11A and 11B show simulated angular distribution profiles 1105A and 1105B for respective orientations 640A and 640B of the modified lighting unit 600A, 600B. FIGS. 12A and 12B show road illuminance distributions 1208A and 1208B for respective orientations 640A and 640B of the modified lighting unit 600A, 600B. FIG. 12A also shows a cross-section 1209A along the y-axis of the road illuminance distributions 1208A. Additionally, FIG. 12B also shows a cross-section 1209B along the y-axis of the road illuminance distributions 1208B. Again, the road (i.e., the target surface 590) is 10 meters wide and 60 meters long, and the modified lighting unit 600A, 600B is disposed at a distance d=60 cm above the road. Both the lighting unit 600A, 600B and the modified lighting unit 600A, 600B are oriented horizontally, such that an optical axis of the lighting unit is parallel to the (x,z) plane.

Figure 13A:
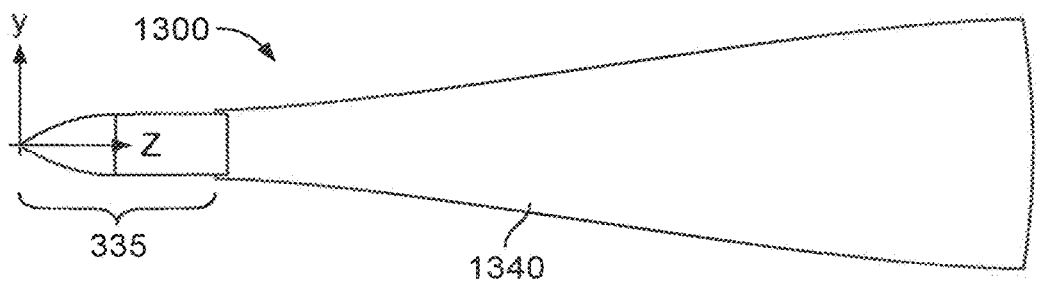
FIG. 13A shows a side view of a second example of a lighting unit including the coupler-light guide assembly of FIG. 4 and a first modification of the light shaping optical article of FIGS. 6A-6F.

FIG. 13A shows a side view of a second example lighting unit 1300. The lighting unit 1300 can have the same or another extension perpendicular to the sectional plane of FIG. 13A as the lighting units 600G, 600H, for example. Conservation of etendue requires that the width of the exit aperture of the optical system be increased in order to narrow the beam in y-direction. Hence combining a suitably wedged or flared extractor 1340 with the coupler-light guide assembly 335, for example, can narrow the beam. The extractor 1340 is about four times higher/wider (in y direction) than the extractors 640A, 640B. Otherwise, the dimensions of the couplers 320 and the light guide 330 remain unchanged except for the shorter light guide. Some dimensions of the lighting unit 1300 are as follows: The light guide 330 is again 3 mm thick and 25 mm wide but only 5 mm long. The input aperture of the extractor 1340 is at least 3 mm high and 25 mm wide. The extractor 1340 is 36 mm long. The exit aperture of the extractor 1340 is about 12 mm high and again 25 mm wide. The exit aperture of the extractor 1340 has a slight convex shape as illustrated in FIG. 13A.

Figure 13B:
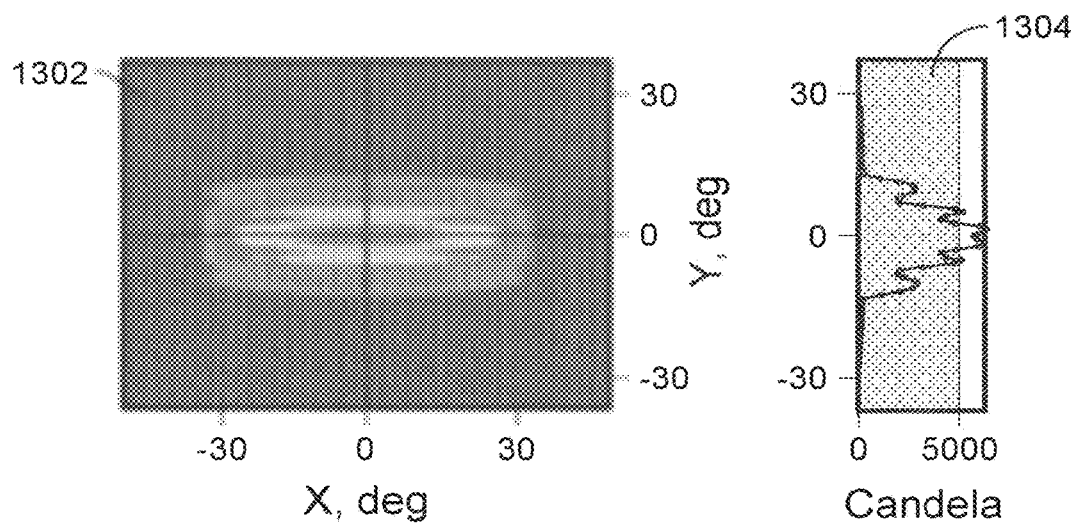
FIG. 13B shows a simulated intensity pattern for the second example of a lighting unit.
Figure 13B:
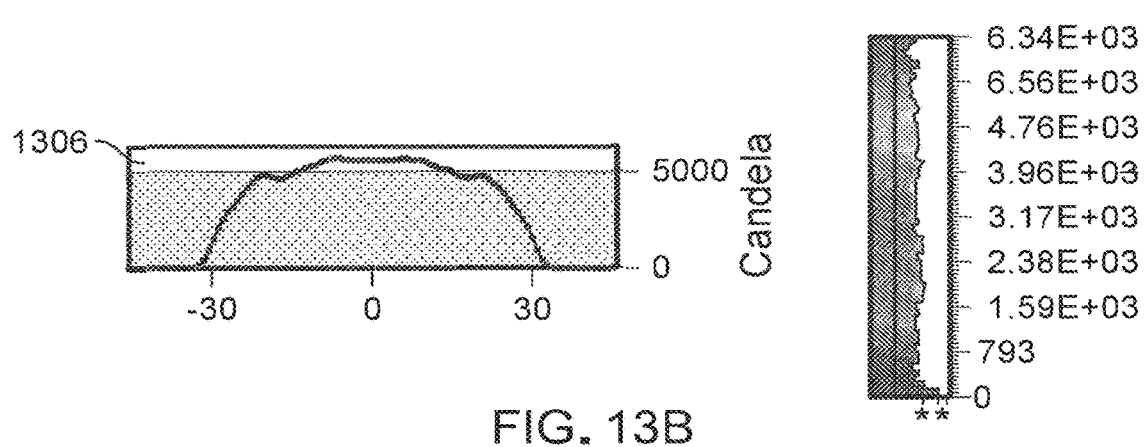
Figure 13C:
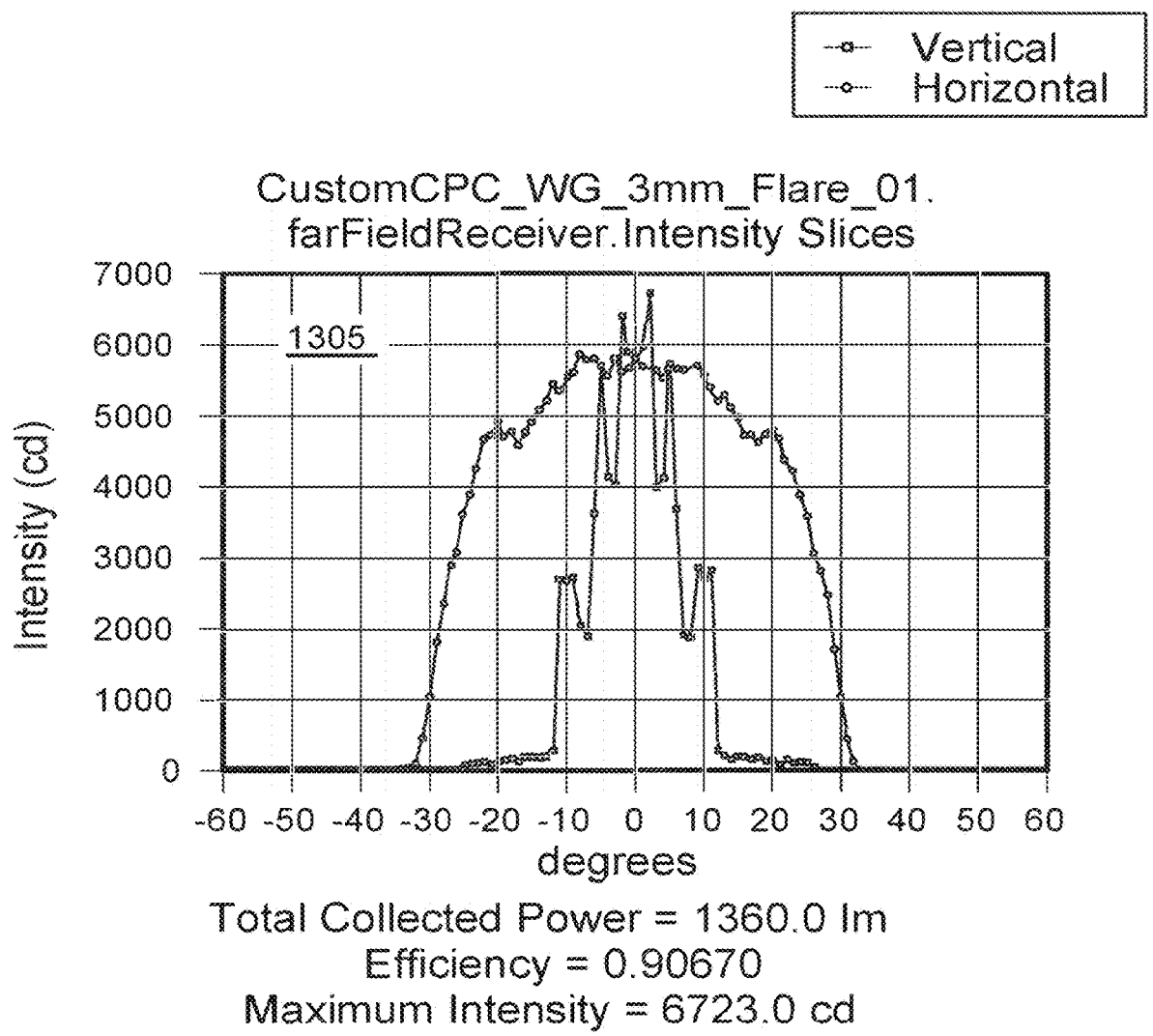
FIG. 13C shows a simulated angular intensity profile for the second example of a lighting unit.

FIG. 13B shows a simulated intensity distribution 1302 for the lighting unit 1300. FIG. 13B also shows a cross-section 1304 along the y-axis and a cross-section 1306 along the x-axis of the intensity distribution 1302. FIG. 13C shows a simulated angular distribution profile 1305 for the lighting unit 1300. The intensity distribution 1302 is significantly narrower along the y-axis than that of the lighting units 600G, 600H. Also, both the intensity distribution 1302 and the angular distribution profile 1305 have some ripples along the y-axis. These ripples are the result of the formation of resonant waveguide modes due to the longer lengths of the lighting unit 1300 and/or the extractor 1340. Varying the length of the lighting unit 1300 can be used to control the ripples.

Figure 14A:
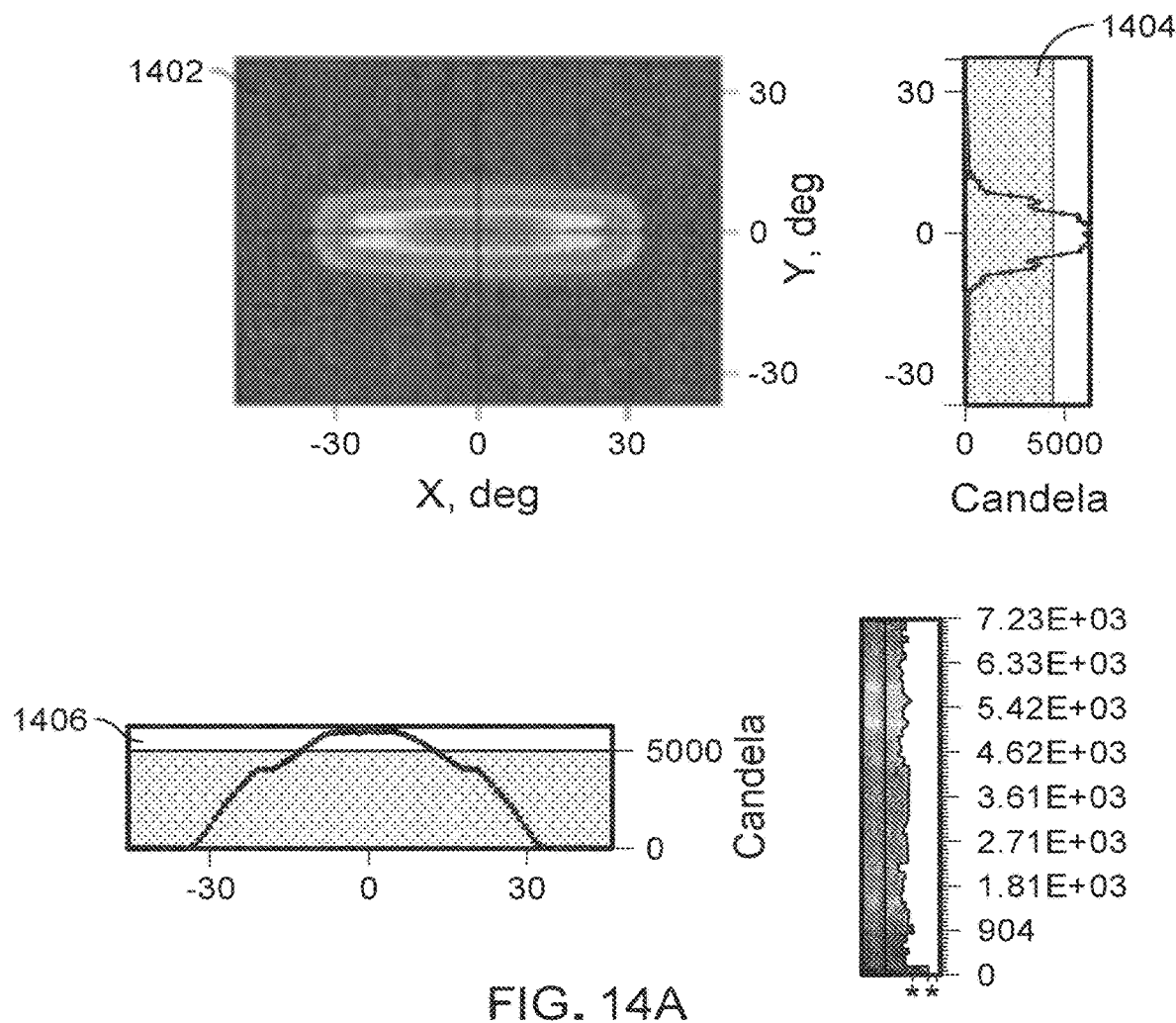
FIG. 14A shows a simulated intensity pattern for a modification of the second example of a lighting unit including the coupler-light guide assembly of FIG. 4 and a second modification of the light shaping optical article of FIGS. 6A-6F.
Figure 14B:
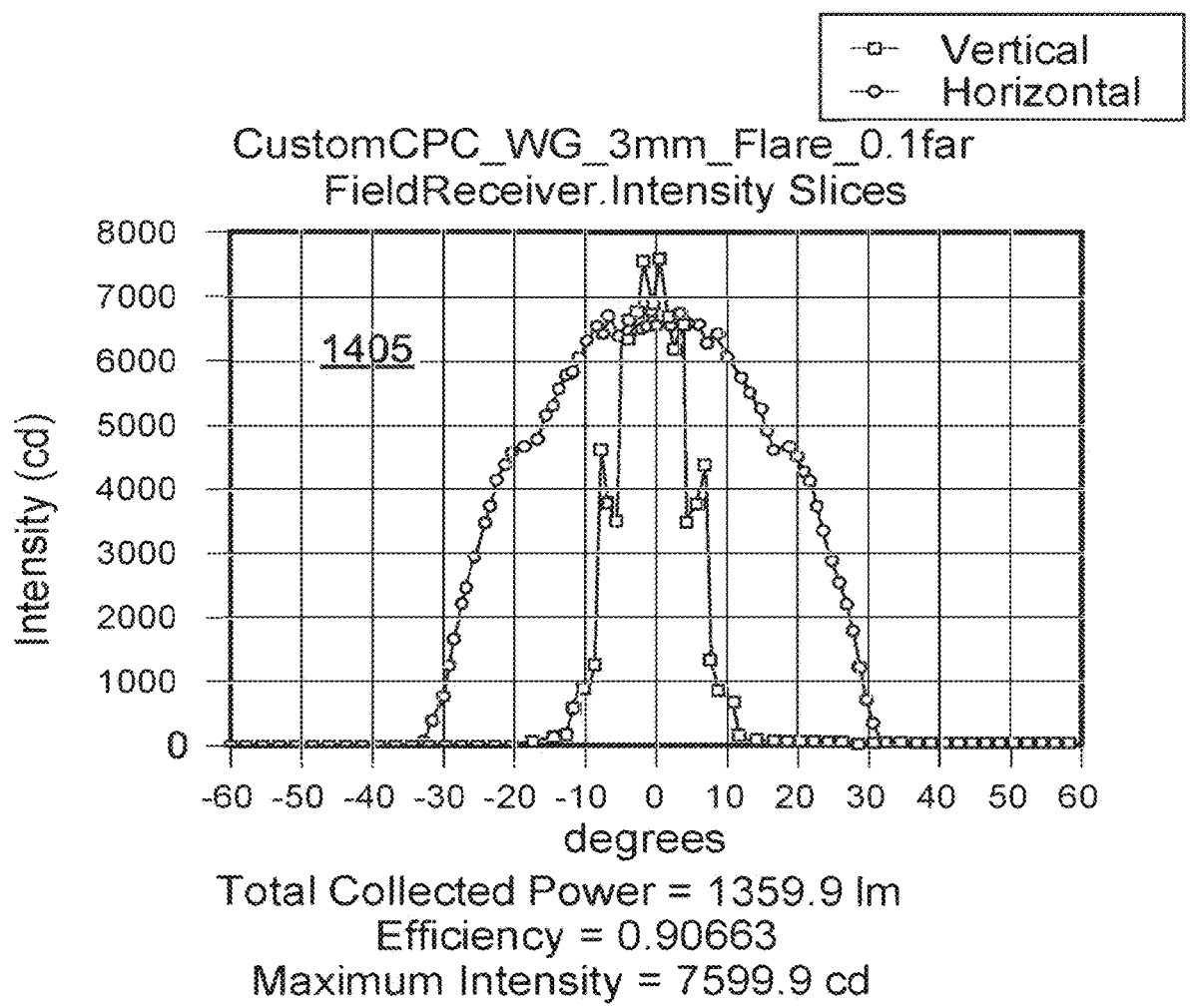
FIG. 14B shows a simulated angular intensity profile for the modification of the second example of a lighting unit.
Figure 14C:
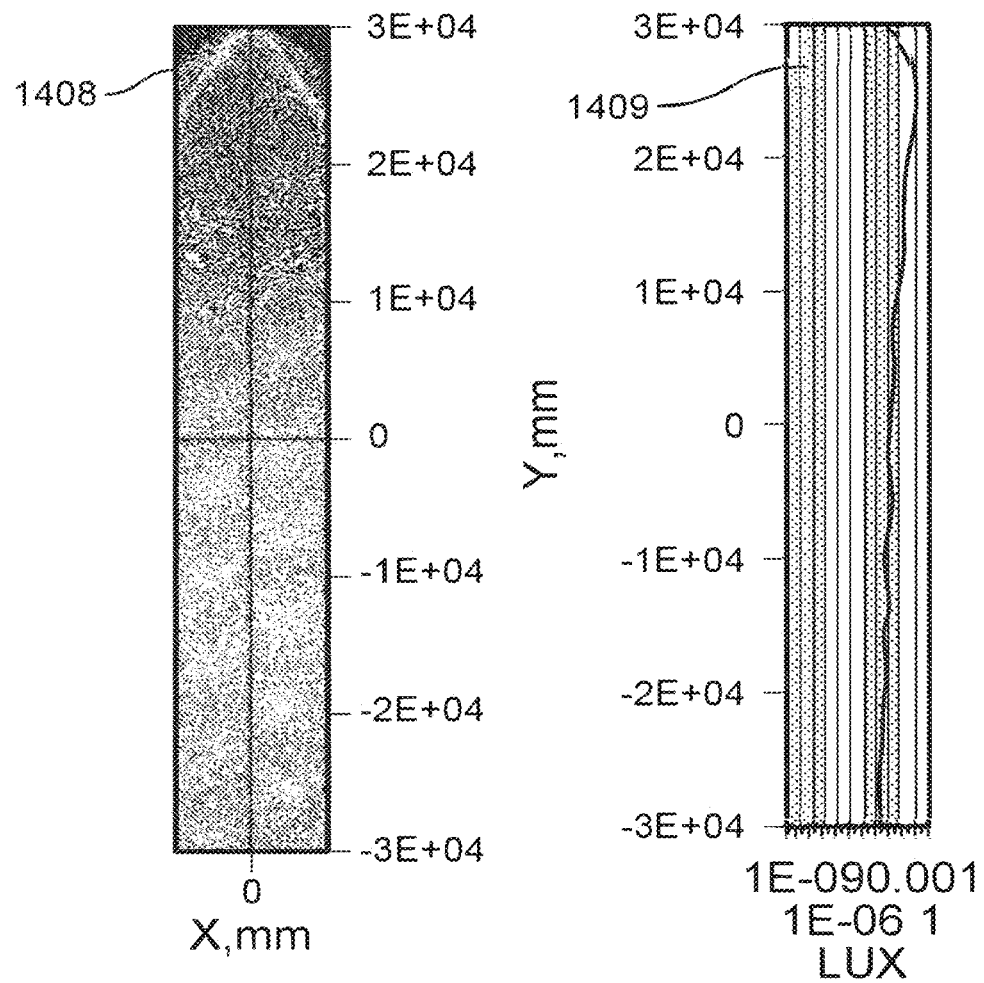
FIG. 14C shows a simulated road illuminance profile for the modification of the second example of a lighting unit.
Figure 14C:
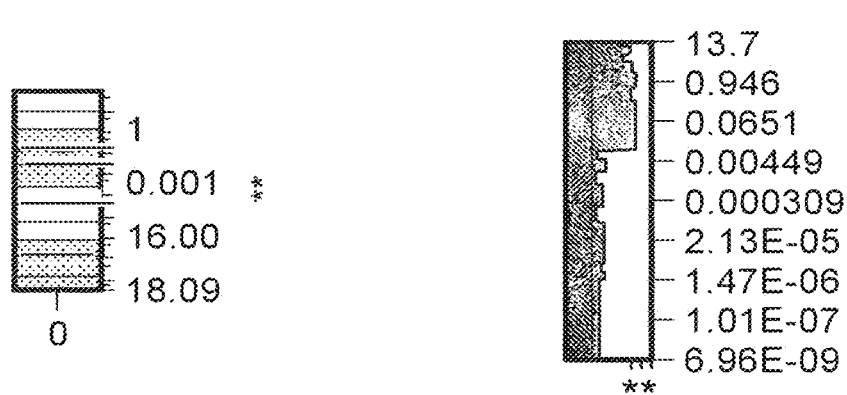

A modification of the lighting unit 1300 has an extractor that is 46 mm long that is, hence, 10 mm longer than the extractor 1340 of the lighting unit 1300. FIG. 14A shows a simulated intensity distribution 1402 of the modified lighting unit 1300. FIG. 14A also shows a cross-section 1404 along the y-axis and a cross-section 1406 along the x-axis of the intensity distribution 1402. FIG. 14B shows a simulated angular distribution profile 1405 for the modified lighting unit 1300. The intensity distribution 1402 is narrower along the y-axis than that of the lighting unit 1300. Also, both the intensity distribution 1402 and the angular distribution profile 1405 have less ripples along the y-axis compared to the corresponding ones of the lighting unit 1300. FIG. 14C shows a simulated road illuminance distribution 1408 for the modified lighting unit 1300. FIG. 14C also shows a cross-section 1409 along the y-axis of the road illuminance distributions 1408. Again, the road (i.e., the target surface 590) is 10 meters wide and 60 meters long, and the modified lighting unit 1300 is disposed at a distance d=60 cm above the road. Moreover, the modified lighting unit 1300 is oriented horizontally, such that an optical axis of the lighting unit is parallel to the (x,z) plane.

Depending on the embodiment, light guides in coupler-light guide assemblies, e.g., 335, can be shortened or lengthened compared to the foregoing examples. In some implementations, the coupler-light guide assembly 335 can be replaced with one or more suitably shaped and arranged couplers 320 without employing light guides in corresponding lighting units, e.g., by coupling the light redirected by the couplers directly into a light shaping optical article, e.g., 540 or 640.

Furthermore, lighting units as described above can be combined with additional complementary reflectors. Such reflectors provide greater degrees of freedom in the design of respective lighting units, as described below.

Figure 15A:
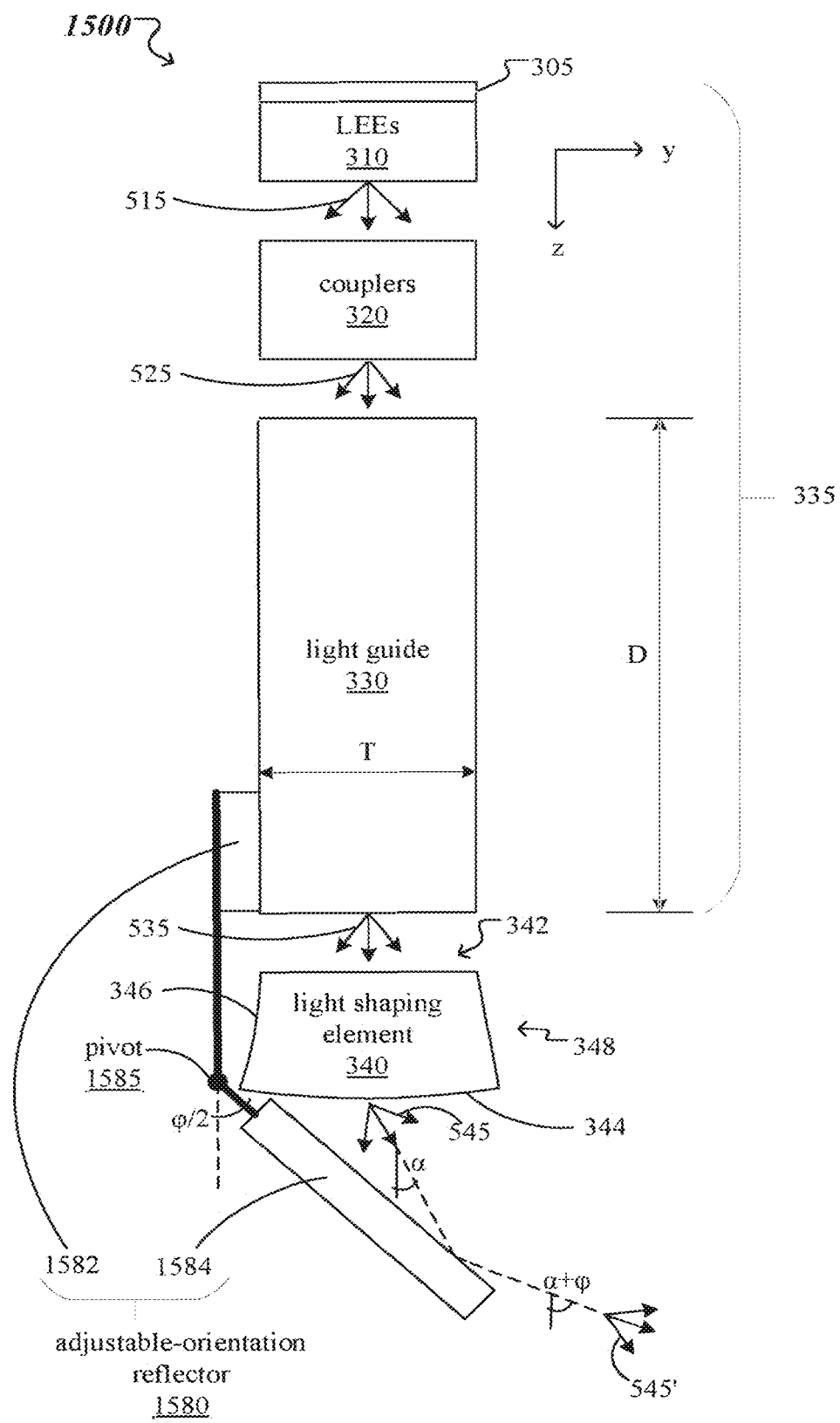
FIGS. 15A-15C show aspects of a third example of a lighting unit including the coupler-light guide assembly of FIG. 4, the light shaping optical article of FIGS. 6A-6F, and a reflector element.
Figure 15B:
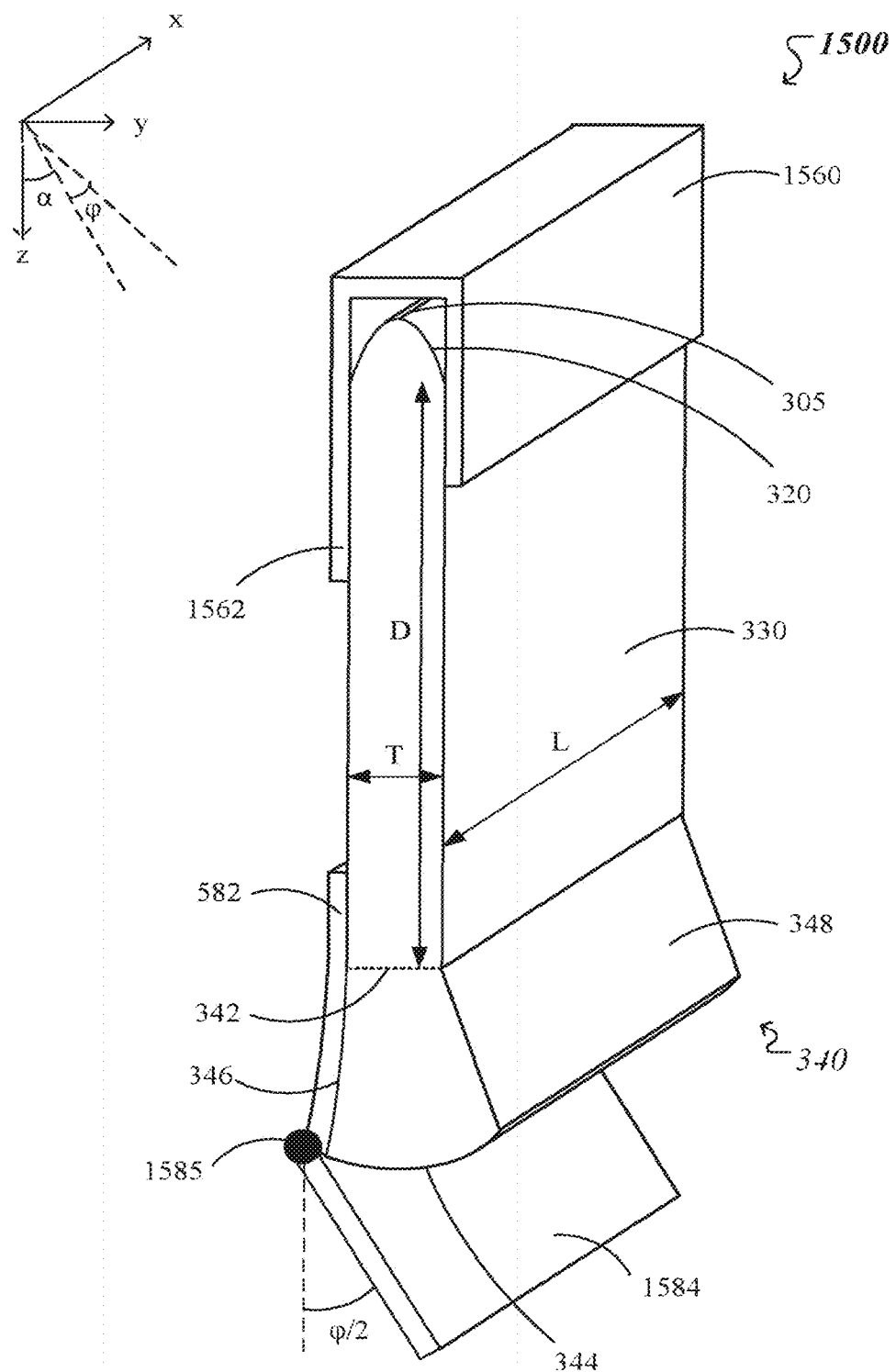

FIGS. 15A and 15B show aspects of an example of another lighting unit 1500 based on a coupler-light guide assembly 335 and a light shaping optical article 340. The light shaping optical article 340 can be implemented as a light shaping optical article 540 or 640 described in connection with FIG. 5A-5C or 6A-6F, for example.

The coupler-light guide assembly 335 includes a substrate 305, one or more light emitting elements (LEEs) 310 and a light guide 330. The light guide 330 guides the light provided by the LEEs 310 in a first angular range 515 along a length D. The coupler-light guide assembly 335 further includes one or more optical couplers 320, such that the light guide 330 is coupled at its input end to the optical coupler(s) 320 and at its output end to the light shaping optical article 340. The light guide 330 receives light in a second angular range 525 from the optical couplers and outputs guided light in a third angular range 535 to the light shaping optical article 340. As noted above, a combination of (i) an optical power of a concave first side surface 346 of the light shaping optical article 340, (ii) an optical power of a convex output surface 344 of the light shaping optical article 340 and (iii) relative arrangements between the convex output surface 344 and each of a light guide direction (here the z-axis) and the concave first side surface 346 determines a divergence of light in an output angular range 545 and a tilt angle α of prevalent propagation direction of the light in the output angular range 545 relative to prevalent propagation direction of the guided light in a third angular range 535.

The lighting unit 1500 further includes an adjustable orientation reflector 1580 arranged and configured to reorient a prevalent propagation direction of the light output in the output angular range 545 by an additional angle φ≠0. In this manner, light is output by the lighting unit 1500 in a modified output angular range 545' along a prevalent propagation direction having a cumulative tilt angle α+φ relative to the axis z.

In the examples illustrated in FIGS. 15A and 15B, the adjustable orientation reflector 1580 includes a reflector support 1582 and a reflector element 1584. In this example, the reflector support 1582 is disposed adjacent one of the side surfaces of the light guide 330. The reflector support 1582 is located on the same side of the light guide as the concave first side surface 346 of the light shaping optical article 340. The reflector support 1582 and the reflector element 1584 are connected together at a pivot 1585 orthogonal to the prevalent propagation direction of the guided light in the third angular range 535 (here, the z-axis) and the prevalent propagation direction of the output light in the output angular range 545. The reflector support 1582, the reflector element 1584 and the pivot 1585 extend over the width L of the lighting unit 1500 along the x-axis. In other examples, the reflector element 1584 can extend along one or more portions of the extractor 340. Such an embodiment of the reflector element 1584 can be arranged and configured so that at each of its portions can redirect at least a portion of the light emitted by the extractor 340.

The pivot 1585 can be arranged relative to the light shaping optical article 340 adjacent to an intersection of the concave first side surface 346 and the convex output surface 344. In some implementations, the pivot 1585 can include angular displacement actuators for adjusting the tilt angle φ in discrete increments of Δφ=0.1, 0.5, or 1°, for example, or via a continuous pivot. The pivot 1585 is configured to adjustably tilt the reflector element 1584 relative to the light guide direction (here the z-axis) by a reflector angle φ/2. The reflector angle φ/2 can be 5, 8, or 10°, for instance. In this manner, at least a portion of the light output by the light shaping optical article 340 in the output angular range 545 reflects off the reflector element 1584, such that the reflected light prevalently propagates in a direction that is tilted by a tilt angle φ relative to the prevalent propagation direction of the output light in the output angular range 545. The reflected light is provided by the lighting unit 1500 in the modified output angular range 545' and has a prevalent propagation direction that has a cumulative tilt angle α+φ relative to the axis z.

In some implementations, the reflector element 1584 includes a plate having a width that spans the width L of the lighting unit 1500 along the x-axis and a length of 5, 10 or 15 cm, for instance. In some cases, the reflector element 1584 is flat. In other cases, the reflector element 1584 can be concave or convex. Moreover, the reflector element 1584 can be formed from or coated with a reflective metal, e.g., Al, Ag, etc. In other cases, the reflector element 1584 can be coated with reflective dielectric layers. As such, the reflector element 1584 can be configured to reflect 95% or more of the light output by the light shaping optical article 340 that is incident onto the reflector element 1584. Further, the reflector element 1584 can be configured to specularly reflect incident light. Furthermore, the reflector element 1584 can be configured to diffusely reflect incident light. In the latter cases, a diffusion pattern can be imprinted on or within the reflector element 1584. Alternatively, a diffusion pattern can be provided as a film deposited on the reflector element 1584. The degree of diffusion relative to the light incident on the reflector element 1584 may be limited to a predetermined angular range of the light reflected therefrom.

In the example illustrated in FIG. 15A, the reflector support 1582 is attached to a bottom fraction of one of the side surfaces of the light guide 330 that is on the same side of the light guide as the concave first side surface 346 of the light shaping optical article 340. In the example illustrated in FIG. 15B, the reflector support 1582 can be attached to a side surface or opposing end surfaces (that are parallel to the y-z plane) of the light guide 330 or the light shaping optical article 340, for example. Further attachment configurations are described below. The reflector support may extend over a bottom fraction of the light guide 330 and/or the light shaping element 340 which can cover 10, 30 or 50% of D, for instance. The reflector support 1582 and the reflector element 1584 are rotatably coupled to each other at the pivot 1585 which is located adjacent to the intersection of the concave first side surface 346 and the convex output surface 344 of the light shaping optical article 340.

Further in the example illustrated in FIG. 15B, the lighting unit 1500 includes a rail 1560 arranged and configured to support the coupler-light guide assembly 335. Here, the rail 1560 has a U profile in the (y,z) plane and is elongated along the x-axis. A surface of the rail 1560 that is parallel to the (x,y) plane is disposed adjacent to the substrate 305, and surfaces of the rail 1560 that are parallel to the (x,z) plane are coupled to the side surfaces of the light guide 330 along a top fraction of the length D of the light guide 330. The top fraction can be 10, 30 or 50% of D, for instance. In some implementations, one of the surfaces of the rail 1560—that is on the same side of the light guide 330 as the concave first side surface 346 of the light shaping optical article 340—can extend over a larger fraction of the light guide than the opposing rail surface. The former is referred to as an extended rail surface 1562. In some cases, the extended rail surface 1562 can extend over the entire length D of the light guide 330 and the entire length of the concave first side surface 346 of the light shaping optical article 340. In such cases, the extended rail surface 1562 is used as the reflector support 1582: Here, the pivot 1585 can be placed at the end of the extended rail surface 1562 and the reflector element 1584 can be connected to the extended rail surface 1562 at the pivot 1585.

Figure 15C:
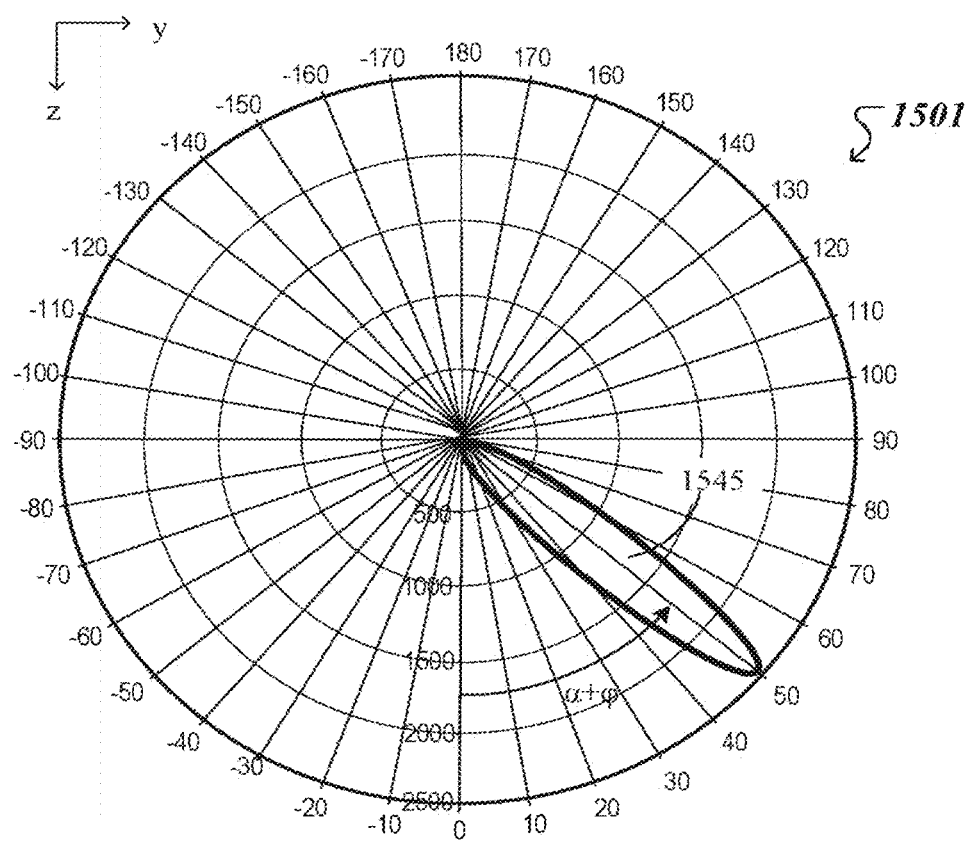

FIG. 15C shows a light intensity distribution 1501 of the light output by the lighting unit 1500 in the (y-z) plane. Note that the z-axis is parallel to the light guide 330. In some implementations, the z-axis can be aligned along a target surface 590, e.g., along a road. A lobe 1545 of the light intensity distribution 1501 represents the light output by the lighting unit 1500 in the modified output angular range 545'. A bisector of the lobe 1545 corresponds to the prevalent propagation direction of light the modified output angular range 545'. Here, the bisector of the lobe 1545 is tilted by a tilt angle α+φ≈50° relative to the z-axis. For example, φ≈10° represents the tilt of the prevalent propagation direction of the output light in the modified output angular range 545' relative to the prevalent propagation direction of the output light in the output angular range 545 as caused by the reflector element 1584 tilted at an angle φ/2≈5°, and α≈40° represents the tilt of the prevalent propagation direction of the output light in the output angular range 545 relative to the z-axis as caused by the light shaping optical article 340. A width at half-max of the lobe 1545 corresponds to the divergence of light the modified output angular range 545'. Here, the width at half-max of the lobe 1545 has a value of about 20°.

The described lighting units demonstrate the utility for various automotive headlight applications. It is noted that the light output distribution can be affected via additional optical parameters including the shape of the extractor profile, the exit aperture, the length of the light guide and the shape of the couplers, for example. Such parameters can include various asymmetries and the employ of different shaped couplers within one single lighting unit and other asymmetries that can provide additional degrees of design freedom.

A third example of a lighting unit includes the coupler-light guide assembly 335 combined with a reverse extractor, described below in connection with FIGS. 16A-16B, and a suitably shaped tertiary reflector, described below in connection with FIGS. 17A-17B. Such lighting units can be configured to provide larger exit apertures with good glare control. The reverse extractor redirects light received from the coupler-light guide assembly in a range of backward directions towards the tertiary reflector, which in turn reflects the light forward for road illumination or indication. Depending on the implementation, the reverse extractor may leak none or some light from the coupler-light guide assembly in the forward direction in addition to emitting light in the backwards directions. Backward directions refer to directions that are opposite of the general propagation direction of light within the coupler-light guide assembly.

For typical automotive lighting applications, the third example of a lighting unit includes (i) a light guide module, that is formed from one or more coupler-light guide assemblies 335 and a free form reverse extractor, and (ii) accordingly shaped tertiary reflectors. Depending on the implementation, the third example of a lighting unit may have an elongate straight or curved shape with an open or closed end tertiary reflector. Examples of light guide modules that can be used in the third example of lighting units are described next.

Figure 16A:
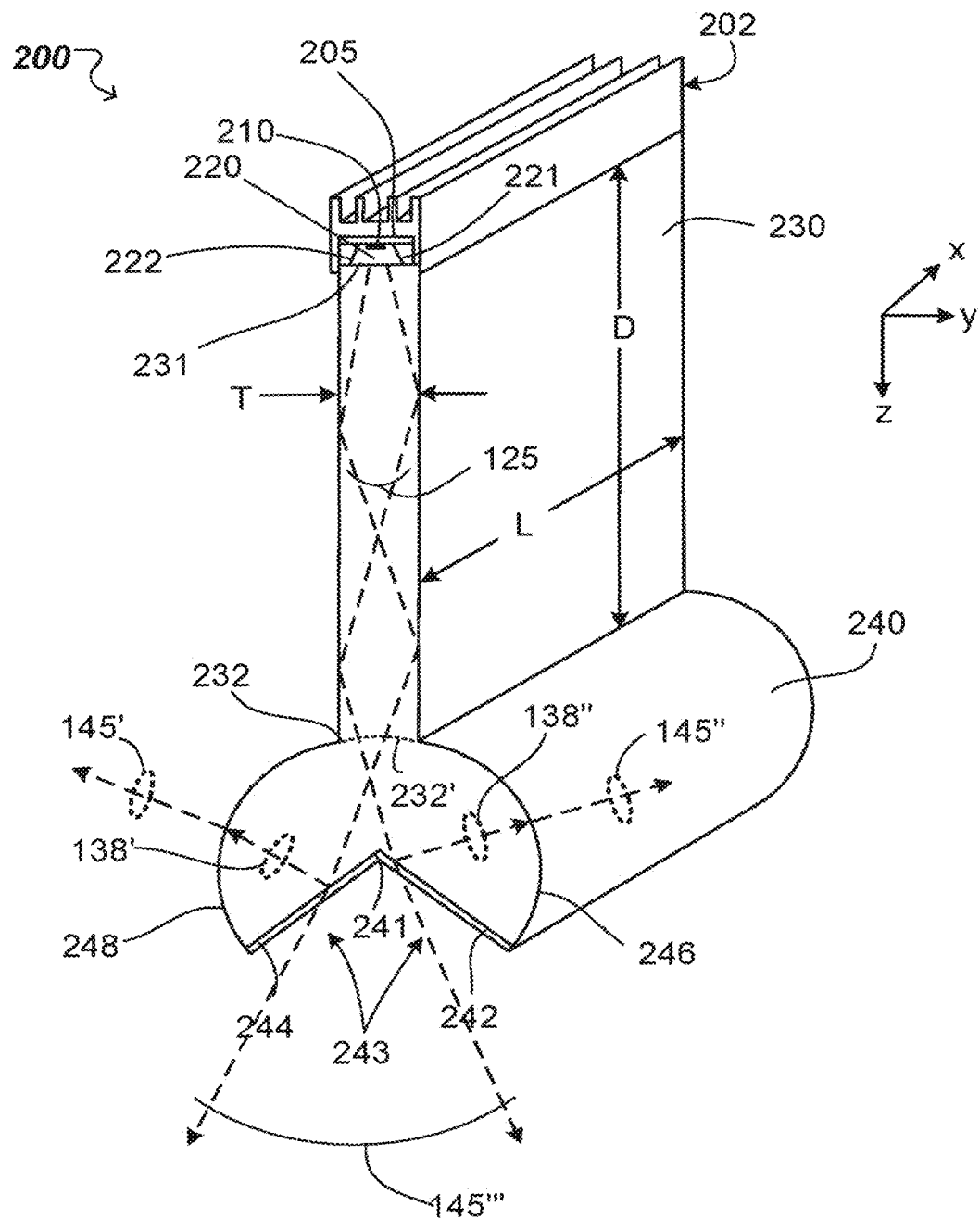
FIGS. 16A-16C show aspects of an elongated light guide module that can be used in other lighting units that can be included in the vehicle headlight from FIG. 2.
Figure 16B:
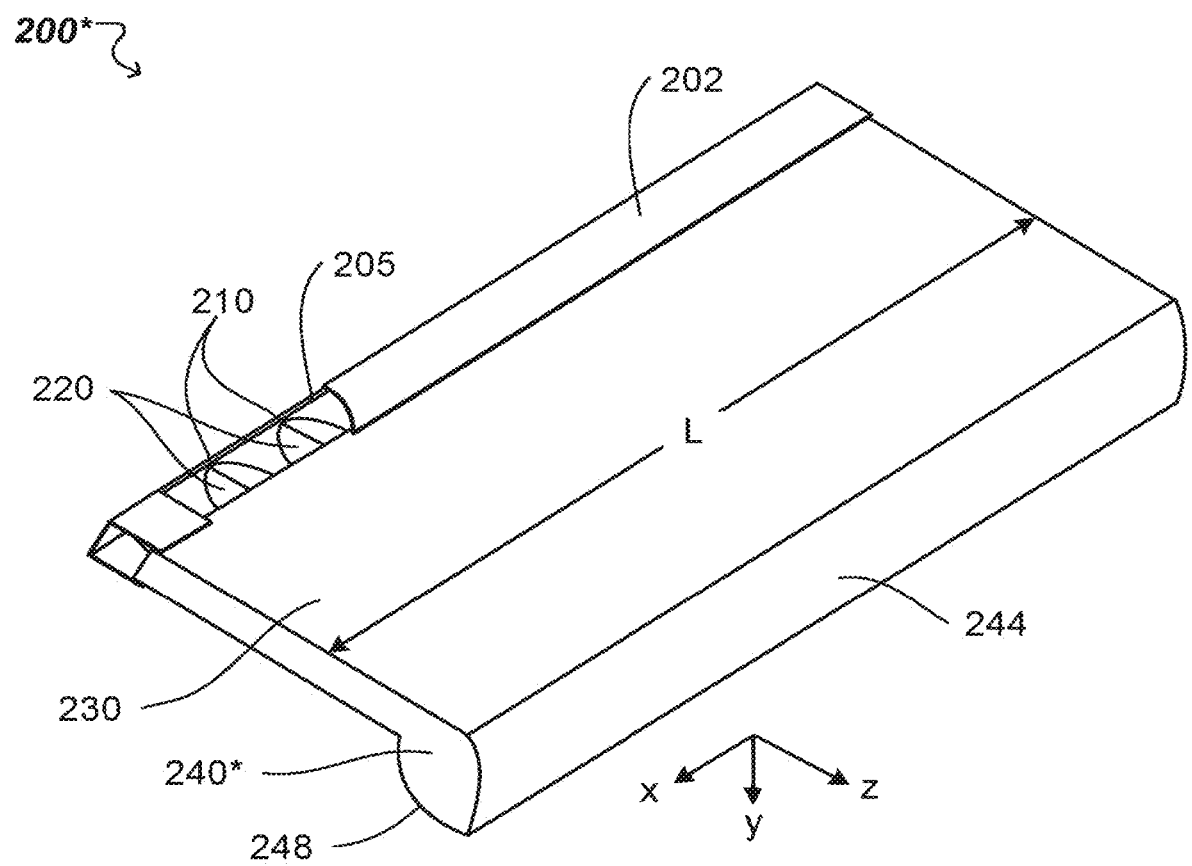

Referring to FIG. 16A, a light guide module 200 includes a substrate 205 having a plurality of LEEs 210 distributed along a first surface of the substrate 205. The mount with the LEEs 210 is disposed at a first (e.g., upper) edge 231 of a light guide 230. Once again, the positive z-direction is referred to as the "forward" direction and the negative z-direction is the "backward" direction. Sections through the light guide module 200 parallel to the x-z plane are referred to as the "cross-section" or "cross-sectional plane" of the light guide module. Also, light guide module 200 extends along the y-direction, so this direction is referred to as the "longitudinal" direction of the light guide module. Implementations of light guide modules can have a plane of symmetry parallel to the y-z plane, and can be curved or otherwise shaped. This is referred to as the "symmetry plane" of the light guide module.

Multiple LEEs 210 are disposed on the first surface of the substrate 205, although only one of the multiple LEEs 210 is shown in FIG. 16A. For example, the plurality of LEEs 210 can include multiple white LEDs. The LEEs 210 are optically coupled with one or more optical couplers 220 (only one of which is shown in FIG. 16A). An optical extractor 240 is disposed at second (e.g., lower) edge 232 of light guide 230.

Substrate 205, light guide 230, and optical extractor 240 extend a length L along the y-direction, so that the light guide module is an elongated light guide module with an elongation of L that may be about parallel to a display panel. Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 210 on the substrate 205 will generally depend, inter alia, on the length L, where more LEEs are used for longer light guide modules. In some implementations, the plurality of LEEs 210 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the light guide module. For example, a relatively high density of LEEs can be used in applications where high illuminance is desired or where low power LEEs are used. In some implementations, the light guide module 200 has LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In implementations, LEEs can be evenly spaced along the length, L, of the light guide module. In some implementations, the substrate 205 can be attached to a housing 202 configured as a heat sink to extract heat emitted by the plurality of LEEs 210. A surface of the substrate 205 that contacts the housing 202 opposes the side of the substrate 205 on which the LEEs 210 are disposed. The light guide module 200 can include one or multiple types of LEEs, for example one or more subsets of LEEs in which each subset can have different color or color temperature.

Optical coupler 220 includes one or more solid pieces of transparent optical material (e.g., a glass material or a transparent plastic, such as polycarbonate or acrylic) having surfaces 221 and 222 positioned to reflect light from the LEEs 210 towards the light guide 230. In general, surfaces 221 and 222 are shaped to collect and at least partially collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some implementations, surfaces 221 and 222 are coated with a highly reflective material (e.g., a reflective metal, such as aluminum or silver), to provide a highly reflective optical interface. The cross-sectional profile of optical coupler 220 can be uniform along the length L of light guide module 200. Alternatively, the cross-sectional profile can vary. For example, surfaces 221 and/or 222 can be curved out of the x-z plane.

The exit aperture of the optical coupler 220 adjacent upper edge of light guide 231 is optically coupled to edge 231 to facilitate efficient coupling of light from the optical coupler 220 into light guide 230. For example, the surfaces of a solid coupler and a solid light guide can be attached using a material that substantially matches the refractive index of the material forming the optical coupler 220 or light guide 230 or both (e.g., refractive indices across the interface are different by 2% or less.) The optical coupler 220 can be affixed to light guide 230 using an index matching fluid, grease, or adhesive. In some implementations, optical coupler 220 is fused to light guide 230 or they are integrally formed from a single piece of material (e.g., coupler and light guide may be monolithic and may be made of a solid transparent optical material).

Light guide 230 is formed from a piece of transparent material (e.g., glass material such as BK7, fused silica or quartz glass, or a transparent plastic, such as polycarbonate or acrylic) that can be the same or different from the material forming optical couplers 220. Light guide 230 extends length L in the y-direction, has a uniform thickness T in the x-direction, and a uniform depth D in the z-direction. The dimensions D and T are generally selected based on the desired optical properties of the light guide (e.g., which spatial modes are supported) and/or the direct/indirect intensity distribution. During operation, light coupled into the light guide 230 from optical coupler 220 (with an angular range 125) reflects off the planar surfaces of the light guide by TIR and spatially mixes within the light guide. The mixing can help achieve illuminance and/or color uniformity, along the x-axis, at the distal portion of the light guide 232 at optical extractor 240. The depth, D, of light guide 230 can be selected to achieve adequate uniformity at the exit aperture (i.e., at end 232) of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 220 are designed to restrict the angular range of light entering the light guide 230 (e.g., to within +/−40 degrees) so that at least a substantial amount of the light (e.g., 95% or more of the light) is optically coupled into spatial modes in the light guide 230 that undergoes TIR at the planar surfaces. Light guide 230 can have a uniform thickness T, which is the distance separating two planar opposing surfaces of the light guide. Generally, T is sufficiently large so the light guide has an aperture at first (e.g., upper) surface 231 sufficiently large to approximately match (or exceed) the exit aperture of optical coupler 220. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

While optical coupler 220 and light guide 230 are formed from solid pieces of transparent optical material, hollow structures are also possible. For example, the optical coupler 220 or the light guide 230 or both may be hollow with reflective inner surfaces rather than being solid. As such material cost can be reduced and absorption in the light guide can be mitigated. A number of specular reflective materials may be suitable for this purpose including materials such as 3M Vikuiti™ or Miro IV™ sheet from Alanod Corporation where greater than 90% of the incident light can be efficiently guided to the optical extractor.

Optical extractor 240 is also composed of a solid piece of transparent optical material (e.g., a glass material or a transparent plastic, such as polycarbonate or acrylic) that can be the same as or different from the material forming light guide 230. In the example implementation shown in FIG. 16A, the optical extractor 240 includes redirecting (e.g., flat) surfaces 242 and 244 and curved surfaces 246 and 248. The flat surfaces 242 and 244 represent first and second portions of a redirecting surface 243, while the curved surfaces 246 and 248 represent first and second output surfaces of the light guide module 200.

Surfaces 242 and 244 are coated with a reflective material (e.g., a highly reflective metal such as aluminum or silver) over which a protective coating may be disposed. For example, the material forming such a coating may reflect about 95% or more of light incident thereon at appropriate (e.g., visible) wavelengths. Here, surfaces 242 and 244 provide a highly reflective optical interface for light having the angular range 125 entering an input end of the optical extractor 232' from light guide 230. As another example, the surfaces 242 and 244 include portions that are transparent to the light entering at the input end 232' of the optical extractor 240. Here, these portions can be uncoated regions (e.g., partially silvered regions) or discontinuities (e.g., slots, slits, apertures) of the surfaces 242 and 244. As such, some light is transmitted in the forward direction (along the z-axis) through surfaces 242 and 244 of the optical extractor 240 in a third forward angular range 145'''. In some cases, the light transmitted in the third forward angular range 145''' is refracted. In this way, the redirecting surface 243 acts as a beam splitter rather than a mirror, and transmits in the third forward angular range 145''' a desired portion of incident light, while reflecting the remaining light in angular ranges 138 and 138'.

In the x-z cross-sectional plane, the lines corresponding to surfaces 242 and 244 have the same length and form an apex or vertex 241, e.g. a v-shape that meets at the apex 241. In general, an included angle (e.g., the smallest included angle between the surfaces 244 and 242) of the redirecting surfaces 242, 244 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more). In the example implementation shown in FIG. 16A, the output surfaces 246, 248 of the optical extractor 240 are curved with a constant radius of curvature that is the same for both. In an aspect, the output surfaces 246, 248 may have optical power (e.g., may focus or defocus light.) Accordingly, light guide module 200 has a plane of symmetry intersecting apex 241 parallel to the y-z plane.

The surface of optical extractor 240 adjacent to the lower edge 232 of light guide 230 is optically coupled to edge 232. For example, optical extractor 240 can be affixed to light guide 230 using an index matching fluid, grease, or adhesive. In some implementations, optical extractor 240 is fused to light guide 230 or they are integrally formed from a single piece of material.

The emission spectrum of the light guide module 200 corresponds to the emission spectrum of the LEEs 210. However, in some implementations, a wavelength-conversion material may be positioned in the light guide module, for example remote from the LEEs, so that the wavelength spectrum of the light guide module is dependent both on the emission spectrum of the LEEs and the composition of the wavelength-conversion material. In general, a wavelength-conversion material can be placed in a variety of different locations in light guide module 200. For example, a wavelength-conversion material may be disposed proximate the LEEs 210, adjacent surfaces 242 and 244 of optical extractor 240, on the exit surfaces 246 and 248 of optical extractor 240, and/or at other locations.

The layer of wavelength-conversion material (e.g., phosphor) may be attached to light guide 230 held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed between $R/n$ and $R*(1+n2)(-1/2)$, where R is the radius of curvature of the light-exit surfaces (246 and 248 in FIG. 16A) of the extractor 240 and n is the index of refraction of the portion of the extractor that is opposite of the wavelength-conversion material as viewed from the reflective surfaces (242 and 244 in FIG. 16A). The support structure may be a transparent self-supporting structure. The wavelength-conversion material diffuses light as it converts the wavelengths, provides mixing of the light and can help uniformly illuminate a surface of the ambient environment.

During operation, light exiting light guide 230 through end 232 impinges on the reflective interfaces at portions of the redirecting surface 242 and 244 and is reflected outwardly towards output surfaces 246 and 248, respectively, away from the symmetry plane of the light guide module. The first portion of the redirecting surface 242 provides light having an angular distribution 138 towards the output surface 246, the second portion of the redirecting surface 244 provides light having an angular distribution 138' towards the output surface 246. The light exits optical extractor 240 through output surfaces 246 and 248. In general, the output surfaces 246 and 248 have optical power, to redirect the light exiting the optical extractor 240 in first and second backward angular ranges 145', 145", respectively. For example, optical extractor 240 may be configured to emit light upwards (i.e., towards the plane intersecting the LEEs and parallel to the x-y plane), downwards (i.e., away from that plane) or both upwards and downwards. In general, the direction of light exiting the light guide module through surfaces 246 and 248 depends on the divergence of the light exiting light guide 230 and the orientation of surfaces 242 and 244.

Surfaces 242 and 244 may be oriented so that little or no light from light guide 230 is output by optical extractor 240 in certain directions. In implementations where the light guide module 200 is attached to a ceiling of a room (e.g., the forward direction is towards the floor) such configurations can help avoid glare and an appearance of non-uniform illuminance.

In general, the light intensity distribution provided by light guide module 200 reflects the symmetry of the light guide module's structure about the y-z plane, as described below in connection with FIG. 16C. Referring to both FIGS. 16A and 16C, the orientation of the output lobes 145a, 145b can be adjusted based on the included angle of the v-shaped groove 241 formed by the portions of the redirecting surface 242 and 244. For example, a first included angle results in a far-field light intensity distribution 290 with output lobes 145a, 145b located at relatively smaller angles compared to output lobes 145a, 145b of the far-field light intensity distribution 290 that results for a second included angle larger than the first angle. In this manner, light can be extracted from the light guide module 200 in a more forward direction for the smaller of two included angles formed by the portions 242, 244 of the redirecting surface 243.

Furthermore, while surfaces 242 and 244 are depicted as planar surfaces, other shapes are also possible. For example, these surfaces can be curved or faceted. Curved redirecting surfaces 242 and 244 can be used to narrow or widen the output lobes 145a, 145b. Depending of the divergence of the angular range 125 of the light that is received at the input end of the optical extractor 232', concave reflective surfaces 242, 244 can narrow the lobes 145a, 145b output by the optical extractor 240 (and illustrated in FIG. 16C), while convex reflective surfaces 242, 244 can widen the lobes 145a, 145b output by the optical extractor 240. As such, suitably configured redirecting surfaces 242, 244 may introduce convergence or divergence into the light. Such surfaces can have a constant radius of curvature, can be parabolic, hyperbolic, or have some other curvature.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

In general, light guide module 200 can be designed to output light into different first and second backward angular ranges 145', 145" from those shown in FIG. 16A. In some implementations, illumination devices can output light into lobes 145a, 145b that have a different divergence or propagation direction than those shown in FIG. 16C. For example, in general, the output lobes 145a, 145b can have a width of up to about 90° (e.g., 80° or less, 70° or less, 60° or less, 50° or less, 40° or less, 30° or less, 20° or less). In general, the direction in which the output lobes 145a, 145b are oriented can also differ from the directions shown in FIG. 16C. The "direction" refers to the direction at which a lobe is brightest. In FIG. 16C, for example, the output lobes 145a, 145b are oriented at approx. −130° and approximately +130°. In general, output lobes 145a, 145b can be directed more towards the horizontal (e.g., at an angle in the ranges from −90° to −135°, such as at approx. −90°, approx. −100°, approx. −110°, approx. −120°, approx. −130°, and from +90° to +135°, such as at approx. +90°, approx. +100°, approx. +110°, approx. +120°, approx. +130°.

The light guide modules can include other features useful for tailoring the intensity profile. For example, in some implementations, light guide modules can include an optically diffuse material that can diffuse light in a controlled manner to aid homogenizing the light guide module's intensity profile. For example, surfaces 242 and 244 can be roughened or a diffusely reflecting material, rather than a specular reflective material, can be coated on these surfaces. Accordingly, the optical interfaces at surfaces 242 and 244 can diffusely reflect light, scattering light into broader lobes than would be provided by similar structures utilizing specular reflection at these interfaces. In some implementations these surfaces can include structure that facilitates various intensity distributions. For example, surfaces 242 and 244 can each have multiple planar facets at differing orientations. Accordingly, each facet will reflect light into different directions. In some implementations, surfaces 242 and 244 can have structure thereon (e.g., structural features that scatter or diffract light).

Surfaces 246 and 248 need not be surfaces having a constant radius of curvature. For example, surfaces 246 and 248 can include portions having differing curvature and/or can have structure thereon (e.g., structural features that scatter or diffract light). In certain implementations, a light scattering material can be disposed on surfaces 246 and 248 of optical extractor 240.

In some implementations, optical extractor 240 is structured so that a negligible amount (e.g., less than 1%) of the light propagating within at least one plane (e.g., the x-z cross-sectional plane) that is reflected by surface 242 or 244 experiences TIR at light-exit surface 246 or 248. For certain spherical or cylindrical structures, a so-called Weierstrass condition can avoid TIR. A Weierstrass condition is illustrated for a circular structure (i.e., a cross section through a cylinder or sphere) having a surface of radius R and a concentric notional circle having a radius R/n, where n is the refractive index of the structure. Any light ray that passes through the notional circle within the cross-sectional plane is incident on the surface of the circular structure and has an angle of incidence less than the critical angle and will exit the circular structure without experiencing TIR. Light rays propagating within the spherical structure in the plane but not emanating from within notional surface can impinge on the surface of radius R at the critical angle or greater angles of incidence. Accordingly, such light may be subject to TIR and won't exit the circular structure. Furthermore, rays of p-polarized light that pass through a notional space circumscribed by an area with a radius of curvature that is smaller than R/(1+n2)(−1/2), which is smaller than R/n, will be subject to small Fresnel reflection at the surface of radius R when exiting the circular structure. This condition may be referred to as Brewster geometry. Implementations may be configured accordingly.

Referring again to FIG. 16A, in some implementations, all or part of surfaces 242 and 244 may be located within a notional Weierstrass surface defined by surfaces 246 and 248. For example, the portions of surfaces 242 and 244 that receive light exiting light guide 230 through end 232 can reside within this surface so that light within the x-z plane reflected from surfaces 242 and 244 exits through surfaces 246 and 248, respectively, without experiencing TIR.

In the example implementations described above in connection with FIG. 16A, the light guide module 200 is configured to output light into first and second backward angular ranges 145' and 145" and in third forward angular range 145'''. In other implementations, the light guide-based light guide module 200 is modified to output light into a single backward angular range 145'. FIG. 16B shows such light guide-based light guide module 200* configured to output light on a single side of the light guide is referred to as a single-sided light guide module. The single-sided light guide module 200* is elongated along the x-axis like the light guide module 200 shown in FIG. 16A. Also like the light guide module 200, the single-sided light guide module 200* includes a substrate 205 and LEEs 210 disposed on a surface of the substrate 205 along the x-axis to emit light in a first angular range. The single-sided light guide module 200* further includes optical couplers 220 arranged and configured to redirect the light emitted by the LEEs 210 in the first angular range into a second angular range 125 that has a divergence smaller than the divergence of the first angular range at least in the x-z cross-section. Also, the single-sided light guide module 200* includes a light guide 230 to guide the light redirected by the optical couplers 220 in the second angular range 125 from a first end 231 of the light guide to a second end 232 of the light guide. Additionally, the single-sided light guide module 200* includes a single-sided extractor (denoted 240*) to receive the light guided by the light guide 230. The single-sided extractor 240* includes a redirecting surface 244 to redirect some of the light received from the light guide 230 into a third angular range 138', like described for light guide module 200 with reference to FIG. 16A, and an output surface 248 to output the light redirected by the redirecting surface 244 in the third angular range 138' into a first backward angular range 145'. Also as described in FIG. 16A, the redirecting surface 244 is configured to leak some the light received from the light guide 230 into a third forward angular range 145'''.

Figure 16C:
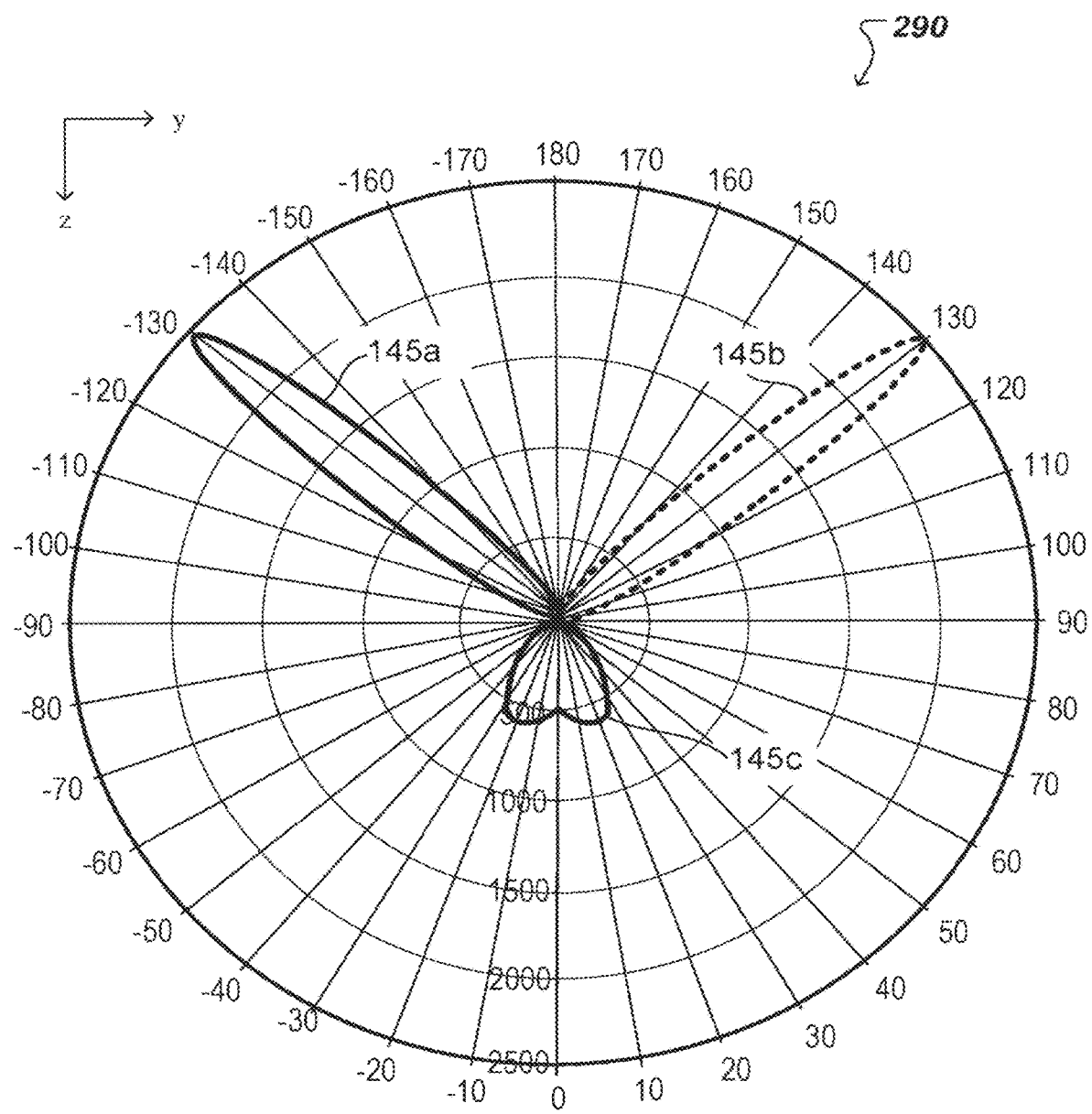

A light intensity profile of the single-sided light guide module 200* is represented in FIG. 16C as the first output lobe 145a and the third output lobe 145c. The output lobe 145a corresponds to light output by the single-sided light guide module 200* in the first backward angular range 145' and the output lobe 145c corresponds to light output by the single-sided light guide module 200* in the third forward angular range 145".

In general, light guide modules like the light guide module 200 can be combined with tertiary reflectors to provide (i) indirect illumination to a first portion of a target surface (e.g., a road) from light output by the light guide module in backward angular ranges 145', 145" and redirected by the tertiary reflector to forward angular ranges, and (ii) direct illumination to a second, different portion of the target surface from light output by the light guide module in the third forward angular range 145". An example of the latter combination is described below.

Figure 17A:
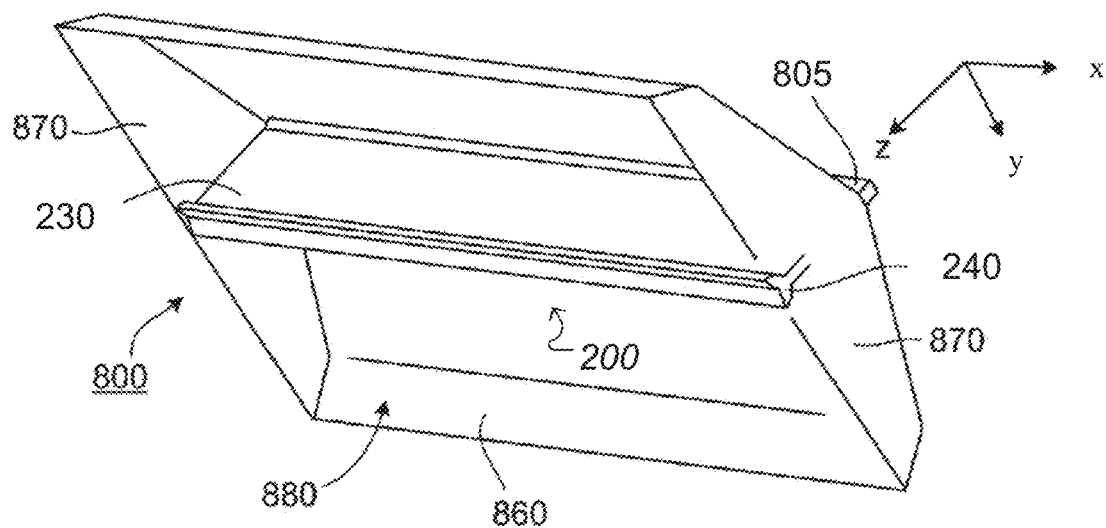
FIG. 17A-17B show aspects of a fourth example of a lighting unit including the light guide module of FIG. 15A.
Figure 17B:
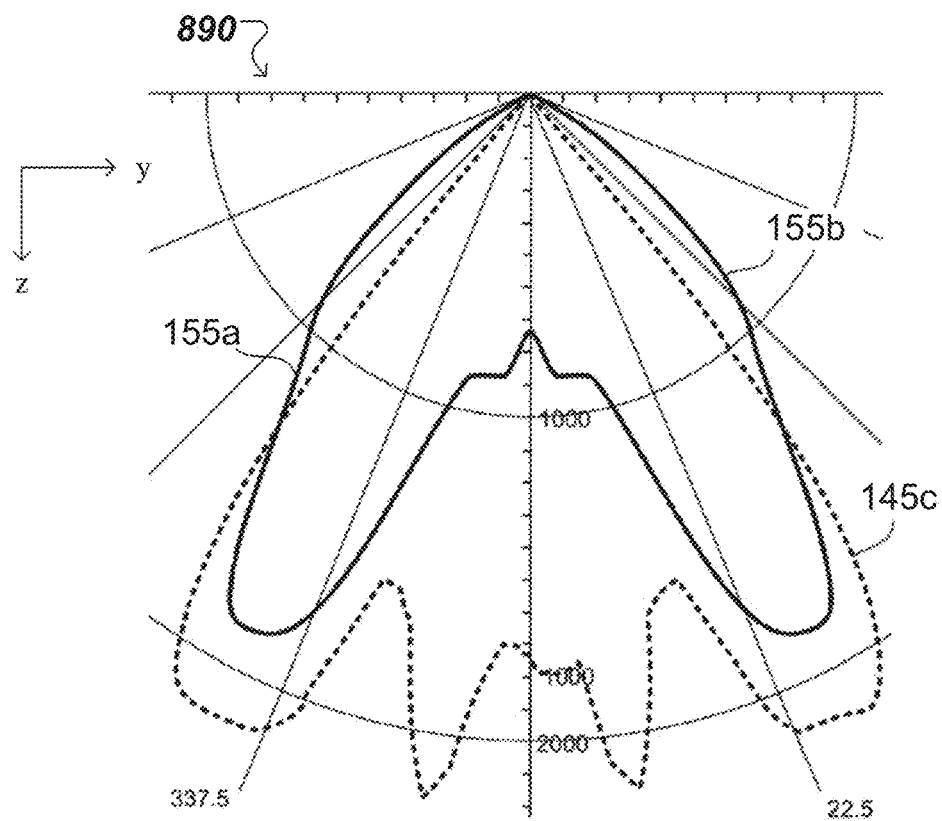

FIG. 17A shows a lighting unit 800 that includes a housing 805, light guide module 200, and reflector 860. As described above in connection with FIG. 16A, the light guide module 200 includes a light guide 230, an optical extractor 240, and optical couplers and a plurality of LEEs contained within housing 805. The housing 805 can be formed of extruded aluminum and may be attached to the reflectors 860 and the light guide 230. The reflectors 860 are closed off at two ends by walls 870 and are configured to reflect, in a forward direction, incident light provided by the optical extractor 240 in backward angular ranges 145', 145". In FIG. 17A, one of walls 870 is illustrated in cut away to better show a portion of light guide 230 and optical extractor 240. Lighting unit 800 can be used alone or in multiples to form a suitably sized vehicle light 20, for example. In some embodiments, lighting unit 800 includes a diffusor plate positioned, for example, to cover the opening 880 of the lighting unit and protect the optical system from dust or other environmental effects.

As explained herein, composition and geometry of components of the lighting unit can affect the intensity distribution provided by the lighting unit. For example, referring to FIG. 17B, in some embodiments, lighting units can be configured to direct light provided by the optical extractor 240 in backward angular ranges 145', 145" into a range of angles between 315° and 45° in a cross-sectional plane of the lighting unit 800, where 0° corresponds to the forward direction. The forward direction is parallel to the light guide 230, e.g., along the z-axis. FIG. 17B shows an intensity profile 890 that includes forward lobes 155a, 155b of indirect illumination due to light provided by the optical extractor 240 in respective backward angular ranges 145', 145" after reflection off the reflector 860, and a forward lobe 145c of direct illumination due to light provided by the optical extractor in forward angular range 145'''. The forward lobes 155a and 155b due to indirect illumination have maximum illuminance at about 330° and 30°, respectively. The forward lobe 145c due to direct illumination is centered on 0°. Note that lighting units may be configured to direct little or no illumination into certain angular ranges close to the plane of the vehicle light to avoid glare. For example, in the present example, the lighting unit 800 directs almost no illumination in ranges from 55° to 90° relative to the forward direction. This may be advantageous because illumination propagating from a lighting unit at such directions can be perceived as glare in certain applications (e.g., by pedestrians standing/walking on sidewalks adjacent the road), which is undesirable.

Figure 18A:
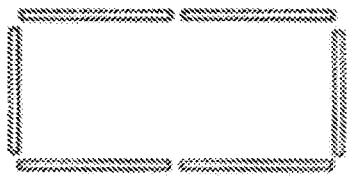
FIGS. 18A-18D show examples of arrangements of the disclosed lighting units that can be used in the vehicle headlight from FIG. 2.
Figure 18A:
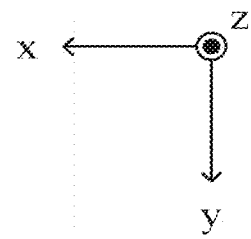
Figure 18B:
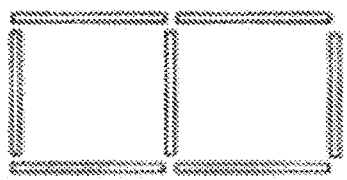
Figure 18C:
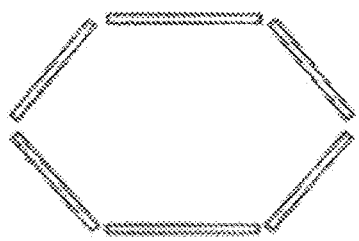
Figure 18D:
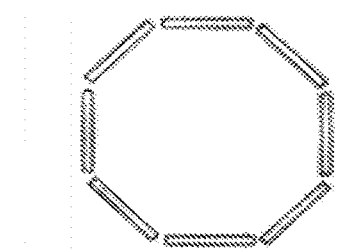

Various arrangements of the lighting units described above are possible. For example, lighting units of types 300, 600, 1300 or 800 can be arranged into different polygonal shapes, e.g., triangles, rectangles (see FIG. 18A), combinations of rectangles or other quadrilaterals (see FIG. 18B), hexagons (see FIG. 18C), octagons (see FIG. 18D), etc. As another example, the disclosed lighting unit can be arranged on a circular or elliptical contour, corresponding to the contour of a polygon with a very large number of sides (N→∞). Generally, the shape of an arrangement of lighting units can be selected to fit a desired installation. For example, a rectangular arrangement of lighting units can be used to fit with rectangular vehicle lights. In some embodiments, the lighting unit modules can be configured in curved shapes or any other desired shape to suit automotive applications.

Further example lighting units may include short or even closed loop-like arrangements of coupler-light guide assemblies and again be combined with suitably shaped extractor/reflector combinations. Such example lighting are described below.

Figure 19A:
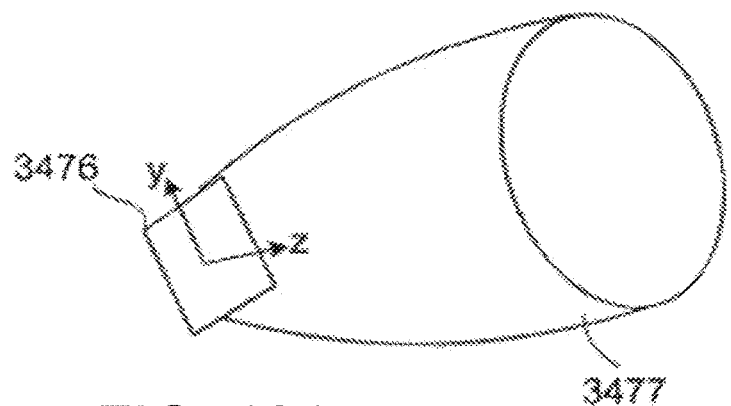
FIGS. 19A-19C show aspects of a light guide module with axial symmetry that can be used in yet other lighting units that can be included in the vehicle headlight from FIG. 2.
Figure 19B:
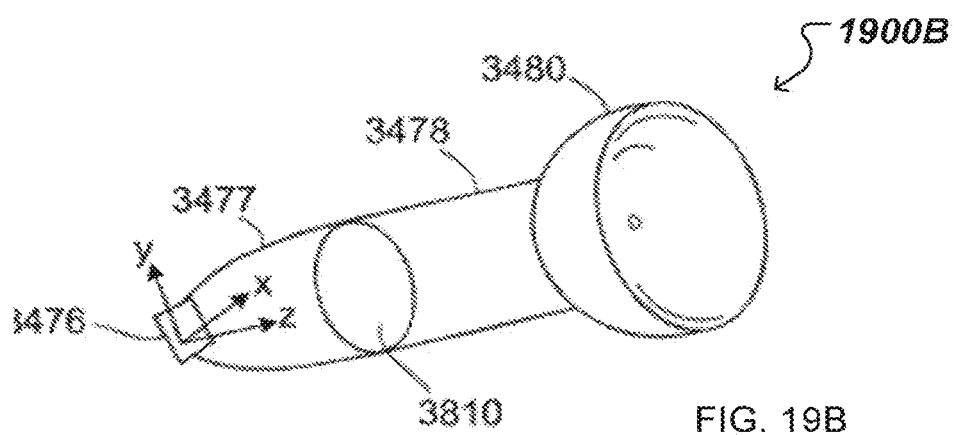
Figure 19C:
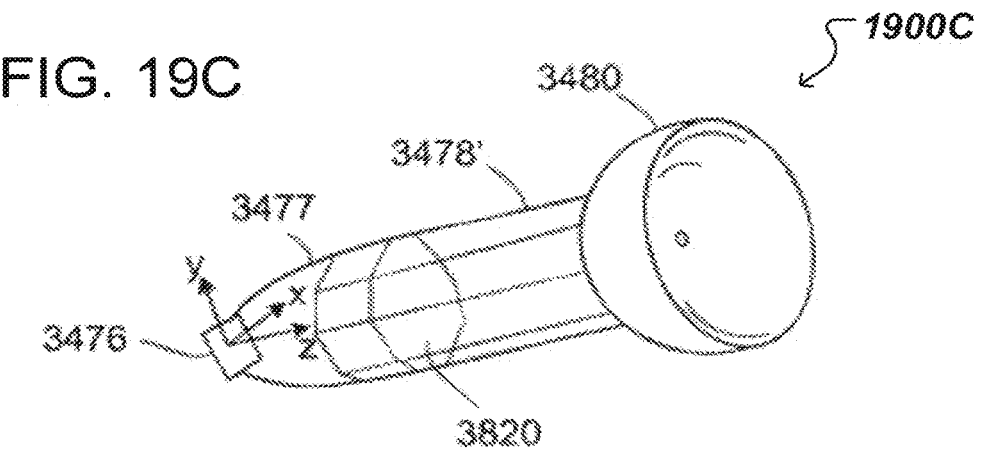

FIGS. 19A-19C show aspects of light guide modules 1900B, 1900C that are rotationally symmetric about the z-axis. Such light guide module includes an optical coupler 3477, a light guide 3478, 3478' and an optical extractor 3480, which are integrally formed into a solid body that can reflect light via TIR. The integral formation is achieved by injection molding. Each example light guide module also includes a LEE module 3476. The light guide 3478, 3478' may also be referred to as a light pipe.

FIG. 19A illustrates a perspective view of the LEE module 3476 optically coupled to the optical coupler 3477 to receive light from one or more LEEs included in the LEE module 3476. The LEE module 3476 includes one or more LEEs (e.g., LED chips) mounted on a substrate (submount). The LEEs are configured to emit light in a first angular range with respect to a normal to the substrate, e.g., the z-axis.

The optical coupler 3477 is configured to redirect light received from the one or more LEEs in the first angular range, and provide the redirected light in a second angular range at an output end of the optical coupler 3477, such that a divergence of the second angular range is smaller than a divergence of the first angular range. For instance, the optical coupler 3477 can be configured to collimate light to narrower than +/−40 degrees to satisfy TIR requirements along a longitudinal extension (along the z-axis) of the cylindrical light guide 3478, as shown in FIG. 19B, or of the prismatic light guide 3478' with N facets, as shown in FIG. 19C. The optical coupler 3477 has a receiving pocket (other examples can have two or more) that allows positioning of the LEE module 3476. The receiving pocket can be designed to provide predetermined light transfer from the LEE(s) into the optical coupler 3477 for one or more LEEs. The space between the optical coupler 3477 and the LEE(s) may be filled with silicone or other suitable substance to improve optical coupling. The optical coupler 3477 may have a cylindrical circumference. In other examples, it may have a polygonal shape, an elliptical shape, or other shape. The polygon has N sides, where N can be 3 for triangular shape, 4 for square shape, 5 for pentagonal shape, 6 for hexagonal shape; N can also be 7 or larger for other polygonal shapes. The exit aperture of the optical coupler 3477 is designed to provide good transfer of light from the optical coupler 3477 into the light guide 3478, 3478'. The outside of the optical coupler 3477 may be coated, which may affect whether light within the optical coupler is reflected by TIR or specular reflection.

In some embodiments, one or more of the LEEs may be configured to emit one or more of blue, violet or ultraviolet light that may be converted, at least in part, with one or more phosphors to generate white light, for example. Phosphors may be disposed in different locations of the luminaire, for example, in the LEE module 3476, proximate or distant of the LEE chips. For example, the size of the submount can be about 1 cm by 1 cm. The optical coupler 3477 has a substantially circular cross section perpendicular to its optical axis with a receiving end allowing the insertion of at least a portion of the LEE module 3476 into the optical coupler 3477 in order to achieve good light extraction from the LEE module 3476.

The light guide 3478, 3478' is optically coupled at an input end of the light guide with the output end of the optical coupler 3477 and is shaped to guide light received from the optical coupler 3477 in the second angular range to an output end of the light guide, and to provide the guided light in substantially the same second angular range at the output end of the light guide. In the example illustrated in FIG. 19B, a cross-section 3810 perpendicular to an optical axis of the light guide 3478 (e.g., the z-axis) forms a circle. In the example illustrated in FIG. 19C, a cross-section 3820 perpendicular to an optical axis of the light guide 3478' (e.g., the z-axis) forms a polygon with N sides, where N>3. In some implementations, the polygon of cross-section 3820 is a regular polygon. In some implementations, the number, N, of facets of the prismatic light guide 3478' is selected to be larger than a threshold number of facets, $N > N_0$. The threshold $N_0$ depends on (i) a transverse dimension of the prismatic guide 3478' (in a cross sectional plane perpendicular to the z-axis), and an index of refraction of the light guide 3478'. The threshold number of facets represents a number of facets $N_0$ for which an angle between adjacent facets of the prismatic light guide 3478' is such that light propagating in a cross section perpendicular to the optical axis z cannot undergo TIR.

In some implementations, the number, N, of facets of the prismatic light guide 3478' is selected such that the prismatic light guide 3478' has no parallel facets. In some implementations, the number of facets, N, of the prismatic light guide 3478' is to be an odd number. In the latter implementations, development of transverse modes in the prismatic light guide 3478' can be avoided. In general, the prismatic light guide 3478' can blur otherwise occurring hot spots from bright LEEs.

The optical extractor 3480 is optically coupled with the output end of the light guide 3478, 3478' at an input end of the optical extractor 3480 to receive light from the light guide 3478, 3478'. The optical extractor 3480 has a redirecting surface spaced from the input end of the optical extractor 3480 and an output surface. The redirecting surface has an apex facing the input end of the optical extractor 3480 and is shaped to reflect light received at the input end of the optical extractor 3480 in the second angular range and provide the reflected light in a third angular range towards the output surface. The output surface is shaped to refract the light provided by the redirecting surface in the third angular range as refracted light and to output the refracted light in a fourth angular range outside the output surface of the optical extractor 3480. The optical extractor 3480 is substantially rotationally symmetric about the optical axis (e.g., the z-axis) of the light pipe 3478, 3478' through the apex.

As such, the optical extractor 3480 provides a substantially rotationally symmetric intensity distribution. It is noted, that this may be different in other examples. Light can be output from the optical extractor 3480 into 360 degrees outward away from the optical extractor 3480 and a portion of that light back toward a notional plane perpendicular to the optical axis through the LEE module 3476. The intensity distribution of the light output from the optical extractor 3480 generally resembles a portion of the light emission of a point-like light source.

The light that is output by the optical extractor 3480 is further redirected and shaped in the example luminaires by a respective reflector to provide predetermined intensity distributions. Optical surfaces and/or interfaces of the optical extractor 3480 and/or the reflector can include one or more parabolic, hyperbolic, spherical, aspherical, facetted, segmented, polygonal, or otherwise shaped portions.

In this example, the optical extractor 3480 is shaped in a continuous rotationally symmetrical manner, so it can create substantially symmetrical radiation patterns. In other examples, the optical extractor 3480 can have a finite number of discrete regular repeating patterns or facets, which can be used, for example, to create an appearance associated with facetted glass or other transparent material or to blur otherwise occurring hot spots from bright light sources. The reflective interface of the optical extractor 3480 may additionally be coated with a suitably thick layer of silver or other metal such that no light can escape there through. Such a coating may change the nature of the reflection of light inside the optical extractor 3480 from TIR to specular reflection.

Figure 20A:
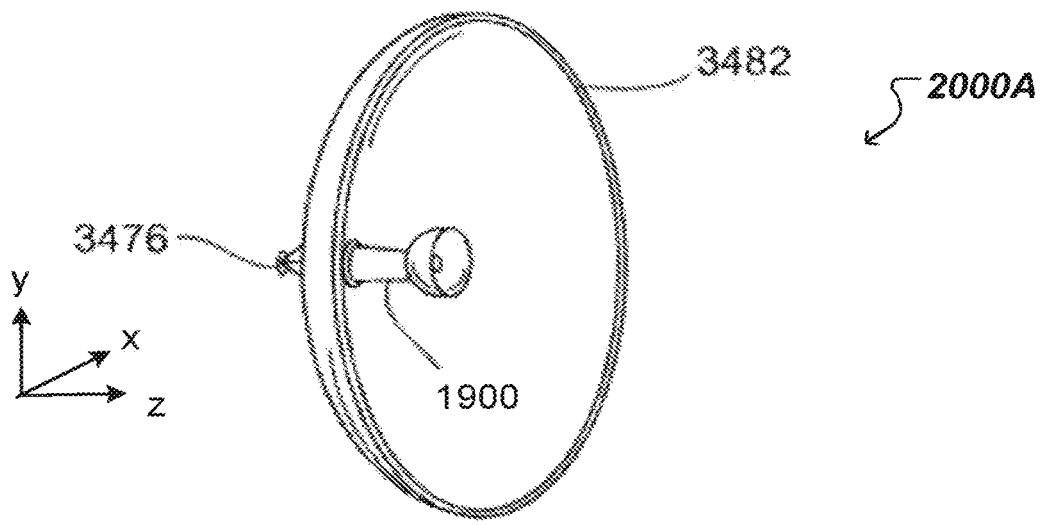
FIGS. 20A-20B show fifth and sixth examples, respectively, of lighting units that include the light guide module of FIG. 19B.

FIG. 20A is a perspective view of a lighting unit 2000A that includes a light guide module 1900 (e.g., 1900B or 1900C) and a reflector 3482 for redirecting and shaping the light output by the optical extractor 3480 toward the surface to be illuminated. The reflector 3482 has rotational symmetry about the optical axis (e.g., the z-axis) and is shaped to reflect at least some of the light output by the output surface of the optical extractor 3480 in a backward angular range as reflected light, and to provide the reflected light in a forward angular range. The reflector 3482 may have any shape for creating the desired intensity distribution from light it receives from the optical extractor 3480, e.g., parabolic. In some implementations, the reflector 3482 may have an irregular surface, have peened indentations, facets, grooves, or other optically active structures that could provide additional control over beam shaping, color mixing and/or homogenization, for example as may be desired for functional or decorative purposes.

The reflector 3482 can include a reflective metal, such as aluminum or silver, or a material coated with a reflective film, for example Alanod's Miro™ or 3M's Vikuiti™. The lighting unit 2000A may find application as a replacement light bulb for a vehicle light, or may be configured and assembled as part of a plurality of lighting units in an arrangement that forms a more elaborately shaped vehicle light.

In one embodiment, the reflector 3482 reflects substantially all light emitted from the optical extractor 3480. The shape of the reflector 3482 may be designed to uniformly illuminate a target surface. The reflector 3482 may also be adjustable relative to the optical extractor 3480. For example, the luminaire may be configured to permit such adjustment in the field or during manufacturing to modify the beam characteristics of the lighting unit 2000A. The reflector 3482 may also exhibit non-rotational symmetry with the ability to be field rotatable to steer the beam distribution in the illumination region.

Figure 20B:
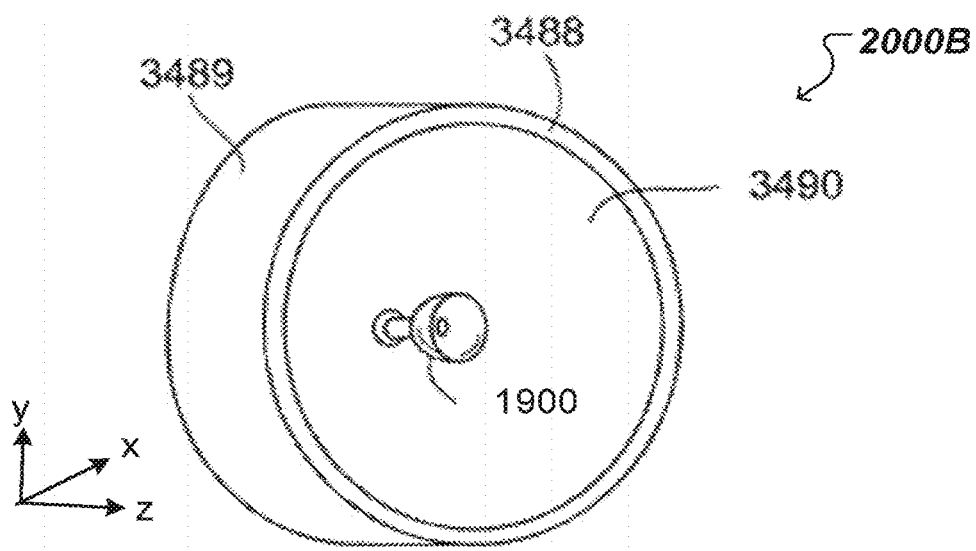

FIG. 20B illustrates a perspective view of an example lighting unit 2000B similar to the lighting unit 2000A. The luminaire lighting unit 2000B includes the light guide module 1900 (e.g., 1900B or 1900C) and a reflector 3488 for reflecting the light toward a target surface. The lighting unit 2000B utilizes a reflector 3488 with a facetted reflective surface 3490. The facetted reflective surface 3490 includes a plurality of substantially planar segments. Furthermore, the reflector 3488 can include a cylindrical side sleeve 3489.

Referring again to FIGS. 19B-19C, one or more light-exit surfaces of the optical extractor 3480 are optically coupled with one or more reflective interfaces in a spherical Weierstrass configuration. For example, the optical extractor 3480 is formed of a material with refractive index n and includes at least one light-exit surface that is configured as a portion of a sphere of radius R that is disposed so that at least a first portion of an optically coupled reflective interface lies within a portion of space defined by a notional sphere of radius R/n that is concentric with the sphere of radius R that defines the light-exit surface and reflects light from the light guide thereto. In such a case, light coming from the light guide 3478, 3478' that is reflected by a first portion of the reflective interface into a solid angle defined by a light-exit surface relative to a corresponding reflective interface can exit through the light-exit surface without undergoing total internal reflection.

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, as long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

We claim:
1. A lighting unit comprising:
a light-emitting element (LEE);
a light guide extending from a first edge to a second edge and configured to propagate light entering the light guide at the first edge to the second edge of the light guide;
a coupler arranged between the LEE and the light guide and configured to couple light emitted by the LEE into the light guide at the first edge of the light guide; and
an extractor having an input aperture and an exit aperture and opposing side surfaces extending between the input aperture and the exit aperture, the exit aperture being defined by a convex surface spaced apart from the input aperture, the exit aperture being larger than the input aperture, and first and second side surfaces flaring from the input aperture of the extractor to the exit aperture of the extractor, wherein:
the input aperture of the extractor is coupled to the second edge of the light guide
the first and second side surfaces are shaped to direct light from the input aperture of the extractor directly to the exit aperture of the extractor, the first side surface being a concave surface,
the lighting unit emits light from the exit aperture of the extractor during operation, and,
the lighting unit is a vehicle light lighting unit.
2. The lighting unit according to claim 1, wherein the extractor is composed of a solid transparent material.
3. The lighting unit according to claim 1, wherein the light guide is composed of a solid transparent material.

4. The lighting unit according to claim 1, wherein the curved surface of the extractor has the same cross-sectional profile in multiple different parallel planes spaced apart along a first direction.

5. The lighting unit according to claim 1, wherein the curved surface of the extractor has different cross-sectional profiles in multiple different parallel planes spaced apart along a first direction.

6. The lighting unit according to claim 1, wherein the curved surface of the extractor has curved cross-sectional profiles in two perpendicular planes.

7. The lighting unit according to claim 1, wherein the curved surface of the extractor is curved in three orthogonal planes.

8. The lighting unit according to claim 1, further comprising multiple of said LEE, wherein the LEEs are arranged and configured in a plurality of groups, each group being activated independent of the other groups during operation of the lighting unit.

9. The lighting unit according to claim 8, wherein different groups of LEEs are configured to provide different light-emission patterns from the lighting unit.

10. The lighting unit according to claim 8, wherein one or more of the groups of LEEs are configured to provide light for indicating a signal to an ambient area of a vehicle.

11. The lighting unit according to claim 1, further comprising a trim and a housing, the trim and the housing configured to enclose the lighting unit, wherein the curved surface of the extractor mimics a shape of the trim.

12. The lighting unit according to claim 1, wherein the light guide and the extractor are integrally formed.

13. The lighting unit according to claim 1, wherein the light guide has a uniform thickness between the first and second edges.

14. The lighting unit according to claim 1, wherein during operation the lighting unit emits light in a forward direction and the extractor has a shape varying along the forward direction.

15. The lighting unit according to claim 14, further comprising multiple of said LEE, wherein the LEEs are arranged and configured in a plurality of groups, each group being activated independent of the other groups during operation of the lighting unit, wherein a first of the groups is configured to provide light having a color different from a color of light provided by a at least one other of the groups.

16. The lighting unit according to claim 15, wherein the LEEs are arranged by color around the forward direction.

17. The lighting unit according to claim 1, wherein the lighting unit is configured to extend along a full width of a vehicle.

18. The lighting unit according to claim 1, wherein the second side surface of the extractor is a planar surface.

* * * * *